(12) United States Patent
Ulrey et al.

(10) Patent No.: US 10,328,924 B2
(45) Date of Patent: Jun. 25, 2019

(54) SYSTEMS AND METHODS FOR A SPLIT EXHAUST ENGINE SYSTEM

(71) Applicant: Ford Global Technologies, LLC, Dearborn, MI (US)

(72) Inventors: Joseph Norman Ulrey, Dearbon, MI (US); John D. Russell, Portland, OR (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 369 days.

(21) Appl. No.: 15/382,509

(22) Filed: Dec. 16, 2016

(65) Prior Publication Data

US 2018/0170353 A1    Jun. 21, 2018

(51) Int. Cl.
*B60W 20/15* (2016.01)
*F02D 41/26* (2006.01)
(Continued)

(52) U.S. Cl.
CPC ............ *B60W 20/15* (2016.01); *B60W 10/06* (2013.01); *B60W 10/08* (2013.01); *F01N 13/00* (2013.01);
(Continued)

(58) Field of Classification Search
CPC ...... B60W 20/15; B60W 10/06; B60W 10/08; F01N 13/00; F01N 13/04; F01N 13/107;
(Continued)

(56) References Cited

U.S. PATENT DOCUMENTS 5,950,582 A    9/1999 Stein
6,308,671 B1    10/2001 Reed et al.
(Continued)

FOREIGN PATENT DOCUMENTS

WO    03060298 A1    7/2003

OTHER PUBLICATIONS

Ulrey, Joseph Norman, et al., "Systems and Methods for a Split Exhaust Engine System," U.S. Appl. No. 15/382,477, filed Dec. 16, 2016, 109 pages.
(Continued)

*Primary Examiner* — Hieu T Vo
(74) *Attorney, Agent, or Firm* — Julia Voutyras; McCoy Russell LLP

(57) ABSTRACT

Methods and systems are provided for operating a split exhaust engine system that provides blowthrough air and exhaust gas recirculation to an intake passage via a first exhaust manifold and exhaust gas to an exhaust passage via a second exhaust manifold. In one example, the engine system may be installed in a hybrid vehicle, and, in response to a request to restart the engine while the vehicle is being propelled via motor torque only, the engine may be rotated unfueled via the motor torque at less than cranking speed while at least partially opening a valve disposed in a passage coupled between the first exhaust manifold and the intake passage. In another example, in response to the request to restart the engine, all exhaust valves of a second set of exhaust valves coupled to the second exhaust manifold may be deactivated.

20 Claims, 31 Drawing Sheets

(51) Int. Cl.

| | | |
|---|---|---|
| *F01N 13/04* | (2010.01) | |
| *B60W 10/06* | (2006.01) | |
| *B60W 10/08* | (2006.01) | |
| *F01N 13/10* | (2010.01) | |
| *F02D 13/06* | (2006.01) | |
| *F02D 41/06* | (2006.01) | |
| *F02M 35/10* | (2006.01) | |
| *F02D 13/02* | (2006.01) | |
| *F01N 13/00* | (2010.01) | |
| *F01N 13/08* | (2010.01) | |
| *F02D 41/04* | (2006.01) | |
| *F02N 19/00* | (2010.01) | |

(52) U.S. Cl.
CPC ........... *F01N 13/04* (2013.01); *F01N 13/087* (2013.01); *F01N 13/107* (2013.01); *F02D 13/0234* (2013.01); *F02D 13/0257* (2013.01); *F02D 13/0261* (2013.01); *F02D 13/06* (2013.01); *F02D 41/042* (2013.01); *F02D 41/065* (2013.01); *F02D 41/26* (2013.01); *F02M 35/10209* (2013.01); *F02N 19/004* (2013.01); *F01N 2590/11* (2013.01); *F01N 2900/1602* (2013.01); *F02D 13/0246* (2013.01); *F02D 2200/021* (2013.01); *F02N 2200/024* (2013.01); *F02N 2200/122* (2013.01); *Y02T 10/18* (2013.01); *Y10S 903/93* (2013.01)

(58) Field of Classification Search
CPC .............. F01N 13/087; F01N 2590/11; F01N 2900/1602; F02D 13/0234; F02D 13/0257; F02D 13/0261; F02D 13/06; F02D 41/042; F02D 41/065; F02D 41/26; F02D 13/0246; F02D 2200/021; F02N 19/004; F02N 2200/024; F02N 2200/122
See application file for complete search history.

(56) References Cited

U.S. PATENT DOCUMENTS

| | | | |
|---|---|---|---|
| 6,742,506 | B1 | 6/2004 | Grandin |
| 6,810,866 | B2 | 11/2004 | Geiser |
| 7,000,380 | B2 | 2/2006 | Tokuyasu et al. |
| 8,069,663 | B2 | 12/2011 | Ulrey et al. |
| 8,176,893 | B2 | 5/2012 | Glugla et al. |
| 8,479,511 | B2 | 7/2013 | Pursifull et al. |
| 8,495,992 | B2 | 7/2013 | Roth |
| 8,511,084 | B2 | 8/2013 | Ulrey et al. |
| 8,539,770 | B2 | 9/2013 | Williams |
| 8,590,514 | B2 | 11/2013 | Pursifull |
| 8,601,811 | B2 | 12/2013 | Pursifull et al. |
| 8,701,409 | B2 | 4/2014 | Pursifull et al. |
| 9,080,523 | B1 | 7/2015 | Ulrey et al. |
| 9,109,505 | B2 | 8/2015 | Ulrey et al. |
| 9,261,051 | B2 | 2/2016 | Ulrey et al. |
| 9,279,374 | B2 | 3/2016 | Buckland et al. |
| 9,303,551 | B2* | 4/2016 | Kojima ................. B60W 10/06 |
| 9,303,650 | B2 | 4/2016 | Ulrey et al. |
| 9,309,836 | B2 | 4/2016 | Ulrey et al. |
| 9,309,837 | B2 | 4/2016 | Ulrey et al. |
| 9,346,451 | B2 | 5/2016 | Ulrey et al. |
| 9,494,098 | B2* | 11/2016 | Ogata ................... G01H 17/00 |
| 9,518,506 | B2 | 12/2016 | Leone et al. |
| 2008/0216476 | A1 | 9/2008 | Evers |
| 2010/0263639 | A1 | 10/2010 | Uhrich et al. |
| 2014/0209059 | A1* | 7/2014 | Kojima .................... B60K 6/48 123/294 |
| 2014/0230781 | A1 | 8/2014 | Newman et al. |
| 2015/0047618 | A1 | 2/2015 | Ulrey et al. |
| 2015/0285161 | A1 | 10/2015 | Ulrey et al. |
| 2015/0316005 | A1 | 11/2015 | Madison et al. |
| 2016/0032843 | A1 | 2/2016 | Ulrey et al. |
| 2016/0131066 | A1 | 5/2016 | Martin et al. |

OTHER PUBLICATIONS

Ulrey, Joseph Norman, et al., "Systems and Methods for a Split Exhaust Engine System," U.S. Appl. No. 15/382,457, filed Dec. 16, 2016, 109 pages.
Leone, Thomas G., et al., "Systems and Methods for a Split Exhaust Engine System," U.S. Appl. No. 15/382,489, filed Dec. 16, 2016, 109 pages.
Ulrey, Joseph Norman, et al., "Systems and Methods for a Split Exhaust Engine System," U.S. Appl. No. 15/382,458, filed Dec. 16, 2016, 112 pages.
Ulrey, Joseph Norman, et al., "Systems and Methods for a Split Exhaust Engine System," U.S. Appl. No. 15/382,484, filed Dec. 16, 2016, 112 pages.
Ulrey, Joseph Norman, et al., "Systems and Methods for a Split Exhaust Engine System," U.S. Appl. No. 15/382,504, filed Dec. 16, 2016, 112 pages.
Ulrey, Joseph Norman, et al., "Systems and Methods for a Split Exhaust Engine System," U.S. Appl. No. 15/382,494, filed Dec. 16, 2016, 109 pages.
Ulrey, Joseph Norman, et al., "Systems and Methods for a Split Exhaust Engine System," U.S. Appl. No. 15/382,500, filed Dec. 16, 2016, 109 pages.
Ulrey, Joseph Norman, et al., "Systems and Methods for a Split Exhaust Engine System," U.S. Appl. No. 15/382,520, filed Dec. 16, 2016, 111 pages.
Boyer, Brad Alan, et al., "Systems and Methods for a Split Exhaust Engine System," U.S. Appl. No. 15/382,538, filed Dec. 16, 2016, 112 pages.
Ulrey, Joseph Norman, et al., "Systems and Methods for a Split Exhaust Engine System," U.S. Appl. No. 15/382,556, filed Dec. 16, 2016, 112 pages.
Ulrey, Joseph Norman, et al., "Systems and Methods for a Split Exhaust Engine System," U.S. Appl. No. 15/382,549, filed Dec. 16, 2016, 113 pages.
Ulrey, Joseph Norman, et al., "Systems and Methods for a Split Exhaust Engine System," U.S. Appl. No. 15/382,479, filed Dec. 16, 2016, 111 pages.
Ulrey, Joseph Norman, et al., "Systems and Methods for a Split Exhaust Engine System," U.S. Appl. No. 15/382,532, filed Dec. 16, 2016, 111 pages.
Ulrey, Joseph Norman, et al., "Systems and Methods for a Split Exhaust Engine System," U.S. Appl. No. 15/382,548, filed Dec. 16, 2016, 111 pages.
Ulrey, Joseph Norman, et al., "Systems and Methods for a Split Exhaust Engine System," U.S. Appl. No. 15/382,559, filed Dec. 16, 2016, 112 pages.
Ulrey, Joseph Norman, et al., "Systems and Methods for a Split Exhaust Engine System," U.S. Appl. No. 15/382,485, filed Dec. 16, 2016, 109 pages.
Ulrey, Joseph Norman, "Systems and Methods for a Split Exhaust Engine System," U.S. Appl. No. 15/382,506, filed Dec. 16, 2016, 109 pages.
Ulrey, Joseph Norman, "System and Method for Providing EGR to an Engine," U.S. Appl. No. 15/382,567, filed Dec. 16, 2016, 47 pages.

* cited by examiner

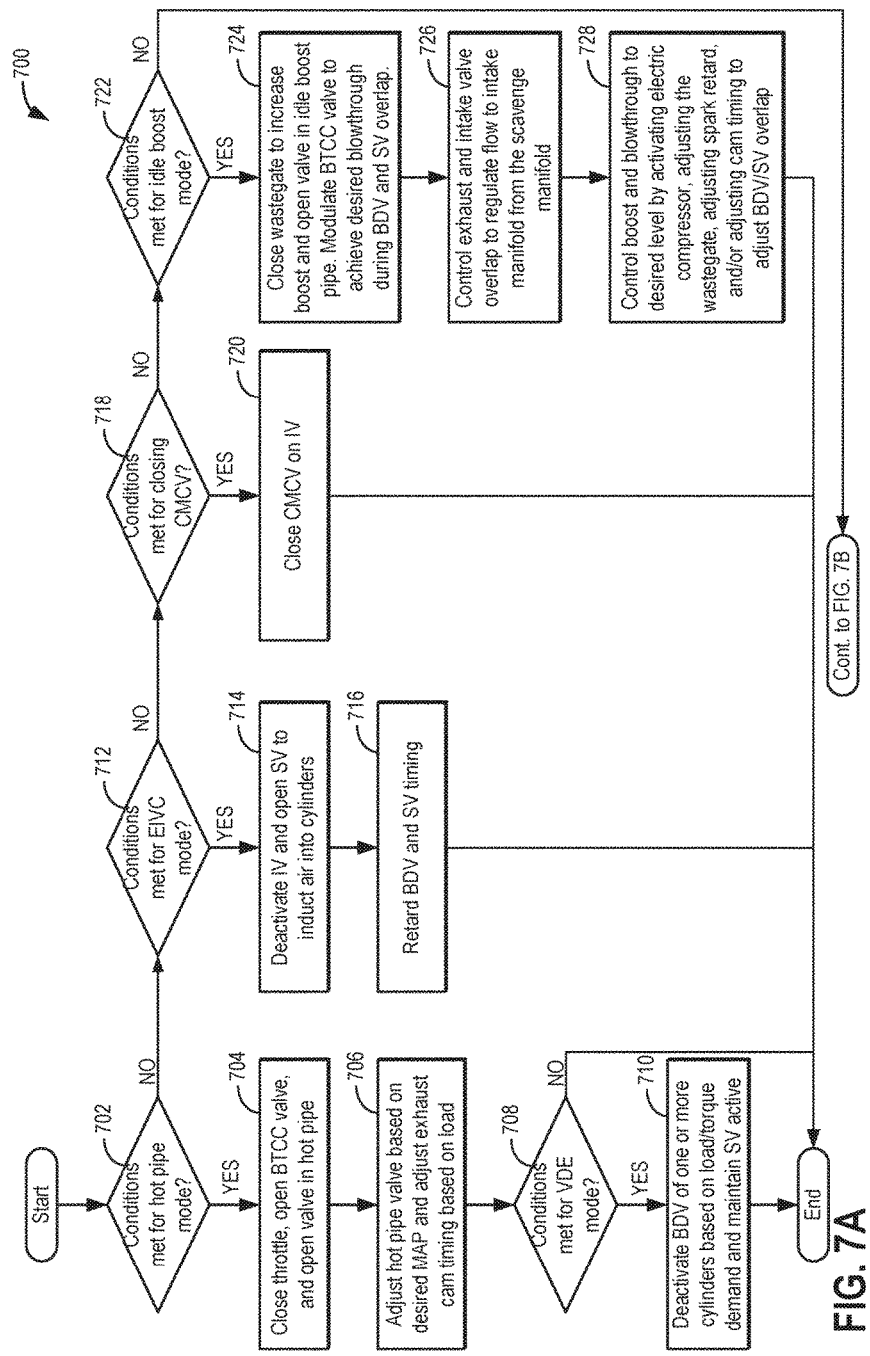

SYSTEMS AND METHODS FOR A SPLIT EXHAUST ENGINE SYSTEM

FIELD

The present description relates generally to methods and systems for a split exhaust engine including exhaust gas recirculation.

BACKGROUND/SUMMARY

Engines may use boosting devices, such as turbochargers, to increase engine power density. However, engine knock may occur due to increased combustion temperatures. Knock is especially problematic under boosted conditions due to high charge temperatures. The inventors herein have recognized that utilizing an engine system with a split exhaust system, where a first exhaust manifold routes exhaust gas recirculation (EGR) to an intake of the engine, upstream of a compressor of the turbocharger, and where a second exhaust manifold routes exhaust to a turbine of the turbocharger in an exhaust of the engine, may decrease knock and increase engine efficiency. In such an engine system, each cylinder may include two intake valves and two exhaust valves, where a first set of cylinder exhaust valves (e.g., scavenge exhaust valves) exclusively coupled to the first exhaust manifold may be operated at a different timing than a second set of cylinder exhaust valves (e.g., blowdown exhaust valves) exclusively coupled to the second exhaust manifold, thereby isolating a scavenging portion and blowdown portion of exhaust gases. The timing of the first set of cylinder exhaust valves may also be coordinated with a timing of cylinder intake valves to create a positive valve overlap period where fresh intake air (or a mixture of fresh intake air and EGR), referred to as blow-through, may flow through the cylinders and back to the intake, upstream of the compressor, via an EGR passage coupled to the first exhaust manifold. Blowthrough air may remove residual exhaust gases from within the cylinders (referred to as scavenging). The inventors herein have recognized that by flowing a first portion of the exhaust gas (e.g., higher pressure exhaust) through the turbine and a higher pressure exhaust passage and flowing a second portion of the exhaust gas (e.g., lower pressure exhaust) and blowthrough air to the compressor inlet, combustion temperatures can be reduced while improving the turbine's work efficiency and engine torque.

However, the inventors herein have recognized potential issues with such systems. As one example, during engine cold start operation, exhaust emissions may be degraded. In particular, until the combustion chamber is fully warmed up, soot is generated due to poor fuel evaporation caused by poor fuel injector spray characteristics at low fuel rail pressure and/or fuel impacting the cold metal surfaces of the combustion chamber. Further, catalysts arranged in an exhaust passage coupled to the second exhaust manifold may not adequately treat the exhaust gases until they read a light off temperature. Further still, upon restarting the engine, the intake manifold pressure may be high, thereby degrading emissions.

The inventors herein have recognized that some of the above cold start issues may be addressed by utilizing various aspects of the above-described engine system to decrease an intake manifold pressure of an engine in a hybrid electric vehicle and/or increase the recirculation of warm air before starting the engine. In one example, the issues described above may be addressed by a method comprising: while propelling a hybrid vehicle via motor torque: deactivating a first set of exhaust valves coupled exclusively to a first exhaust manifold coupled to an exhaust passage; and circulating gases through engine cylinders and to an intake passage via a second set of exhaust valves coupled exclusively to a second exhaust manifold. In this way, an intake manifold pressure of the engine may be pumped down before restarting the engine (e.g., to propel the vehicle using the engine), thereby decreasing exhaust emissions upon engine restart. In some examples, one or more exhaust valves of the first set of exhaust valves may remain deactivated upon engine start up in order to increase a temperature of an exhaust catalyst to a light off temperature.

As another example, the issues described above may be addressed by a method for a hybrid vehicle, comprising: in response to a piston temperature of an engine of the vehicle being less than a threshold while the vehicle is propelled via motor torque only, rotating the engine unfueled via the motor torque at less than cranking speed to sequentially heat all engine cylinders as they pass through a compression stroke while at least partially throttling a valve disposed in a passage coupled between a first exhaust manifold and an intake passage, the first exhaust manifold coupled to a first set of exhaust valves. In this way, the engine cylinders may be heated via recirculating warm air generated via a compression stroke of the cylinders while they are being rotated at the less than cranking speed. Further, by at least partially throttling the valve, the required cranking torque may increase, thereby further increasing heat to the engine and warming up the engine more quickly. As a result, engine emissions may be reduced upon restarting the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 7A-7B show a flow chart of a method for operating the split exhaust engine system in a part throttle mode.

DETAILED DESCRIPTION

Figure 1A:
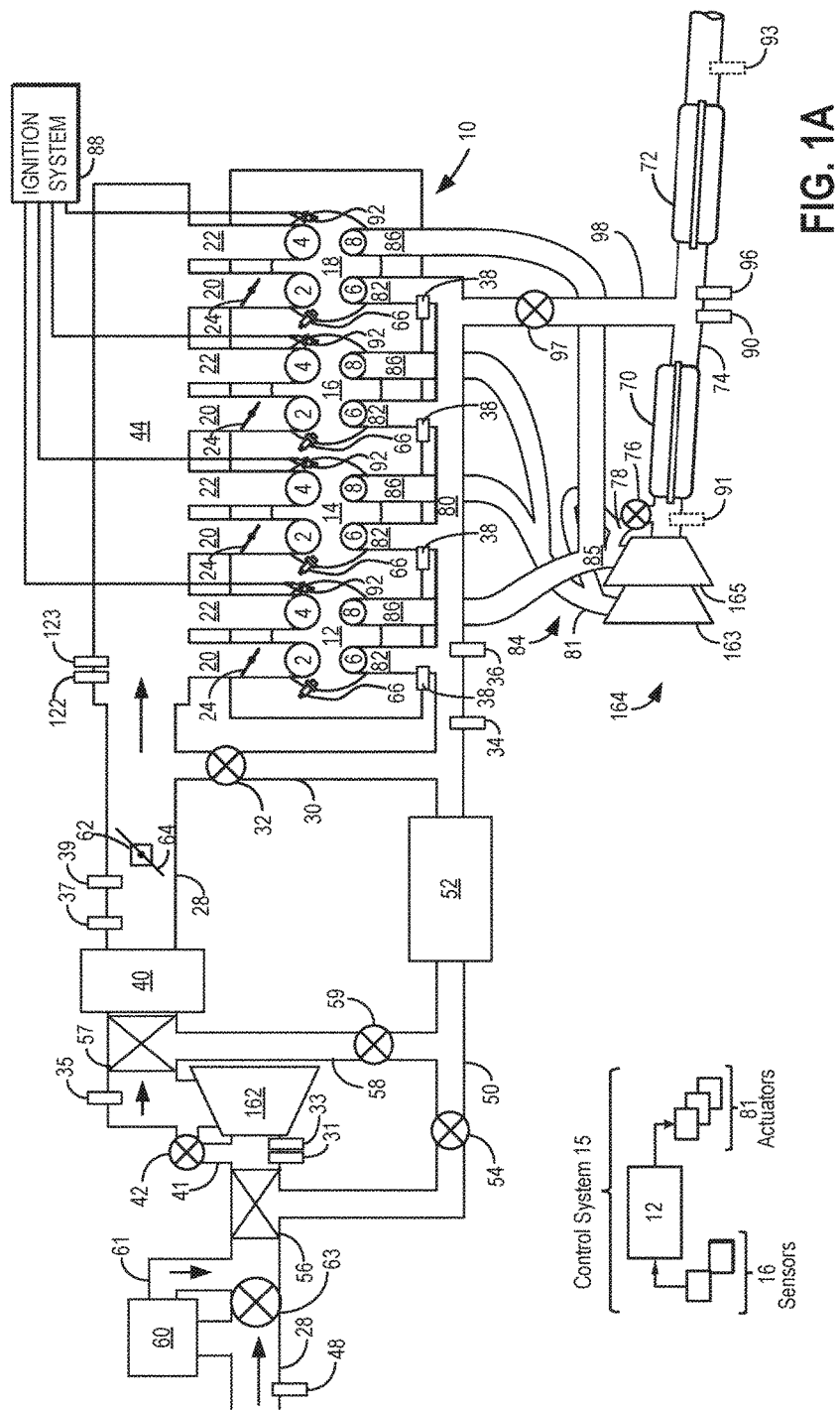
FIG. 1A shows a schematic depiction of a turbocharged engine system with a split exhaust system.
Figure 1B:
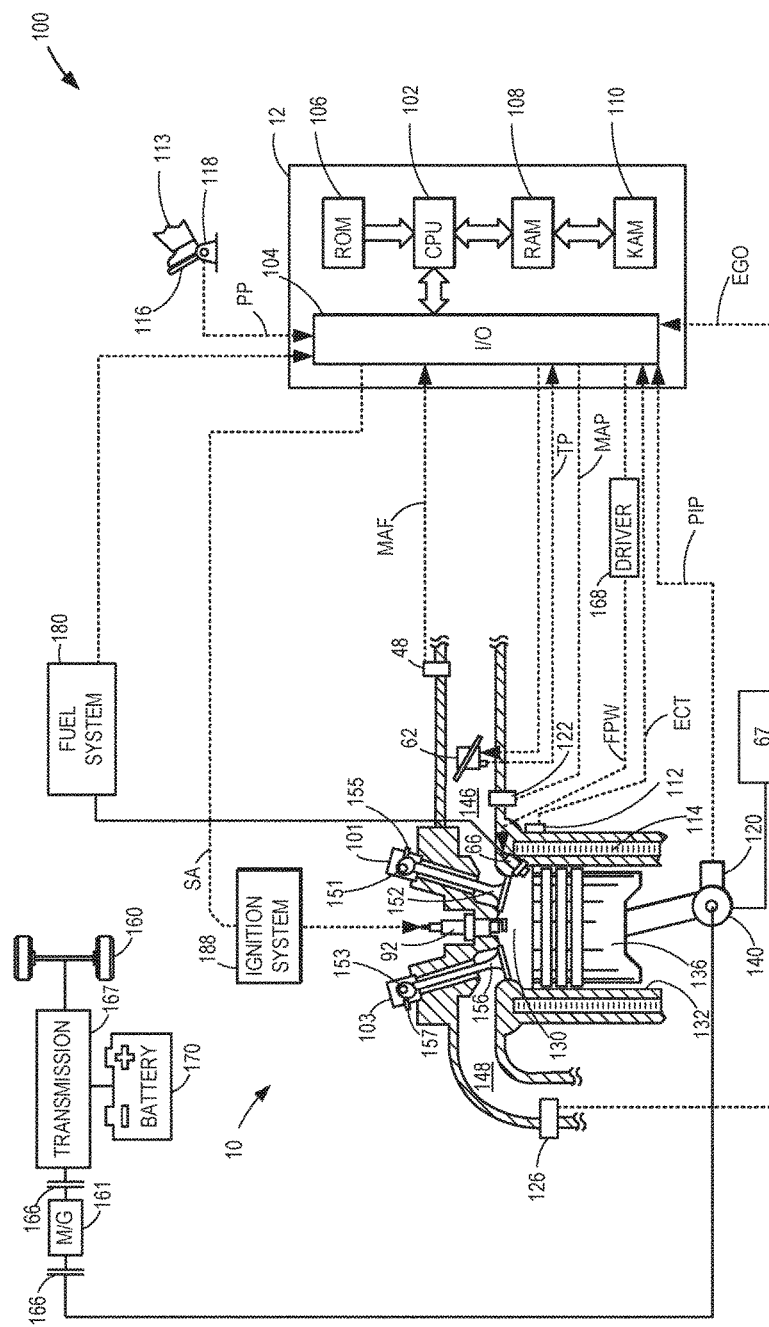
FIG. 1B shows an embodiment of a cylinder of the engine system of FIG. 1A.
Figure 2A:
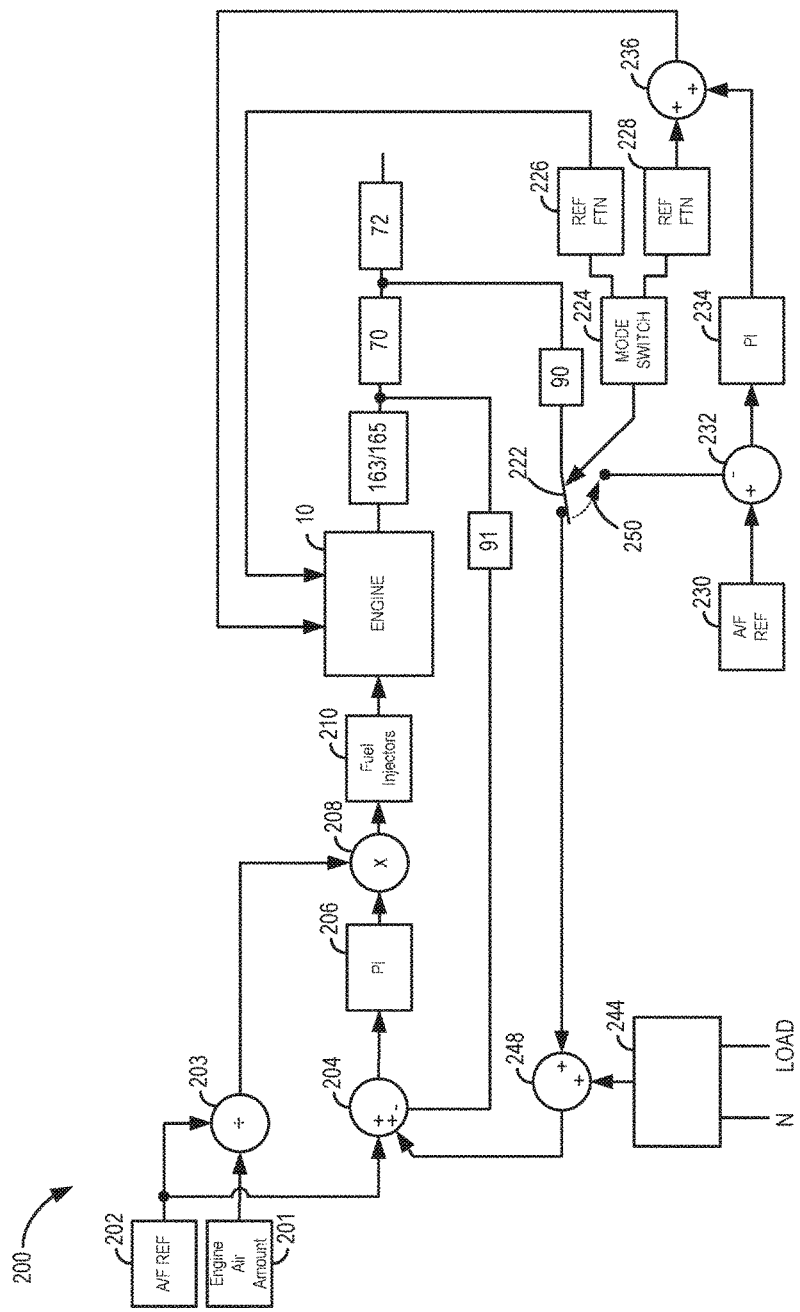
FIG. 2A shows a block diagram of a first embodiment of an engine air-fuel ratio control system for an internal combustion engine and an air-fuel ratio flowing into an exhaust gas emissions device.
Figure 2B:
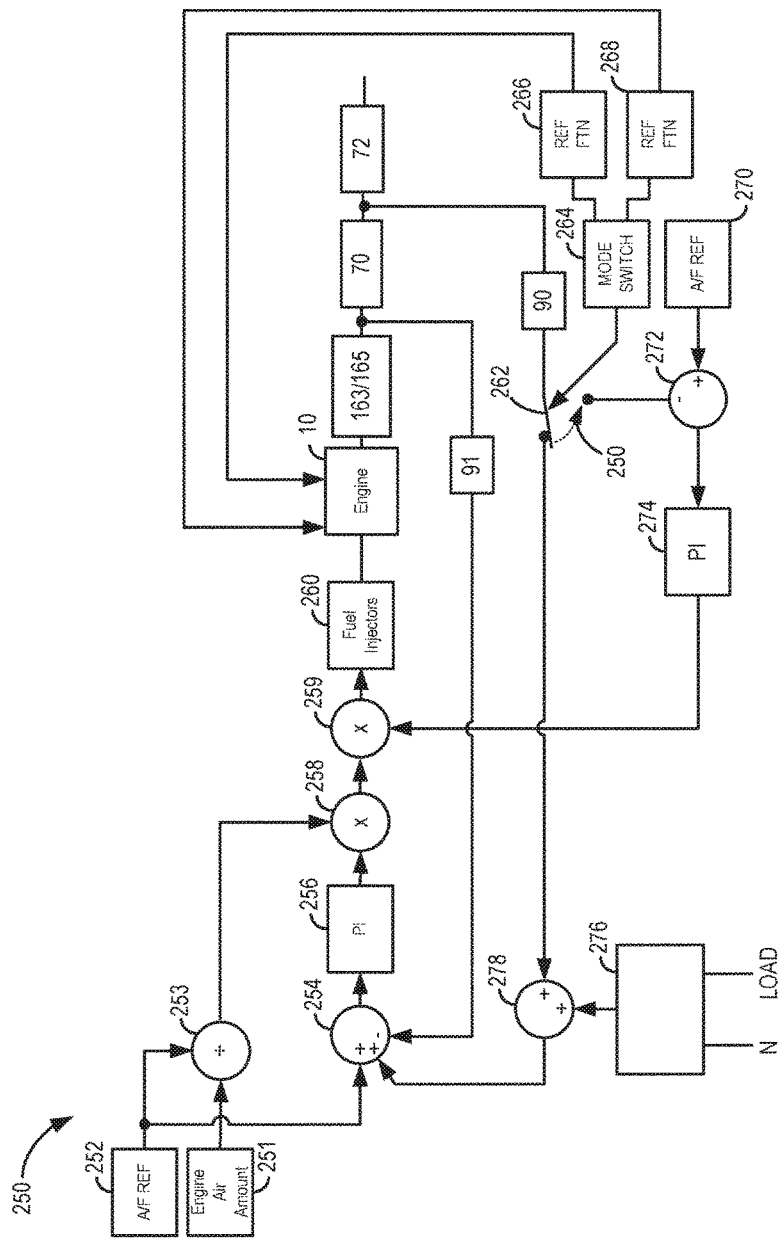
FIG. 2B shows a block diagram of a second embodiment of an engine air-fuel ratio control system for an internal combustion engine and an air-fuel ratio flowing into an exhaust gas emissions device.
Figure 3A:
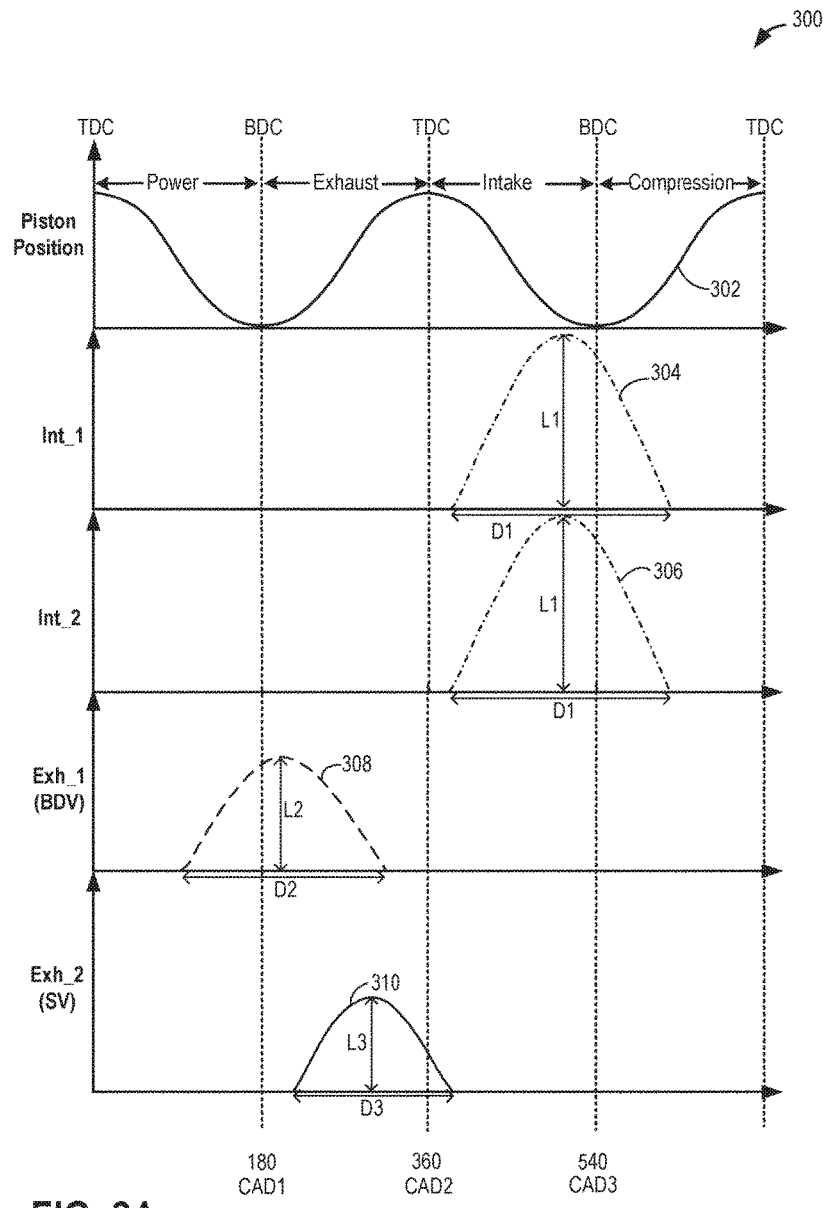
FIG. 3A shows example cylinder intake valve and exhaust valve timings for one engine cylinder of a split exhaust engine system.
Figure 3B:
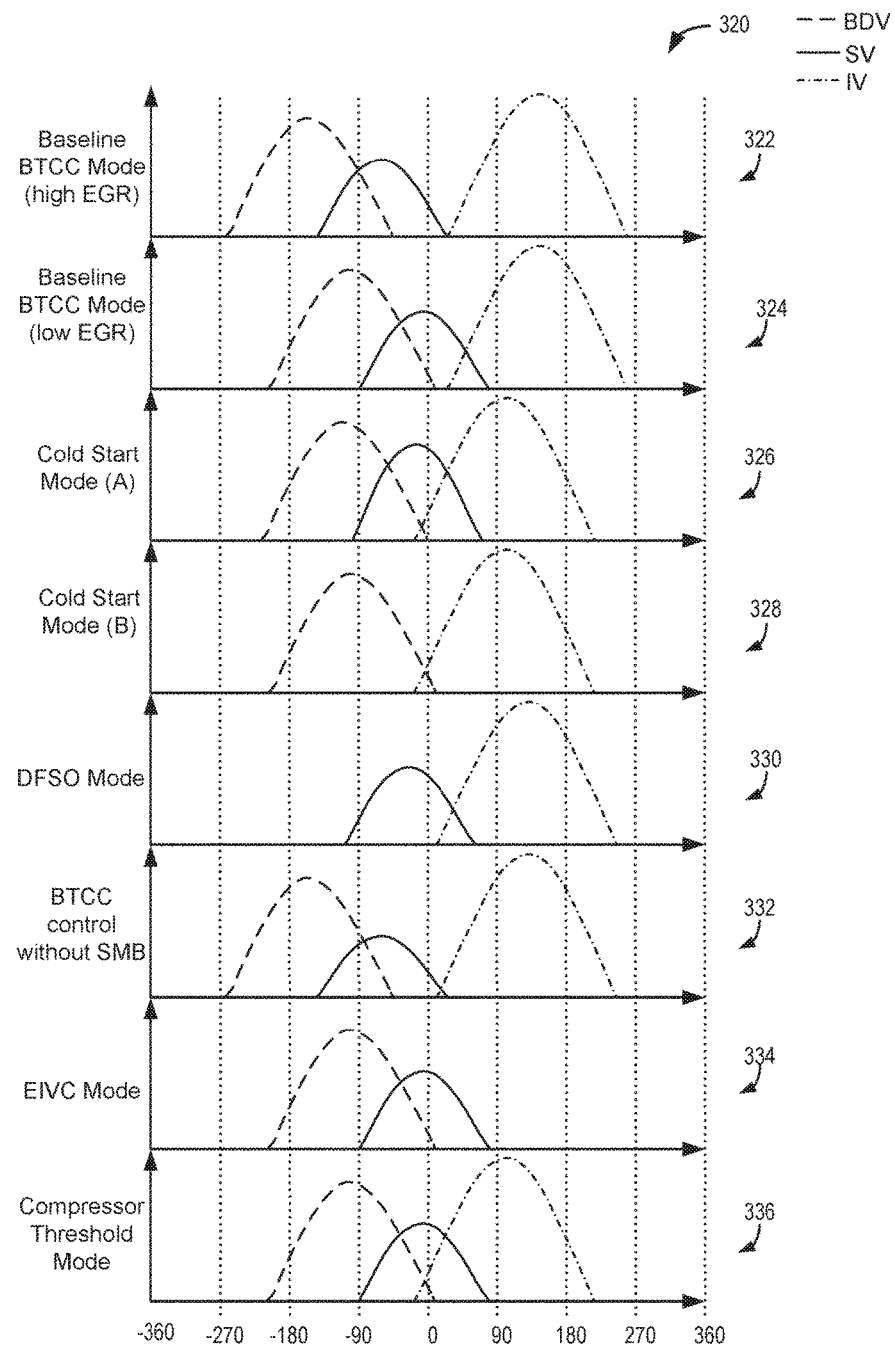
FIG. 3B shows example adjustments to the intake valve and exhaust valve timings for one engine cylinder of the split exhaust engine system for different engine operating modes.

The following description relates to systems and methods for operating a split exhaust engine with blowthrough and exhaust gas recirculation (EGR) to an intake via a first exhaust manifold. As shown in FIG. 1A, the split exhaust engine may include a first exhaust manifold (referred to herein as a scavenge exhaust manifold) coupled exclusively to a scavenge exhaust valve of each cylinder. The scavenge manifold is coupled to the intake passage, upstream of a turbocharger compressor, via a first EGR passage including a first EGR valve (referred to herein as a BTCC valve). The split exhaust engine also include a second exhaust manifold (referred to herein as a blowdown exhaust manifold) coupled exclusively to a blowdown exhaust valve of each cylinder. The blowdown manifold is coupled to an exhaust passage of the engine, where the exhaust passage includes a turbocharger turbine and one or more emission control devices (which may include one or more catalysts). In some embodiments, the split exhaust engine system may include additional passages coupled between the scavenge manifold and either the intake or exhaust passage, as shown in FIG. 1A. Additionally, in some embodiments, the split exhaust engine system may include various valve actuation mechanisms and may be installed in a hybrid vehicle, as shown in FIG. 1B. Due to the multiple exhaust manifolds and different couplings of the scavenge manifold to the intake and exhaust passage, the split exhaust engine may include a unique air-fuel control system, as shown in FIGS. 2A-2B. The scavenge exhaust valves and blowdown exhaust valves open and close at different times in an engine cycle, for each cylinder, in order to isolate scavenge and blowdown portions of combusted exhaust gases and direct these portions separately to the scavenge manifold and blowdown manifold, as shown at FIG. 3A. The timings of the intake valve, scavenge exhaust valve, and blowdown exhaust valve of each engine cylinder may be adjusted to increase EGR and/or blowthrough to the intake, and/or optimize engine performance under different engine operating modes, as shown in FIG. 3B.

Figure 4A:
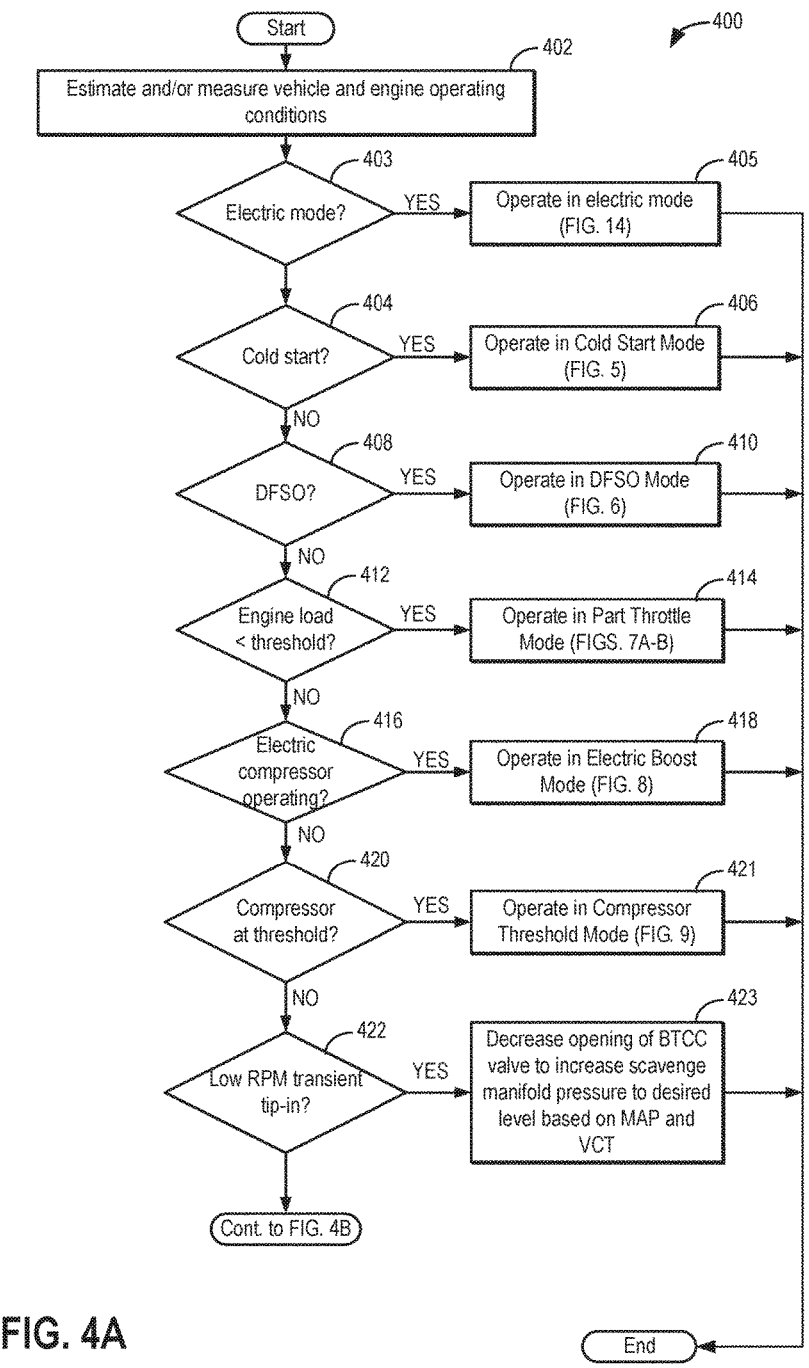
FIGS. 4A-4B show a flow chart of a method for operating a split exhaust engine system, where a first exhaust manifold routes exhaust gas and blowthrough air to an intake of the engine system and a second exhaust manifold routes exhaust to an exhaust of the engine system, under different vehicle and engine operating modes.
Figure 4B:
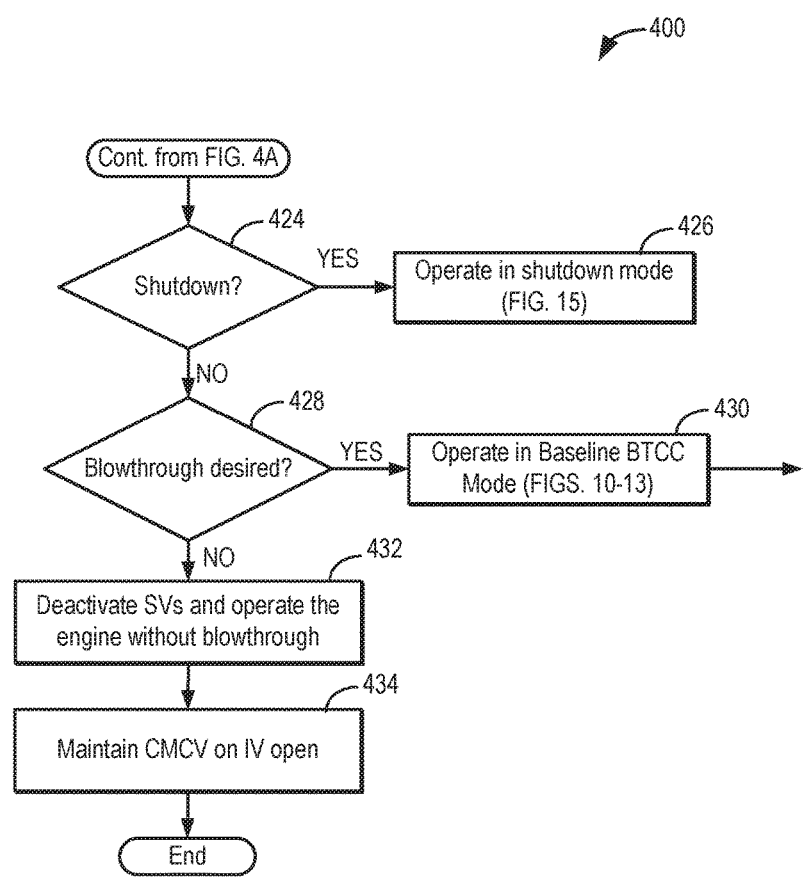

The positions of various valves and timings of the cylinder intake and exhaust valves of the split exhaust engine system may be controlled differently under different engine operating conditions, as shown at FIGS. 4A-4B. For example, the different operating modes of the split exhaust engine system may include an electric mode (a method for this mode presented at FIG. 14 and corresponding, example timing graph shown at FIG. 23), a cold start mode (a method for this mode presented at FIG. 5 and corresponding, example timing graph shown at FIG. 16), a deceleration fuel shut-off mode (a method for this mode presented at FIG. 6 and corresponding, example timing graph shown at FIG. 17), a part throttle mode (a method for this mode presented at FIGS. 7A-7B and corresponding, example timing graph shown at FIGS. 18A-18B), an electric boost mode (a method for this mode presented at FIG. 8 and corresponding, example timing graph shown at FIG. 19), a compressor threshold mode (a method for this mode presented at FIG. 9 and corresponding, example timing graph shown at FIG. 20), a shutdown mode (a method for this mode presented at FIG. 15 and corresponding, example timing graph shown at FIG. 24), and a baseline blowthrough combustion cooling (BTCC) mode (a method for this mode presented at FIGS. 10-13 and corresponding, example timing graphs shown at FIGS. 21 and 22). During a period of operation of the engine (e.g., from a key-on startup to key-off shutdown), the split exhaust engine system may transition between multiple of the above-described operating modes. An example of such a period of engine operation, from engine startup to shutdown, is shown at FIG. 25. In this way, engine actuators of the split exhaust engine system may be controlled differently based on a current operating mode of the engine system in order to increase engine efficiency and reduce engine emissions at each engine operating mode.

In the following description, a valve being operational or activated indicates that it is opened and/or closed according to determined timings during the combustion cycle for a given set of conditions. Likewise, a valve being deactivated or inoperative indicates that the valve is maintained closed, unless otherwise stated.

FIG. 1A shows a schematic diagram of a multi-cylinder internal combustion engine 10, which may be included in a propulsion system of an automobile. Engine 10 includes a plurality of combustion chambers (i.e., cylinders) which may be capped on the top by a cylinder head (not shown). In the example shown in FIG. 1A, engine 10 includes cylinders 12, 14, 16, and 18, arranged in an inline-4 configuration. It should be understood, however, that though FIG. 1A shows four cylinders, engine 10 may include any number of cylinders in any configuration, e.g., V-6, I-6, V-12, opposed 4, etc. Further, the cylinders shown in FIG. 1A may have a cylinder configuration, such as the cylinder configuration shown in FIG. 1B, as described further below. Each of cylinders 12, 14, 16, and 18 include two intake valves, including first intake valve 2 and second intake valve 4, and two exhaust valves, including first exhaust valve (referred to herein as a blowdown exhaust valve, or blowdown valve) 8 and second exhaust valve (referred to herein as a scavenge exhaust valve, or scavenge valve) 6. The intake valves and exhaust valves may be referred to herein as cylinder intake valves and cylinder exhaust valves, respectively. As explained further below with reference to FIG. 1B, a timing (e.g., opening timing, closing timing, opening duration, etc.) of each of the intake valves may be controlled via various camshaft timing systems. In one embodiment, both the first intake valves 2 and second intake valves 4 may be controlled to a same valve timing (e.g., such that they open and close at the same time in the engine cycle). In an alternate embodiment, the first intake valves 2 and second intake valves 4 may be controlled at a different valve timing. Further, the first exhaust valves 8 may be controlled at a different valve timing than the second exhaust valves 6 (e.g., such that a first exhaust valve and second exhaust valve of a same cylinder open at different times than one another and close at different times than one another), as discussed further below.

Each cylinder receives intake air (or a mixture of intake air and recirculated exhaust gas, as explained further below) from an intake manifold 44 via an air intake passage 28 Intake manifold 44 is coupled to the cylinders via intake ports (e.g., runners). For example, intake manifold 44 is shown in FIG. 1A coupled to each first intake valve 2 of each cylinder via first intake ports 20. Further, the intake manifold 44 is coupled to each second intake valve 4 of each cylinder via second intake ports 22. In this way, each cylinder intake port can selectively communicate with the cylinder it is coupled to via a corresponding one of the first intake valves 2 or second intake valves 4. Each intake port may supply air and/or fuel to the cylinder it is coupled to for combustion.

One or more of the intake ports may include a charge motion control device, such as a charge motion control valve (CMCV). As shown in FIG. 1A, each first intake port 20 of each cylinder includes a CMCV 24. CMCVs 24 may also be referred to as swirl control valves or tumble control valves. CMCVs 24 may restrict airflow entering the cylinders via first intake valves 2. In the example of FIG. 1A, each CMCV 24 may include a valve plate; however, other designs of the valve are possible. Note that for the purposes of this disclosure the CMCV 24 is in the "closed" position when it is fully activated and the valve plate may be fully tilted into the respective first intake port 20, thereby resulting in maximum air charge flow obstruction. Alternatively, the CMCV 24 is in the "open" position when deactivated and the valve plate may be fully rotated to lie substantially parallel with airflow, thereby considerably minimizing or eliminating airflow charge obstruction. The CMCVs may principally be maintained in their "open" position and may only be activated "closed" when swirl conditions are desired. As shown in FIG. 1A, only one intake port of each cylinder includes the CMCV 24. However, in alternate embodiments, both intake ports of each cylinder may include a CMCV 24. The controller 12 may actuate the CMCVs 24 (e.g., via a valve actuator that may be coupled to a rotating shaft directly coupled to each CMCV 24) to move the CMCVs into the open or closed positions, or a plurality of positions between the open and closed positions, in response to engine operating conditions (such as engine speed/load and/or when blowthrough via the second exhaust valves 6 is active), as explained further below. As referred to herein, blowthrough air or blowthrough combustion cooling may refer to intake air that flows from the one or more intake valves of each cylinder to second exhaust valves 6 (and into second exhaust manifold 80) during a valve opening overlap period between the intake valves and second exhaust valves 6 (e.g., a period when both the intake valves and second exhaust valves 6 are open at the same time), without combusting the blowthrough air.

A high pressure, dual stage, fuel system (such as the fuel system shown in FIG. 1B) may be used to generate fuel pressures at injectors 66. As such, fuel may be directly injected in the cylinders via injectors 66. Distributorless ignition system 88 provides an ignition spark to cylinders 12, 14, 16, and 18 via sparks plug 92 in response to controller 12. Cylinders 12, 14, 16, and 18 are each coupled to two exhaust ports for channeling the blowdown and scavenging portions of the combustion gases separately. Specifically, as shown in FIG. 1A, cylinders 12, 14, 16, and 18 exhaust combustion gases (e.g., scavenging portion) to second exhaust manifold (referred to herein as a scavenge manifold) 80 via second exhaust runners (e.g., ports) 82 and combustion gases (e.g., blowdown portion) to first exhaust manifold (referred to herein as a blowdown manifold) 84 via first exhaust runners (e.g., ports) 86. Second exhaust runners 82 extend from cylinders 12, 14, 16, and 18 to second exhaust manifold 80. Additionally, first exhaust manifold 84 includes a first manifold portion 81 and second manifold portion 85. First exhaust runners 86 of cylinders 12 and 18 (referred to herein as the outside cylinders) extend from cylinders 12 and 18 to the second manifold portion 85 of first exhaust manifold 84. Additionally, first exhaust runners 86 of cylinders 14 and 16 (referred to herein as the inside cylinders) extend from cylinders 14 and 16 to the first manifold portion 81 of first exhaust manifold 84.

Each exhaust runner can selectively communicate with the cylinder it is coupled to via an exhaust valve. For example, second exhaust runners 82 communicate with their respective cylinders via second exhaust valves 6 and first exhaust runners 86 communicate with their respective cylinders via first exhaust valves 8. Second exhaust runners 82 are isolated from first exhaust runners 86 when at least one exhaust valve of each cylinder is in a closed position. Exhaust gases may not flow directly between exhaust runners 82 and 86. The exhaust system described above may be referred to herein as a split exhaust manifold system, where a first portion of exhaust gases from each cylinder are output to first exhaust manifold 84 and a second portion of exhaust gases from each cylinder are output to second exhaust manifold 80, and where the first and second exhaust manifolds do not directly communicate with one another (e.g., no passage directly couples the two exhaust manifolds to one another and thus the first and second portions of exhaust gases do not mix with one another within the first and second exhaust manifolds).

Engine 10 includes a turbocharger including a dual-stage exhaust turbine 164 and an intake compressor 162 coupled on a common shaft. Dual-stage turbine 164 includes a first turbine 163 and second turbine 165. First turbine 163 is directly coupled to first manifold portion 81 of first exhaust manifold 84 and receives exhaust gases only from cylinders 14 and 16 via first exhaust valves 8 of cylinders 14 and 16. Second turbine 165 is directly coupled to second manifold portion 85 of first exhaust manifold 84 and receives exhaust gases only from cylinders 12 and 18 via first exhaust valves 8 of cylinders 12 and 18. Rotation of first and second turbines drives rotation of compressor 162 disposed within the intake passage 28. As such, the intake air becomes boosted (e.g., pressurized) at the compressor 162 and travels downstream to intake manifold 44. Exhaust gases exit both first turbine 163 and second turbine 165 into common exhaust passage 74. A wastegate may be coupled across the dual-stage turbine 164. Specifically, wastegate valve 76 may be included in a bypass 78 coupled between each of the first manifold portion 81 and second manifold portion 85, upstream of an inlet to dual-stage turbine 164, and exhaust passage 74, downstream of an outlet of dual-stage turbine 164. In this way, a position of wastegate valve (referred to herein as a turbine wastegate) 76 controls an amount of boost provided by the turbocharger. In alternate embodiments, engine 10 may include a single stage turbine where all exhaust gases from the first exhaust manifold 84 are directed to an inlet of a same turbine.

Exhaust gases exiting dual-stage turbine 164 flow downstream in exhaust passage 74 to a first emission control device 70 and a second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way type catalysts. In other examples, emission control devices 70 and 72 may include one or a plurality of a diesel oxidation catalyst (DOC), and a selective catalytic reduction catalyst (SCR). In yet another example, second emission control device 72 may include a gasoline particulate filter (GPF). In one example, first emission control device 70 may include a catalyst and second emission control device 72 may include a GPF. After passing through emission control devices 70 and 72, exhaust gases may be directed out to a tailpipe.

Exhaust passage 74 further includes a plurality of exhaust sensors in electronic communication with controller 12 of control system 15, as described further below. As shown in FIG. 1A, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as second oxygen sensor 91 positioned between dual-stage turbine 164 and first emission control device 70 and/or third oxygen sensor 93 positioned downstream of second emission control device 72. As such, second oxygen sensor 91 may be configured to measure the oxygen content of the exhaust gas entering first emission control device 70 and third oxygen sensor 93 may be configured to measure the oxygen content of exhaust gas exiting second emission control device 72. In one embodiment, the one or more oxygen sensor 90, 91, and 93 may be Universal Exhaust Gas Oxygen (UEGO) sensors. Alternatively, a two-state exhaust gas oxygen sensor may be substituted for oxygen sensors 90, 91, and 93. Exhaust passage 74 may include various other sensors, such as one or more temperature and/or pressure sensors. For example, as shown in FIG. 1A, a pressure sensor 96 is positioned within exhaust passage 74, between first emission control device 70 and second emission control device 72. As such, pressure sensor 96 may be configured to measure the pressure of exhaust gas entering second emission control device 72. Both pressure sensor 96 and oxygen sensor 90 are arranged within exhaust passage 74 at a point where a flow passage 98 couples to exhaust passage 74. Flow passage 98 may be referred to herein as a scavenge manifold bypass passage (SMBP) 98. Scavenge manifold bypass passage 98 is directly coupled to and between second exhaust (e.g., scavenge) manifold 80 and exhaust passage 74. A valve 97 (referred to herein as the scavenge manifold bypass valve, SMB V) is disposed within scavenge manifold bypass passage 98 and is actuatable by controller 12 to adjust an amount of exhaust flow from second exhaust manifold 80 to exhaust passage 74, at a location between first emission control device 70 and second emission control device 72.

Second exhaust manifold 80 is directly coupled to a first exhaust gas recirculation (EGR) passage 50. First EGR passage 50 is a coupled directly between second exhaust manifold 80 and intake passage 28, upstream of compressor (e.g., turbocharger compressor) 162 (and thus may be referred to as a low-pressure EGR passage). As such, exhaust gases (or blowthrough air, as explained further below) is directed from second exhaust manifold 80 to intake passage 28, upstream of compressor 162, via first EGR passage 50. As shown in FIG. 1A, first EGR passage 50 includes an EGR cooler 52 configured to cool exhaust gases flowing from second exhaust manifold 80 to intake passage 28 and a first EGR valve 54 (which may be referred to herein as the BTCC valve). Controller 12 is configured to actuate and adjust a position of first EGR valve 54 in order to control an amount of air flow through first EGR passage 50. When first EGR valve 54 is in a closed position, no exhaust gases or intake air may flow from second exhaust manifold 80 to intake passage 28, upstream of compressor 162. Further, when first EGR valve 54 is in an open position, exhaust gases and/or blowthrough air may flow from second exhaust manifold 80 to intake passage 28, upstream of compressor 162. Controller 12 may additionally adjust first EGR valve 54 into a plurality of positions between fully open and fully closed.

A first ejector 56 is positioned at an outlet of EGR passage 50, within intake passage 28. First ejector 56 may include a constriction or venturi that provides a pressure increase at the inlet of the compressor 162. As a result, EGR from the EGR passage 50 may be mixed with fresh air flowing through the intake passage 28 to the compressor 162. Thus, EGR from the EGR passage 50 may act as the motive flow on the first ejector 56. In an alternate embodiment, there may not be an ejector positioned at the outlet of EGR passage 50. Instead, an outlet of compressor 162 may be shaped as an ejector that lowers the gas pressure to assist in EGR flow (and thus, in this embodiment, air is the motive flow and EGR is the secondary flow). In yet another embodiment, EGR from EGR passage 50 may be introduced at the trailing edge of a blade of compressor 162, thereby allowing blow-through air to intake passage 28 via EGR passage 50.

A second EGR passage 58 is coupled between first EGR passage 50 and intake passage 28. Specifically, as shown in FIG. 1A, second EGR passage 58 is coupled to first EGR passage 50, between EGR valve 54 and EGR cooler 52. In alternate embodiments, when second EGR passage 58 is included in the engine system, the system may not include EGR cooler 52. Additionally, second EGR passage 58 is directly coupled to intake passage 28, downstream of compressor 162. Due to this coupling, second EGR passage 58 may be referred to herein as a mid-pressure EGR passage. Further, as shown in FIG. 1A, second EGR passage 58 is coupled to intake passage 28 upstream of a charge air cooler (CAC) 40. CAC 40 is configured to cool intake air (which may be a mixture of fresh intake air from outside of the engine system and exhaust gases) as it passes through CAC 40. As such, recirculated exhaust gases from first EGR passage 50 and/or second EGR passage 58 may be cooled via CAC 40 before entering intake manifold 44. In an alternate embodiment, second EGR passage 58 may be coupled to intake passage 28, downstream of CAC 40. In this embodiment, there may be no EGR cooler 52 disposed within first EGR passage 50. Further, as shown in FIG. 1A, a second ejector 57 may be positioned within intake passage 28, at an outlet of second EGR passage 58.

A second EGR valve 59 (e.g., mid-pressure EGR valve) is disposed within second EGR passage 58. Second EGR valve 59 is configured to adjust an amount of gas flow (e.g., intake air or exhaust) through second EGR passage 58. As described further below, controller 12 may actuate EGR valve 59 into an open position (allowing flow thorough second EGR passage 58), closed position (blocking flow through second EGR passage 58), or plurality of positions between fully open and fully closed based on (e.g., as a function of) engine operating conditions. For example, actuating the EGR valve 59 may include the controller 12 sending an electronic signal to an actuator of the EGR valve 59 to move a valve plate of EGR valve 59 into an open position, closed position, or some position between fully open and fully closed. As also explained further below, based on system pressures and positions of alternate valves in the engine system, air may either flow toward intake passage 28 within second EGR passage 58 or toward second exhaust manifold 80 within second EGR passage 58.

Intake passage 28 further includes an electronic intake throttle 62 in communication with intake manifold 44. As shown in FIG. 1A, intake throttle 62 is positioned downstream of CAC 40. The position of a throttle plate 64 of throttle 62 can be adjusted by control system 15 via a throttle actuator (not shown) communicatively coupled to controller 12. By modulating air intake throttle 62, while operating compressor 162, an amount of fresh air may be inducted from the atmosphere and/or an amount of recirculated exhaust gas from the one or more EGR passages into engine 10, cooled by CAC 40 and delivered to the engine cylinders at compressor (or boosted) pressure via intake manifold 44. To reduce compressor surge, at least a portion of the aircharge compressed by compressor 162 may be recirculated to the compressor inlet. A compressor recirculation passage 41 may be provided for recirculating compressed air from the compressor outlet, upstream of CAC 40, to the compressor inlet. Compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

A third flow passage 30 (which may be referred to herein as a hot pipe) is coupled between second exhaust manifold 80 and intake passage 28. Specifically, a first end of third flow passage 30 is directly coupled to second exhaust manifold 80 and a second end of third flow passage 30 is directly coupled to intake passage 28, downstream of intake throttle 62 and upstream of intake manifold 44. A third valve 32 (e.g., hot pipe valve) is disposed within third flow passage 30 and is configured to adjust an amount of air flow through third flow passage 30. Third valve 32 may be actuated into a fully open position, fully closed position, or a plurality of positions between fully open and fully closed in response to an actuation signal sent to an actuator of third valve 32 from controller 12.

Second exhaust manifold 80 and/or second exhaust runners 82 may include one or more sensors (such as pressure, oxygen, and/or temperature sensors) disposed therein. For example, as shown in FIG. 1A, second exhaust manifold 80 includes a pressure sensor 34 and oxygen sensor 36 disposed therein and configured to measure a pressure and oxygen content, respectively, of exhaust gases and blowthrough (e.g., intake) air, exiting second exhaust valves 6 and entering second exhaust manifold 80. Additionally or alternatively to oxygen sensor 36, each second exhaust runner 82 may include an individual oxygen sensor 38 disposed therein. As such, an oxygen content of exhaust gases and/or blowthrough air exiting each cylinder via second exhaust valves 6 may be determined based on an output of oxygen sensors 38.

In some embodiments, as shown in FIG. 1A, intake passage 28 may include an electric compressor 60. Electric compressor 60 is disposed in a bypass passage 61 which is coupled to intake passage 28, upstream and downstream of an electric compressor valve 63. Specifically, an inlet to bypass passage 61 is coupled to intake passage 28 upstream of electric compressor valve 63 and an outlet to bypass passage 61 is coupled to intake passage 28 downstream of electric compressor valve 63 and upstream of where first EGR passage 50 couples to intake passage 28. Further, the outlet of bypass passage 61 is coupled upstream in intake passage 28 from turbocharger compressor 162. Electric compressor 60 may be electrically driven by an electric motor using energy stored at an energy storage device. In one example, the electric motor may be part of electric compressor 60, as shown in FIG. 1A. When additional boost (e.g., increased pressure of the intake air above atmospheric pressure) is requested, over an amount provided by compressor 162, controller 12 may activate electric compressor 60 such that it rotates and increases a pressure of intake air flowing through bypass passage 61. Further, controller 12 may actuate electric compressor valve 63 into a closed or partially closed position to direct an increased amount of intake air through bypass passage 61 and electric compressor 60.

Intake passage 28 may include one or more additional sensors (such as additional pressure, temperature, flow rate, and/or oxygen sensors). For example, as shown in FIG. 1A, intake passage 28 includes a mass air flow (MAF) sensor 48 disposed upstream of compressor 162, electric compressor valve 63, and where first EGR passage 59 couples to intake passage 28. An intake pressure sensor 31 and intake temperature sensor 33 are positioned in intake passage 28, upstream of compressor 162 and downstream of where first EGR passage 50 couples to intake passage 28. An intake oxygen sensor 35 and an intake temperature sensor 43 may be located in intake passage 28, downstream of compressor 162 and upstream of CAC 40. An additional intake pressure sensor 37 may be positioned in intake passage 28, downstream of CAC 40 and upstream of throttle 28. In some embodiments, as shown in FIG. 1A, an additional intake oxygen sensor 39 may be positioned in intake passage 28, between CAC 40 and throttle 28. Further, an intake manifold pressure (e.g., MAP) sensor 122 and intake manifold temperature sensor 123 are positioned within intake manifold 44, upstream of all engine cylinders.

In some examples, engine 10 may be coupled to an electric motor/battery system (as shown in FIG. 1B) in a hybrid vehicle. The hybrid vehicle may have a parallel configuration, series configuration, or variation or combinations thereof. Further, in some embodiments, other engine configurations may be employed, for example a diesel engine.

Engine 10 may be controlled at least partially by a control system 15 including controller 12 and by input from a vehicle operator via an input device (not shown in FIG. 1A). Control system 15 is shown receiving information from a plurality of sensors 16 (various examples of which are described herein) and sending control signals to a plurality of actuators 81. As one example, sensors 16 may include pressure, temperature, and oxygen sensors located within the intake passage 28, intake manifold 44, exhaust passage 74, and second exhaust manifold 80, as described above. Other sensors may include a throttle inlet pressure (TIP) sensor for estimating a throttle inlet pressure (TIP) and/or a throttle inlet temperature sensor for estimating a throttle air temperature (TCT) coupled downstream of the throttle in the intake passage. Additional system sensors and actuators are elaborated below with reference to FIG. 1B. As another example, actuators 81 may include fuel injectors, valves 63, 42, 54, 59, 32, 97, 76, and throttle 62. Actuators 81 may further includes various camshaft timing actuators coupled to the cylinder intake and exhaust valves (as described further below with reference to FIG. 1B). Controller 12 may receive input data from the various sensors, process the input data, and trigger the actuators in response to the processed input data based on instruction or code programmed in a memory of controller 12 corresponding to one or more routines. Example control routines (e.g., methods) are described herein at FIGS. 4A-15. For example, adjusting EGR flow from second exhaust manifold 80 to intake passage 28 may include adjusting an actuator of first EGR valve 54 to adjust an amount of exhaust flow flowing to intake passage 28, upstream of compressor 162, from second exhaust manifold 80. In another example, adjusting EGR flow from second exhaust manifold 80 to intake passage 28 may include adjusting an actuator of an exhaust valve camshaft to adjust an opening timing of second exhaust valves 6.

In this way, the first and second exhaust manifolds of FIG. 1A may be designed to separately channel the blowdown and scavenging portions of the exhaust. First exhaust manifold 84 may channel the blowdown pulse of the exhaust to dual-stage turbine 164 via first manifold portion 81 and second manifold portion 85 while second exhaust manifold 80 may channel the scavenging portion of exhaust to intake passage 28 via one or more of first EGR passage 50 and second EGR passage 58 and/or to exhaust passage 74, downstream of the dual-stage turbine 164, via flow passage 98. For example, first exhaust valves 8 channel the blowdown portion of the exhaust gases through first exhaust manifold 84 to the dual-stage turbine 164 and both first and second emission control device 70 and 72 while second exhaust valves 6 channel the scavenging portion of exhaust gases through second exhaust manifold 80 and to either intake passage 28 via one or more EGR passages or exhaust passage 74 and second emission control device 72 via flow passage 98.

It should be noted that while FIG. 1A shows engine 10 including each of first EGR passage 50, second EGR passage 58, flow passage 98, and flow passage 30, in alternate embodiments, engine 10 may only include a portion of these passages. For example, in one embodiment, engine 10 may only include first EGR passage 50 and flow passage 98 and not include second EGR passage 58 and flow passage 30. In another embodiment, engine 10 may include first EGR passage 50, second EGR passage 58, and flow passage 98, but not include flow passage 30. In yet another embodiment, engine 10 may include first EGR passage 50, flow passage 30, and flow passage 98, but not second EGR passage 58. In some embodiments, engine 10 may not include electric compressor 60. In still other embodiments, engine 10 may include all or only a portion of the sensors shown in FIG. 1A.

Referring now to FIG. 1B, it depicts a partial view of a single cylinder of internal combustion engine 10 which may be installed in a vehicle 100. As such, components previously introduced in FIG. 1A are represented with the same reference numbers and are not re-introduced. Engine 10 is depicted with combustion chamber (cylinder) 130, coolant sleeve 114, and cylinder walls 132 with piston 136 positioned therein and connected to crankshaft 140. Combustion chamber 130 is shown communicating with intake passage 146 and exhaust passage 148 via respective intake valve 152 and exhaust valve 156. As previously described in FIG. 1A, each cylinder of engine 10 may exhaust combustion products along two conduits. In the depicted view, exhaust passage 148 represents the first exhaust runner (e.g., port) leading from the cylinder to the turbine (such as first exhaust runner 86 of FIG. 1A) while the second exhaust runner is not visible in this view.

As also previously elaborated in FIG. 1A, each cylinder of engine 10 may include two intake valves and two exhaust valves. In the depicted view, intake valve 152 and exhaust valve 156 are located at an upper region of combustion chamber 130 Intake valve 152 and exhaust valve 156 may be controlled by controller 12 using respective cam actuation systems including one or more cams. The cam actuation systems may utilize one or more of cam profile switching (CPS), variable cam timing (VCT), variable valve timing (VVT) and/or variable valve lift (VVL) systems to vary valve operation. In the depicted example, each intake valve 152 is controlled by an intake cam 151 and each exhaust valve 156 is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivated the exhaust valve 156 such that it remains closed and does not open at its set timing. The position of intake valve 152 and exhaust valve 156 may be determined by valve position sensors 155 and 157, respectively. As introduced above, in one example, all exhaust valves of every cylinder may be controlled on a same exhaust camshaft As such, both a timing of the scavenge (second) exhaust valves and the blowdown (first) exhaust valves may be adjusted together via one camshaft, but they may each have different timings relative to one another. In another example, the scavenge exhaust valve of every cylinder may be controlled on a first exhaust camshaft and a blowdown exhaust valve of every cylinder may be controlled on a different, second exhaust camshaft. In this way, the valve timing of the scavenge valves and blowdown valves may be adjusted separately from one another. In alternate embodiments, the cam or valve timing system(s) of the scavenge and/or blowdown exhaust valves may employ a cam in cam system, an electro-hydraulic type system on the scavenge valves, and/or an electro-mechanical valve lift control on the scavenge valves.

For example, in some embodiments, the intake and/or exhaust valve may be controlled by electric valve actuation. For example, cylinder 130 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

In addition, different cam profiles for the different exhaust valves can be used to separate exhaust gases exhausted at low cylinder pressure from exhaust gases exhausted at exhaust pressure. For example, a first exhaust cam profile can open from closed position the first exhaust valve (e.g., blowdown valve) just before BDC (bottom dead center) of the power stroke of combustion chamber 130 and close the same exhaust valve well before top dead center (TDC) to selectively exhaust blowdown gases from the combustion chamber. Further, a second exhaust cam profile can be positioned to open from close a second exhaust valve (e.g., scavenge valve) before a mid-point of the exhaust stroke and close it after TDC to selectively exhaust the scavenging portion of the exhaust gases.

Thus, the timing of the first exhaust valve and the second exhaust valve can isolate cylinder blowdown gases from scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas leaving the cylinders (e.g., higher pressure exhaust) to the turbine(s) and a higher pressure exhaust passage and flowing a later, second portion of the exhaust gas (e.g., lower pressure exhaust) and blowthrough air to the compressor inlet, the engine system efficiency is improved. Turbine energy recovery may be enhanced and engine efficiency may be improved via increased EGR and reduced knock.

Continuing with FIG. 1B, exhaust gas sensor 126 is shown coupled to exhaust passage 148. Sensor 126 may be positioned in the exhaust passage upstream of one or more emission control devices, such as devices 70 and 72 of FIG. 1A. Sensor 126 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. The downstream emission control devices may include one or more of a three way catalyst (TWC), NOx trap, GPF, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc.

Cylinder 130 can have a compression ratio, which is the ratio of volumes when piston 136 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 92 for initiating combustion. Ignition system 188 can provide an ignition spark to combustion chamber 130 via spark plug 92 in response to spark advance signal SA from controller 12, under select operating modes. However, in some embodiments, spark plug 92 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 130 is shown including one fuel injector 66. Fuel injector 66 is shown coupled directly to combustion chamber 130 for injecting fuel directly therein in proportion to the pulse width of signal FPW received from controller 12 via electronic driver 168. In this manner, fuel injector 66 provides what is known as direct injection (hereafter also referred to as "DI") of fuel into combustion cylinder 130. While FIG. 1B shows injector 66 as a side injector, it may also be located overhead of the piston, such as near the position of spark plug 92. Such a position may improve mixing and combustion when operating the engine with an alcohol-based fuel due to the lower volatility of some alcohol-based fuels. Alternatively, the injector may be located overhead and near the intake valve to improve mixing. In an alternate embodiment, injector 66 may be a port injector providing fuel into the intake port upstream of cylinder 130.

Fuel may be delivered to fuel injector 66 from a high pressure fuel system 180 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. Fuel tanks in fuel system 180 may hold fuel with different fuel qualities, such as different fuel compositions. These differences may include different alcohol content, different octane, different heat of vaporizations, different fuel blends, and/or combinations thereof etc. In some embodiments, fuel system 180 may be coupled to a fuel vapor recovery system including a canister for storing refueling and diurnal fuel vapors. The fuel vapors may be purged from the canister to the engine cylinders during engine operation when purge conditions are met. For example, the purge vapors may be naturally aspirated into the cylinder via the first intake passage at or below barometric pressure.

Engine 10 may be controlled at least partially by controller 12 and by input from a vehicle operator 113 via an input device 118 such as an accelerator pedal 116. The input device 118 sends a pedal position signal to controller 12. Controller 12 is shown in FIG. 1B as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including measurement of inducted mass air flow (MAF) from mass air flow sensor 48; engine coolant temperature (ECT) from temperature sensor 112 coupled to coolant sleeve 114; a profile ignition pickup signal (PIP) from Hall effect sensor 120 (or other type) coupled to crankshaft 140; throttle position (TP) from a throttle position sensor; absolute manifold pressure signal (MAP) from sensor 122, cylinder AFR from EGO sensor 126, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Based on input from one or more of the above-mentioned sensors, controller 12 may adjust one or more actuators, such as fuel injector 66, throttle 62, spark plug 92, intake/exhaust valves and cams, etc. The controller may receive input data from the various sensors, process the input data, and trigger the actuators in response to the processed input data based on instruction or code programmed therein corresponding to one or more routines.

In some examples, vehicle 100 may be a hybrid vehicle with multiple sources of torque available to one or more vehicle wheels 160. In other examples, vehicle 100 is a conventional vehicle with only an engine, or an electric vehicle with only electric machine(s). In the example shown in FIG. 1B, vehicle 100 includes engine 10 and an electric machine 161. Electric machine 161 may be a motor or a motor/generator and thus may also be referred to herein as an electric motor. Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Electric machine 161 receives electrical power from a traction battery 170 to provide torque to vehicle wheels 160. Electric machine 161 may also be operated as a generator to provide electrical power to charge battery 170, for example during a braking operation.

Referring to FIG. 2A, a block diagram of an engine air-fuel ratio control system 200 for an internal combustion engine 10 and an air-fuel ratio flowing into an exhaust gas emissions device is shown. At least portions of the system 200 may be incorporated into a system as shown in FIGS. 1A-1B as executable instructions stored in non-transitory memory. Other portions of system 200 may be actions performed via the controller 12 shown in FIGS. 1A-1B to transform states of devices or actuators in the real world. The engine air-fuel controller described herein may work in cooperation with sensors and actuators previously described.

A base desired engine air-fuel ratio is input at block 202. Block 202 includes empirically determined air-fuel ratios for a plurality of engine speed and load pairs. In one example, the empirically determined air-fuel ratios are stored in a table in controller memory. The table may be indexed via present engine speed and engine load values. The table outputs a desired engine air-fuel ratio (e.g., 14.6:1) for the present engine speed and load. Block 202 outputs the desired engine air-fuel ratio to summing junction 204 and division junction 203.

An engine air mass flow as determined via a mass air flow sensor or an intake manifold pressure sensor (such as MAF 48 and/or MAP 122 shown in FIGS. 1A-1B) is input to control system 200 at block 201. The engine air mass flow is divided by the desired engine air-fuel ratio from block 202 at division junction 203 to provide a desired engine fuel mass flow rate. The engine fuel mass flow rate is output to multiplication junction 208.

At summing junction 204, the actual engine air-fuel ratio as determined from oxygen sensor 91 is subtracted from the desired engine air-fuel ratio to provide an air-fuel ratio error. In addition, an air-fuel ratio bias or offset value is added to the desired engine air-fuel ratio and the actual engine air-fuel ratio to improve catalyst efficiency. The air-fuel ratio bias is output of summing junction 248. Summing junction 204 outputs an air-fuel ratio error to proportional/integral controller 206. Proportional/integral (PI) controller 206 integrates the error and applies proportional and integral gains to the air-fuel ratio error to output a fuel flow control correction or adjustment to multiplication junction 208. The desired engine fuel mass flow rate from division junction 203 is multiplied by the fuel flow control correction at multiplication junction 208. The output of multiplication junction 208 is an adjusted fuel flow amount that is converted to a fuel injector pulse width at block 210 via a fuel injector transfer function. Block 210 outputs a fuel pulse width to drive engine fuel injectors (e.g., not shown in FIG. 2A, shown in FIGS. 1A-1B as fuel injectors 66) and the engine fuel injectors inject the adjusted fuel flow amount or corrected fuel flow amount to engine 10.

The engine 10 outputs exhaust gases to turbocharger turbine (e.g., 163/165 from FIG. 1A). The exhaust gases pass through turbocharger turbine 163/165 and into emissions control device 70. Emissions control device 70 may be a three-way catalyst. Exhaust gases pass from emissions control device 70 into emissions control device 72. Emissions control device 72 may be a three-way catalyst, a particulate filter, an oxidation catalyst, or a combination of catalyst and particulate filter. Processed exhaust gases flow to atmosphere after passing through emissions control device 72. As explained above, the turbocharger turbine 163/165, emissions control device 70, and emissions control device 72 may be part of an exhaust system of the engine and may be positioned along an exhaust passage of the engine.

Engine out exhaust gases may be sensed via oxygen sensor 91 to provide an actual engine air-fuel ratio. The actual engine air-fuel ratio may be used as feedback in control system 200. The actual engine air-fuel ratio is input to summing junction 204. Exhaust gases downstream of emissions control device 70 and upstream of emissions control device 72 may be sampled via oxygen sensor 90 to determine an air-fuel ratio within the exhaust system. Oxygen sensor 90 is positioned in an exhaust passage extending between emissions control device 70 and emissions control device 72. Alternatively, exhaust gases may be sampled via an oxygen sensor positioned downstream of emissions control device 72 (e.g., oxygen sensor 93 shown in FIG. 1A) in place of oxygen sensor 90. Output of oxygen sensor 90 or 93 is directed to switch 222 where it is then sent to summing junction 248 or to summing junction 232 based on the state of switch 222 which is determined via mode switching logic 224.

Mode switching logic 224 determines an engine operating state and it may change the position or state of switch 222 based on the engine operating mode. In particular, mode switching logic commands switch 222 to its base position when engine air flow is less than a threshold and when exhaust emissions devices are not requested to be regenerated. Mode switching logic 224 also commands valve 97 of FIG. 1A positioned in scavenge manifold bypass passage 98 closed via first actuator reference function 226 when engine air flow is less than a threshold and when exhaust emissions devices are not requested to be regenerated. Switch 222 is shown in its base position. In its base or first position, switch 222 sends oxygens sensor output data to summing junction 248. Air (e.g., blowthrough) is not supplied to the exhaust system (via the scavenge manifold bypass passage 98) when switch 222 is in the first position.

Mode switching logic 224 moves switch 222 to a second position as indicated by arrow 250 as directed by mode switching logic 224 when the engine air flow amount is greater than a threshold or when an exhaust emissions device is to be regenerated. In its second position, switch 222 directs output of oxygen sensor 90 to summing junction 232. Mode switching logic 224 opens valve 97 via a control signal output from first reference function 226 to valve 97 when the engine air flow amount is greater than a threshold or when an exhaust emissions device is to be regenerated. A rate of air flow provided to the exhaust system via scavenge manifold bypass passage 98 is open loop adjusted via second reference function 228. In one example, second reference function 228 outputs a valve position command, amount of intake and exhaust valve overlap (e.g., a crankshaft angular duration where both the intake and exhaust valves are simultaneously open), a boost pressure command, or other air flow adjustment command that is based on the engine air-fuel ratio and the mass flow rate of fuel and air combusted in the engine. For example, engine air-fuel ratio and mass flow rate of fuel and air combusted in the engine may be used to index a table or function that outputs a valve position command, amount of intake valve and exhaust valve overlap command, or boost pressure command. The rate of air flow provided to the exhaust system via the scavenge manifold is closed loop controlled via the air-fuel ratio input to summing junction 232. Valve opening amount, intake valve and exhaust valve overlap duration, boost pressure, or actuation of other actuators that may adjust air flow through scavenge manifold are adjusted at engine 10 according to the control adjustments output from summing junction 236. Thus, PI controller 234 adjusts engine air flow actuators via modifying the output of the second reference function 228.

Alternatively, the rate of air flow provided to the exhaust system via the scavenge manifold may be open loop controlled based on an estimate of soot mass stored in the emissions control device 72, or a temperature estimate of emissions control device 72, instead of oxygen sensor output. The soot estimate may be based on a pressure differential across emissions control device 72 or other engine operating conditions as known in the art. The temperature of emissions control device 72 may be estimated based on engine operating conditions such as engine speed and load. Further, the air flow rate may be closed loop controlled based on temperature of emissions control device 72 or pressure differential across emissions control device 72. In such examples, temperature or pressure differential is substituted for the oxygen sensor input at summing junction 232 and the air-fuel reference is replaced by a temperature or pressure reference. The air that flows to the exhaust system has not participated in combustion within the engine.

In one example, second reference function 228 outputs a control command to a variable valve timing actuator (e.g., 101 and 103 shown in FIG. 1B) to adjust an amount of valve opening overlap between an intake valve and scavenge exhaust valve of a same cylinder and thus the blowthrough air (e.g., an amount of blowthrough air) directed to emissions control device 72. Alternatively, second reference function 228 outputs a control signal to a valve, such as valve 32 of FIG. 1A, or valve 97 of FIG. 1A, each of which may adjust air flow to the exhaust system and emissions control device 72. Further, in some examples, second actuator reference function 228 outputs a control signal to a turbocharger wastegate actuator used to adjust boost pressure, which also may be applied to adjust air flow to emissions control device 72 via adjusting blowthrough air by raising and lowering boost pressure.

Timing of air delivery to the exhaust system from the scavenge manifold may be as follows: a stoichiometric or lean engine air-fuel ratio is richened to a rich of stoichiometry engine air-fuel ratio and air supplied to the exhaust system is delivered an engine cycle earlier to the downstream emissions device 72 before exhaust gases produced from the rich of stoichiometry engine air-fuel ratio reach the location of downstream emissions device 72. The air delivery to the exhaust system may be ceased before leaning the rich or stoichiometry engine air-fuel ratio.

When switch 222 is in its second position, oxygen sensor data from oxygen sensor 90 or 93 is output to summing junction 232 instead of summing junction 248. An actual exhaust gas air-fuel ratio from oxygen sensor 90 or 93 is subtracted from a desired exhaust gas air-fuel ratio provided by reference block 230. The desired exhaust gas air-fuel ratio output from reference block 230 may be different from the desired engine air-fuel ratio output from block 202. In one example, the desired exhaust gas air-fuel ratio is empirically determined and stored to a table that is indexed by engine speed and load. The desired exhaust gas air-fuel ratio output from block 230 may be a stoichiometric air-fuel ratio when the engine air-fuel ratio is rich at high engine speeds and loads where engine air flow is greater than the threshold. The desired exhaust air-fuel ratio output from block 230 may be lean of stoichiometry when an exhaust emissions device is requested to be regenerated while the engine air-fuel ratio is stoichiometric. Subtracting the actual engine exhaust gas air-fuel ratio from the desired engine exhaust gas air-fuel ratio provides an engine exhaust gas air-fuel ratio error that is input into a second PI controller 234. The exhaust gas air-fuel ratio error is operated on by PI controller and a control correction is supplied to summing junction 236.

Engine speed (N) and load values are used to index air-fuel bias values in table 244. The air-fuel bias values are empirically determined values that are stored in controller memory, and the air-fuel bias values provide an adjustment to air-fuel mixtures in the exhaust system for the purpose of improving catalyst efficiency. The air-fuel bias and the air-fuel ratio in the exhaust system are added to the desired engine air-fuel ratio and the engine output air-fuel ratio at summing junction 204 when switch 222 is in its base position. If switch 222 is not in its base position, the output of summing junction 248 may be adjusted to a predetermined value, such as zero.

In a first example of how control system 200 may operate, the control adjustment output from summing junction 236 may be an adjustment for an amount of intake and exhaust valve overlap that results in air passing through the engine without having participated in combustion within the engine. By increasing intake and exhaust valve overlap, air flow through the engine and into the exhaust system via the scavenge manifold bypass passage (e.g., 98 shown in FIG. 1A) may be increased. Conversely, by decreasing intake and exhaust valve overlap, air flow through the engine and into the exhaust system via the scavenge manifold bypass passage may be decreased.

In a second example of how control system 200 may operate, the control adjustment output from summing junction 236 may be an adjustment for the valve (e.g., 97 of FIG. 1A) positioned in the scavenge manifold bypass passage or a valve (e.g., 32 of FIG. 1A) positioned in a hot pipe (e.g., 30 of FIG. 1A). If engine 10 is operated at high loads using high boost pressure, intake manifold pressure may be greater than scavenge manifold pressure and exhaust system pressure so that fresh air that has not participated in combustion may pass through the hot pipe to the scavenge manifold and into the exhaust system to lean exhaust gases and provide oxygen to emissions control device 72. Alternatively, fresh air may pass through engine cylinders and into scavenge manifold 80 without having participated in combustion. The air may then be directed to emissions control device 72 via scavenge manifold bypass passage 98 to lean exhaust gases and provide oxygen to emissions control device 72. Air may be directed to emissions control device 72 in the same ways in response to a request to regenerate the emissions control device. In one example where the emissions control device is a particulate filter, a request to regenerate the particulate filter may be made in response to a pressure drop across the particulate filter exceeding a threshold pressure.

In this way, system 200 may control an engine air-fuel ratio observed by oxygen sensor 91 and an exhaust gas air-fuel ratio observed by oxygen sensor 90 or 93 without directing air to the exhaust system in a first mode. System 200 may also control an engine air-fuel ratio observed by oxygen sensor 91 and an exhaust gas air-fuel ratio observed by oxygen sensor 90 or 93 when air is directed to the exhaust system via a scavenge manifold. The amount of air provided to the exhaust system that does not participate in combustion within the engine may be closed loop feedback controlled based on output from oxygen sensor 90 or 93 and adjustments to valves coupled to a scavenge manifold, intake and exhaust valve overlap, or boost pressure.

Referring now to FIG. 2B, a block diagram of another embodiment of an engine air-fuel ratio control system 250 for an internal combustion engine 10 and an air-fuel ratio flowing into an exhaust gas emissions device is shown. At least portions of the control system 250 may be incorporated into a system as shown in FIGS. 1A-1B as executable instructions stored in non-transitory memory. Other portions of control system 250 may be actions performed via the controller 12 shown in FIGS. 1A-1B to transform states of devices or actuators in the real world. The engine air-fuel controller described herein may work in cooperation with sensors and actuators previously described.

A base desired engine air-fuel ratio is input at block 252. Block 252 includes empirically determined air-fuel ratios for a plurality of engine speed and load pairs. In one example, the empirically determined air-fuel ratios are stored in a table in controller memory. The table may be indexed via present engine speed and engine load values. The table outputs a desired engine air-fuel ratio (e.g., 14.6:1) for the present engine speed and load. Block 252 outputs the desired engine air-fuel ratio to summing junction 254 and division junction 253.

An engine air mass flow as determined via a mass air flow sensor or an intake manifold pressure sensor is input to control system 250 at block 251. The engine air mass flow is divided by the desired engine air-fuel ratio from block 252 at division junction 253 to provide a desired engine fuel mass flow rate. The engine fuel mass flow rate is output to multiplication junction 258.

At summing junction 254, the actual engine air-fuel ratio as determined from oxygen sensor 91 is subtracted from the desired engine air-fuel ratio to provide an air-fuel ratio error. In addition, an air-fuel ratio bias or offset value is added to the desired engine air-fuel ratio and the actual engine air-fuel ratio to improve catalyst efficiency. The air-fuel ratio bias is output of summing junction 278. Summing junction 254 outputs an air-fuel ratio error to proportional/integral controller 256. Proportional/integral (PI) controller 256 integrates the error and applies proportional and integral gains to the air-fuel ratio error to output a fuel flow control correction or adjustment to multiplication junction 258. The desired engine fuel mass flow rate from division junction 253 is multiplied by the fuel flow control correction at multiplication junction 258. The output of multiplication junction 258 is further adjusted at multiplication junction 259 in response to output from PI controller 274. This adjustment compensates for variation in the exhaust gas air-fuel ratio within the exhaust system as determined via oxygen sensor 90 or 93. The output of multiplication junction 259 (e.g., a fuel flow adjustment) is converted to a fuel injector pulse width at block 260 via a fuel injector transfer function. Block 260 outputs a fuel pulse width to drive engine fuel injectors (e.g., not shown in FIG. 2B, shown in FIGS. 1A-1B as items 66) and the engine fuel injectors inject the adjusted fuel flow amount or corrected fuel flow amount to engine 10.

The engine 10 outputs exhaust gases to turbocharger turbine (e.g., 163/165 from FIG. 1A). The exhaust gases pass through turbocharger turbine 163/165 and into emissions control device 70. Emissions control device 70 may be a three-way catalyst. Exhaust gases pass from emissions control device 70 into emissions control device 72. Emissions control device 72 may be a three-way catalyst, a particulate filter, an oxidation catalyst, or a combination of catalyst and particulate filter. Processed exhaust gases flow to atmosphere after passing through emissions control device 72.

Engine out exhaust gases may be sensed via oxygen sensor 91 to provide an actual engine air-fuel ratio. The actual engine air-fuel ratio may be used as feedback in control system 250. The actual engine air-fuel ratio is input to summing junction 254. Exhaust gases downstream of emissions control device 70 and upstream of emissions control device 72 may be sampled via oxygen sensor 90 to determine an air-fuel ratio within the exhaust system. Oxygen sensor 90 is positioned in an exhaust passage extending between emissions control device 70 and emissions control device 72. Alternatively, exhaust gases may be sampled via an oxygen sensor positioned downstream of emissions control device 72 (e.g., oxygen sensor 93 shown in FIG. 1A) in place of oxygen sensor 90. Output of oxygen sensor 90 or 93 is directed to switch 262 where it is then sent to summing junction 278 or to summing junction 272 based on the state of switch 262 which is determined via mode switching logic 264.

Mode switching logic 264 determines engine operating state and it may change the position or state of switch 262 based on the engine operating mode. In particular, mode switching logic commands switch 262 to its base position when engine air flow is less than a threshold and when exhaust emissions devices are not requested to be regenerated. Mode switching logic 264 also commands valve 97 of FIG. 1A positioned in scavenge manifold bypass passage 98 closed via first actuator reference function 266 when engine air flow is less than a threshold and when exhaust emissions devices are not requested to be regenerated. Switch 262 is shown in its base position. In its base or first position, switch 262 sends oxygens sensor output data to summing junction 278.

Mode switching logic 264 moves switch 262 to a second position as indicated by arrow 150 as directed by mode switching logic 264 when the engine air flow amount is greater than a threshold or when an exhaust emissions device is to be regenerated. In its second position, switch 262 directs output of oxygen sensor 90 to summing junction 272. Mode switching logic 264 opens valve 97 via a control signal output from first reference function 266 to valve 97 when the engine air flow amount is greater than a threshold or when an exhaust emissions device is to be regenerated. A rate of air flow provided to the exhaust system via scavenge manifold bypass passage 98 is open loop adjusted via second reference function 268. In one example, second reference function 268 outputs a valve position command, amount of intake and exhaust valve overlap (e.g., a crankshaft angular duration where both the intake and exhaust valves are simultaneously open), a boost pressure command, or other air flow adjustment command that is based on the engine air-fuel ratio and the mass flow rate of fuel and air combusted in the engine. For example, engine air-fuel ratio and mass flow rate of fuel and air combusted in the engine may be used to index a table or function that outputs a valve position command, amount of intake valve and exhaust valve overlap command, or boost pressure command.

Mode switching logic 264 may also control the path that air is directed to the exhaust system via the scavenge manifold bypass passage 98 in response to output of oxygen sensor 91, which is positioned in the exhaust system upstream of emissions control device 70. For example, if output of oxygen sensor 91 is a first value (e.g., a first air-fuel ratio estimate), air may be provided to the exhaust system at a location upstream of emissions device 72 and downstream of emissions device 70 via engine cylinders, the scavenge manifold, and the scavenge manifold bypass pipe. The air flow rate supplied to the exhaust system may be adjusted via adjusting valve timing. If output of oxygen sensor 91 is a second value (e.g., a second air-fuel ratio estimate), air may be provided to the exhaust system at the location upstream of emissions device 72 and downstream of emissions device 70 via the hot pipe 30, the scavenge manifold 80, and the scavenge manifold bypass pipe 98. The air flow rate supplied to the exhaust system may be adjusted via adjusting valve 32 and or valve 97. By selectively routing air that has not participated in combustion through different paths, it may be possible to deliver air to the exhaust system over a wider range of engine operating conditions so that engine emissions may be reduced.

When switch 262 is in its second position, oxygen sensor data from oxygen sensor 90 or 93 is output to summing junction 272 instead of summing junction 278. An actual exhaust gas air-fuel ratio from oxygen sensor 90 or 93 is subtracted from a desired exhaust gas air-fuel ratio provided by reference block 270. The desired exhaust gas air-fuel ratio output from reference block 270 may be different from the desired engine air-fuel ratio output from block 252. In one example, the desired exhaust gas air-fuel ratio is empirically determined and stored to a table that is indexed by engine speed and load. The desired exhaust gas air-fuel ratio output from block 270 may be a stoichiometric air-fuel ratio when the engine air-fuel ratio is rich at high engine speeds and loads. The desired exhaust air-fuel ratio output from block 270 may be lean of stoichiometry when an exhaust emissions device is requested to be regenerated while the engine air-fuel ratio is stoichiometric. Subtracting the actual engine exhaust gas air-fuel ratio from the desired engine exhaust gas air-fuel ratio provides an engine exhaust gas air-fuel ratio error that is input into a second PI controller 274. The exhaust gas air-fuel ratio error is operated on by PI controller 274, which integrates the air-fuel error and applies proportional and integral gains to the output of summing junction 272, and a control correction is supplied to multiplication junction 259.

Timing of air delivery to the exhaust system from the scavenge manifold may be as follows: a stoichiometric or lean engine air-fuel ratio is richened to a rich of stoichiometry engine air-fuel ratio and air supplied to the exhaust system is delivered an engine cycle or earlier to the downstream emissions device 72 before exhaust gases produced from the rich of stoichiometry engine air-fuel ratio reach the location of downstream emissions device 72. The air delivery to the exhaust system may be ceased before leaning the rich or stoichiometry engine air-fuel ratio.

Engine speed (N) and load values are used to index air-fuel bias values in table 276. The air-fuel bias values are empirically determined values that are stored in controller memory, and the air-fuel bias values provide an adjustment to air-fuel mixtures in the exhaust system for the purpose of improving catalyst efficiency. The air-fuel bias and the air-fuel ratio in the exhaust system are added to the desired engine air-fuel ratio and the engine output air-fuel ratio at summing junction 254 when switch 262 is in its base position. If switch 262 is not in its base position, the output of summing junction 278 may be adjusted to a predetermined value, such as zero.

In this way, system 250 may control an engine air-fuel ratio observed by oxygen sensor 91 and an exhaust gas air-fuel ratio observed by oxygen sensor 90 or 93 without directing air to the exhaust system in a first mode. System 250 may also control an engine air-fuel ratio observed by oxygen sensor 91 and an exhaust gas air-fuel ratio observed by oxygen sensor 90 or 93 when air is directed to the exhaust system via a scavenge manifold. An amount of fuel delivered to the engine may be closed loop adjusted in response to an amount of air provided to the exhaust system that does not participate in combustion within the engine. The fuel injected to the engine may be adjusted based on output from oxygen sensor 90 or 93.

As one example, a technical effect of supplying air to an exhaust system at a location downstream of an emissions control device via a scavenge manifold, the air not having participated in combustion in an engine, the scavenge manifold in fluidic communication with a scavenge exhaust valve of a cylinder and an intake manifold, the cylinder including a blowdown exhaust valve in fluidic communication with a blowdown manifold; and adjusting an amount of fuel injected to the engine in response to output of a first oxygen sensor, the first oxygen sensor positioned in the exhaust system upstream of the emissions control device, is more precisely controlling the air-fuel ratio of exhaust downstream of the emissions control device for more efficient engine operation and reduced engine emissions. As another example, a technical effect of flowing air from an intake manifold through a plurality of engine cylinders to a junction of an exhaust passage and a bypass passage in response to a condition, the junction positioned along the exhaust passage between first and second emission control devices; and flowing exhaust gas to the first emission control device while flowing the air to the junction is increasing the amount of oxygen entering the second emission control device, thereby maintaining a stoichiometric mixture entering the second emission control device and thus, increasing function of the second emission control device and reducing engine emissions. In another example, this increased oxygen may help to regenerate and burn soot from the second emission control device and thus also result in increased function of the second emission control device and reduced emissions.

Now turning to FIG. 3A, graph 300 depicts example valve timings with respect to a piston position, for an engine cylinder comprising 4 valves: two intake valves and two exhaust valves, such as described above with reference to FIGS. 1A-1B. The example of FIG. 3A is drawn substantially to scale, even though each and every point is not labeled with numerical values. As such, relative differences in timings can be estimated by the drawing dimensions. However, other relative timings may be used, if desired.

Continuing with FIG. 3A, the cylinder is configured to receive intake via two intake valves and exhaust a first blowdown portion to a turbine inlet via a first exhaust valve (e.g., such as first, or blowdown, exhaust valves 8 shown in FIG. 1A), exhaust a second scavenging portion to an intake passage via a second exhaust valve (e.g., such as second, or scavenge, exhaust valves 6 shown in FIG. 1A) and non-combusted blowthrough air to the intake passage via the second exhaust valve. By adjusting the timing of the opening and/or closing of the second exhaust valve with that of the two intake valves, residual exhaust gases in the cylinder clearance volume may be cleaned out and recirculated as EGR along with fresh intake blowthrough air.

Graph 300 illustrates an engine position along the x-axis in crank angle degrees (CAD). Curve 302 depicts piston positions (along the y-axis), with reference to their location from top dead center (TDC) and/or bottom dead center (BDC), and further with reference to their location within the four strokes (intake, compression, power and exhaust) of an engine cycle.

During engine operation, each cylinder typically undergoes a four stroke cycle including an intake stroke, compression stroke, expansion stroke, and exhaust stroke. During the intake stroke, generally, the exhaust valves close and intake valves open. Air is introduced into the cylinder via the corresponding intake passage, and the cylinder piston moves to the bottom of the cylinder so as to increase the volume within the cylinder. The position at which the piston is near the bottom of the cylinder and at the end of its stroke (e.g. when the combustion chamber is at its largest volume) is typically referred to by those of skill in the art as bottom dead center (BDC). During the compression stroke, the intake valves and exhaust valves are closed. The piston moves toward the cylinder head so as to compress the air within combustion chamber. The point at which the piston is at the end of its stroke and closest to the cylinder head (e.g. when the combustion chamber is at its smallest volume) is typically referred to by those of skill in the art as top dead center (TDC). In a process herein referred to as injection, fuel is introduced into the combustion chamber. In a process herein referred to as ignition, the injected fuel is ignited by known ignition means, such as a spark plug, resulting in combustion. During the expansion stroke, the expanding gases push the piston back to BDC. A crankshaft converts this piston movement into a rotational torque of the rotary shaft. During the exhaust stroke, in a traditional design, exhaust valves are opened to release the residual combusted air-fuel mixture to the corresponding exhaust passages and the piston returns to TDC. In this description, the second exhaust (scavenge) valves may be opened after the beginning of the exhaust stroke and stay open until after the end of the exhaust stroke while the first exhaust (blowdown) valves are closed and the intake valves are opened to flush out residual exhaust gases with blowthrough air.

Curve 304 depicts a first intake valve timing, lift, and duration for a first intake valve (Int_1) while curve 306 depicts a second intake valve timing, lift, and duration for a second intake valve (Int_2) coupled to the intake passage of the engine cylinder. Curve 308 depicts an example exhaust valve timing, lift, and duration for a first exhaust valve (Exh_1, which may correspond to first, or blowdown, exhaust valves 8 shown in FIG. 1A) coupled to a first exhaust manifold (e.g., blowdown exhaust manifold 84 shown in FIG. 1A) of the engine cylinder, while curve 310 depicts an example exhaust valve timing, lift, and duration for a second exhaust valve (Exh_2, which may correspond to second, or scavenge, exhaust valves 6 shown in FIG. 1A) coupled to a second exhaust manifold (e.g., scavenge manifold 80 shown in FIG. 1A) of the engine cylinder. As previously elaborated, the first exhaust manifold connects a first exhaust valve to the inlet of a turbine in a turbocharger and the second exhaust manifold connects a second exhaust valve to an intake passage via an EGR passage. The first and second exhaust manifolds may be separate from each other, as explained above.

In the depicted example, the first and second intake valves are fully opened from a closed position at a common timing (curves 304 and 306), starting close to intake stroke TDC, just after CAD2 (e.g., at or just after intake stroke TDC) and are closed after a subsequent compression stroke has commenced past CAD3 (e.g., after BDC). Additionally, when opened fully, the two intake valves may be opened with the same amount of valve lift L1 for the same duration of D1. In other examples, the two valves may be operated with a different timing by adjusting the phasing, lift or duration based on engine conditions.

Now turning to the exhaust valves wherein the timing of the first exhaust valve and the second exhaust valve is staggered relative to one another. Specifically, the first exhaust valve is opened from a closed position at a first timing (curve 308) that is earlier in the engine cycle than the timing (curve 310) at which the second exhaust valve is opened from close. Specifically, the first timing for opening the first exhaust valve is between TDC and BDC of the power stroke, before CAD1 (e.g., before exhaust stroke BDC) while the timing for opening the second exhaust valve just after exhaust stroke BDC, after CAD1 but before CAD2. The first (curve 308) exhaust valve is closed before the end of the exhaust stroke and the second (curve 310) exhaust valve is closed after the end of the exhaust stroke. Thus, the second exhaust valve remains open to overlap slightly with opening of the intake valves.

To elaborate, the first exhaust valve may be fully opened from close before the start of an exhaust stroke (e.g., between 90 and 40 degrees before BDC), maintained fully open through a first part of the exhaust stroke and may be fully closed before the exhaust stroke ends (e.g., between 50 and 0 degrees before TDC) to collect the blowdown portion of the exhaust pulse. The second exhaust valve (curve 310) may be fully opened from a closed position just after the beginning of the exhaust stroke (e.g., between 40 and 90 degrees past BDC), maintained open through a second portion of the exhaust stroke and may be fully closed after the intake stroke begins (e.g., between 20 and 70 degrees after TDC) to exhaust the scavenging portion of the exhaust. Additionally, the second exhaust valve and the intake valves, as shown in FIG. 3A, may have a positive overlap phase (e.g., from between 20 degrees before TDC and 40 degrees after TDC until between 40 and 90 degrees past TDC) to allow blowthrough with EGR. This cycle, wherein all four valves are operational, may repeat itself based on engine operating conditions.

Additionally, the first exhaust valve may be opened at a first timing with a first amount of valve lift L2 while the second exhaust valve may be opened with a second amount of valve lift L3 (curve 310), where L3 is smaller than L2. Further still, the first exhaust valve may be opened at the first timing for a duration D2 while the second exhaust valve may be opened for a duration D3, where D3 is smaller than D2. It will be appreciated that in alternate embodiments, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blowdown exhaust gases in a cylinder) from residual exhaust gases at low pressure (e.g., exhaust gases that remain in the cylinder after blow-down) into the different passages. By conveying low pressure residual exhaust gases as EGR along with blowthrough air to the compressor inlet (via the EGR passage and second exhaust manifold), combustion chamber temperatures can be lowered, thereby reducing knock and spark retard from maximum torque. Further, since the exhaust gases at the end of the stroke are directed to either downstream of a turbine or upstream of a compressor which are both at lower pressures, exhaust pumping losses can be minimized to improve engine efficiency.

Thus, exhaust gases can be used more efficiently than simply directing all the exhaust gas of a cylinder through a single, common exhaust port to a turbocharger turbine. As such, several advantages may be achieved. For example, the average exhaust gas pressure supplied to the turbocharger can be increased by separating and directing the blowdown pulse into the turbine inlet to improve turbocharger output. Additionally, fuel economy may be improved because blowthrough air is not routed to the catalyst, being directed to the compressor inlet instead, and therefore, excess fuel may not be injected into the exhaust gases to maintain a stoichiometric ratio.

FIG. 3A may represent base intake and exhaust valve timing settings for the engine system. Under different engine operating modes, the intake and exhaust valve timing may be adjusted from the base settings. FIG. 3B shows example adjustments to the valve timings of the blowdown exhaust valve (BDV), scavenge exhaust valve (SV), and intake valve (IV) for a representative cylinder at different engine operating modes. Specifically, graph 320 illustrates an engine position along the x-axis in crank angle degrees (CAD). Graph 320 also illustrates changes to the timing of the BDV, IV, and SV of each cylinder for a baseline blowthrough combustion cooling (BTCC) mode with higher EGR at plot 322, a baseline BTCC mode with lower EGR at plot 324, a first cold start mode (A) at plot 326, a second cold start mode (B) at plot 328, a deceleration fuel shut-off (DFSO) mode at plot 330, a BTCC mode in an engine system without a scavenge manifold bypass passage (e.g., passage 98 shown in FIG. 1A), an early intake valve closing (EIVC) mode at plot 334, and a compressor threshold mode at plot 336. In the examples show in FIG. 3B, it is assumed that the SVs and BDVs move together (e.g., via a same cam of a cam timing system). In this way, though the SVs and BDVs may open and close at different timings relative to one another, they may be adjusted (e.g., advanced or retarded) together, by a same amount. However, in alternate embodiments, the BDVs and SVs may be controlled separately and thus may be adjustable separately from one another.

During the baseline BTCC mode with higher EGR, as shown at plot 322, the valve timings may be at their base settings. The SV and BDV are at full advance (e.g., as advanced as the valve timing hardware allows). In this mode, blowthrough to the intake via the SV may be increased by retarding the SV and/or advancing the IV (increases IV and SV overlap and thus blowthrough). By retarding the BDV and SV, EGR decreases, as shown at plot 324 in the baseline BTCC mode with lower EGR. As seen at plot 326, during the first cold start mode (A), the SV may be adjusted to an early open/high lift profile. During a second cold start mode (B), as shown at plot 328, the SV may be deactivated such that it does not open. Further, the IV may be advanced while the BDV is retarded, thereby increasing combustion stability.

During the DFSO mode, at plot 330, the BDV may be deactivated (e.g., such that it is maintained closed and does not open at its set timing). The IV and SV timings may maintain at their base position, or the SV may be retarded to increase overlap between the SV and IV, as shown at plot 330. As a result, all the combusted exhaust gases are exhausted to the scavenge exhaust manifold via the SV and routed back to the intake passage. Plot 334 shows the EIVC mode where the IV is deactivated and the exhaust cam is phased to the max retard. Thus, the SV and BDV are retarded together. As described further below with reference to FIG. 7A, this mode allows for air to be inducted into the engine cylinder via the SV and exhausted via the BDV. Plot 336 shows an example valve timing for a compressor threshold mode. In this mode, the intake cam of the IV is advanced and the exhaust cam of the SV and BDV is retarded to decrease EGR and reduce exhaust flow to the inlet of the compressor. More details on these operating modes will be discussed below with reference to FIGS. 4A-15.

Now turning to FIGS. 4A-4B, a flow chart of a method 400 for operating a vehicle including a split exhaust engine system (such as the system shown in FIGS. 1A-1B), where a first exhaust manifold (e.g., scavenge manifold 80 shown in FIG. 1A) routes exhaust gas and blowthrough air to an intake of the engine system and a second exhaust manifold (e.g., blowdown manifold 84 shown in FIG. 1A) routes exhaust to an exhaust of the engine system, under different vehicle and engine operating modes is shown. Instructions for carrying out method 400 and the rest of the methods included herein may be executed by a controller (such as controller 12 shown in FIGS. 1A-1B) based on instructions stored on a memory of the controller and in conjunction with signals received from sensors of the engine system, such as the sensors described above with reference to FIGS. 1A-1B. The controller may employ engine actuators of the engine system to adjust engine operation, according to the methods described below. For example, the controller may actuate various valve actuators of various valves to move the valves into commanded positions and/or actuate various valve timing actuators of various cylinder valves to adjust the timing of the cylinder valves.

Method 400 begins at 402 by estimating and/or measuring vehicle and engine operating conditions. Engine operating conditions may include a brake pedal position, acceleration pedal position, operator torque demand, battery state of charge (in a hybrid electric vehicle), ambient temperature and humidity, barometric pressure, engine speed, engine load, an amount of input to a transmission of a vehicle in which the engine is installed from an electric machine (e.g., electric machine 161 shown in FIG. 1B) or crankshaft of the engine, engine temperature, mass air flow (MAF), intake manifold pressure (MAP), oxygen content of intake air/exhaust gases at various points in the engine system, a timing of the cylinder intake and exhaust valves, positions of various valves of the engine system, a temperature and/or loading level of one or more emission control devices, pressures in the exhaust manifolds, exhaust runners, exhaust passage and/or intake passage, an amount of fuel being injected into engine cylinders, an operation state of an electric compressor (e.g., electric compressor 60 shown in FIG. 1A), a speed of the turbocharger, condensate formation at the turbocharger compressor, a temperature at the turbocharger compressor inlet and/or outlet, etc.

At 403, the method includes determining if the vehicle is operating in an electric mode. As explained above, in one embodiment, the vehicle may be a hybrid electric vehicle. A vehicle mode of operation may be determined based on the estimated operating conditions. For example, based at least on the estimated driver torque demand and the battery state of charge, it may be determined whether the vehicle is to be operated in an engine-only mode (with the engine driving the vehicle wheels), an assist mode (with the battery assisting the engine in driving the vehicle), or an electric-only mode (with only the battery driving the vehicle via an electric motor or generator). In one example, if the demanded torque can be provided by only the battery, the vehicle may be operated in the electric-only mode with the vehicle being propelled using motor torque only. In another example, if the demanded torque cannot be provided by the battery, the vehicle may be operated in the engine mode, or in the assist mode where the vehicle is propelled with at least some engine torque. The vehicle may accordingly be operated in the determined mode of operation. If it is confirmed at 403 that the vehicle is operating in the electric-only mode, the method continues to 405 to operate in the electric-only (e.g., electric) mode which includes propelling the hybrid vehicle via only motor torque (and not engine torque). Details on operating in the electric mode are discussed further below with reference to FIG. 14.

Alternatively, if the vehicle is not operating in the electric mode, or the vehicle is not a hybrid vehicle, the vehicle may be propelled with at least some (or all) engine torque and proceed to 404. At 404, the method includes determining if cold start conditions are met. In one example, a cold start condition may include the engine operating with an engine temperature below a threshold temperature. In one example, the engine temperature may be a coolant temperature. In another example, the engine temperature may be a temperature of a catalyst (e.g., of an emission control device, such as one of emission control devises 70 and 72 shown in FIG. 1A) positioned in the exhaust passage. If the engine is operating under the cold start condition, the method continues to 406 to operate in a cold start mode. Details on operating in the cold start mode are discussed further below with reference to FIG. 5.

Otherwise, if cold start conditions are not met (e.g., engine temperatures are above set thresholds), the method continues to 408. At 408, the method includes determining whether a deceleration fuel shut-off (DFSO) event is occurring (or whether the vehicle is decelerating). As one example, a DFSO event may be initiated and/or indicated when an operator releases an accelerator pedal of the vehicle and/or depresses a brake pedal. In another example, a DFSO event may be indicated when vehicle speed decreases by a threshold amount. The DFSO event may include stopping fuel injection into the engine cylinders. If the DFSO event is occurring, the method continues to 410 to operate in a DFSO mode. Details on operating in the DFSO mode are discussed further below with reference to FIG. 6.

If DFSO conditions are not met or DFSO is not occurring, the method continues to 412. At 412, the method includes determining if engine load is below a threshold load. In one example, the threshold load may be a lower threshold load at which a part throttle condition (e.g., when an intake throttle, such as throttle 62 shown in FIG. 1A is at least partially closed, such that it is not fully open) occurs and/or at which an engine idle condition (e.g., when the engine is idling) occurs. In some examples, the threshold load may be based on a load and/or throttle opening at which reverse flow may occur through the EGR passage (e.g., passage 50 shown in FIG. 1A) and scavenge exhaust manifold. Reverse flow may include intake air flowing from the intake passage, through the EGR passage and scavenge exhaust manifold and into the engine cylinders via the scavenge exhaust valves. If the engine load is below the threshold load (or the throttle is not fully open and thus at least partially closed), the method continues to 414 to operate in a part throttle mode. Details on operating in the part throttle mode are discussed further below with reference to FIGS. 7A-7B.

If engine load is not below the threshold load at 412, the method continues to 416. At 416, the method includes determining if an electric compressor in the engine system is operating. In one example, the electric compressor may be an electric compressor positioned in the intake passage, upstream of where the EGR passage (coupled to the scavenge manifold) couples to the intake passage and upstream of the turbocharger compressor (such as electric compressor 60 shown in FIG. 1A). As one example, the controller may determine that the electric compressor is operating when the electric compressor is being electrically driven by energy stored at an energy storage device (such as a battery). For example, an electric motor (coupled to the energy storage device) may drive the electric compressor and thus, when the electric motor is operating and driving the electric compressor, the controller may determine that the electric compressor is operating. The electric compressor may be turned on and driven by the motor and stored energy in response to a request for additional boost (e.g., a pressure amount above that which may be provided via the turbocharger compressor alone at a current turbocharger speed). If the electric compressor is being driven by the electric motor of the electric compressor, and thus operated, at 416, the method continues to 418 to operate in the electric boost mode. Details on operating in the electric boost mode are discussed further below with reference to FIG. 8.

If the electric compressor is not operating (e.g., not being driven by an electric motor coupled with the electric compressor), the method continues to 420. At 420, the method includes determining whether the compressor (e.g., turbocharger compressor 162 shown in FIG. 1A) is at an operational threshold. The operational threshold (e.g., limit) of the compressor may include one or more of an inlet temperature of the compressor being less than a first threshold temperature (which may be indicative of condensate forming at the compressor inlet), an outlet temperature of the compressor being greater than a second threshold temperature (where temperatures at or above this second threshold temperature may result in degradation of the compressor), and/or a rotational speed of the compressor (e.g., compressor speed which is also the turbocharger speed) being greater than a threshold speed (where speeds above this threshold may result in degradation of the compressor). When the compressor is operating above these operational thresholds, compressor degradation and/or reduced performance may occur. In another example, the method at 420 may additionally or alternatively include determining whether engine speed (RPM) or engine load are above respective thresholds. For example, the engine speed and/or load thresholds may be correlated to compressor operation such that when the engine is operating at these engine speed or engine load thresholds, the compressor may reach one or more of the above described operational thresholds. As such, at relatively high engine power, speed, and/or load, the compressor may reach one or more of the operational thresholds. If the compressor is at or above one of the operational thresholds, or the engine speed and/or load are at their respective upper thresholds, the method continues to 421 to operate in the compressor threshold mode (which may also be referred to herein as the high power mode). Details on operating in the compressor threshold mode are discussed further below with reference to FIG. 9.

If the compressor is not operating at one of the operational thresholds (or engine speed and/or load are below their upper thresholds), the method continues to 422. At 422, the method includes determining whether there is a low RPM transient tip-in condition. As one example, the low RPM transient tip-in condition may include when there is an increase in torque demand above a threshold torque demand while engine speed is below a threshold speed. For example, if a pedal position signal from an accelerator pedal is greater than a threshold (indicating that the accelerator pedal has been depressed by a threshold amount, thereby indicating a requested increase in torque output of the engine) while engine speed is below the threshold speed, the controller may determine that there is a low RPM transient tip-in condition. If it is determined that the conditions for the low RPM transient tip-in are met, the method continues to 423 to decrease the amount of opening of the BTCC valve (e.g., valve 54 shown in FIG. 1A) to increase the scavenge manifold pressure to a desired level, where the desired level is based on intake manifold pressure (MAP) and the variable cam timing (VCT) of the intake and exhaust valves. For example, the method at 423 may include the controller determining the desired scavenge manifold pressure based on an estimated or measured MAP and the current timings (e.g., opening and closing timings) of the intake and exhaust (e.g., scavenge and blowdown) valves. For example, when the BTCC valve is fully open, the scavenge manifold operates close to the compressor inlet pressure (e.g., ambient pressure). In this mode, EGR and blowthrough are higher, thereby leading to higher engine efficiency but little excess reserve throttling. Raising the desired (e.g., target) scavenge manifold pressure closer to MAP may decrease the EGR and blowthrough so more charge air is trapped in the cylinders. Thus, by using feedback on the pressure in the scavenge manifold, the BTCC valve can be modulated to reach the desired level of EGR. For example, the target scavenge manifold pressure for a given level of output torque may be mapped (e.g., in a table or map stored in the memory of the controller) vs. intake/exhaust valve VCT. In this way, the controller may use a stored relationship of scavenge manifold pressure vs. intake/exhaust valve VCT.

As one example, the controller may use a first look-up table stored in memory to determine the desired scavenge manifold pressure, with MAP and the intake and exhaust valve timings as the inputs and the desired scavenge manifold pressure as the output. The controller may then use a second look-up table, with the determined desired scavenge manifold pressure as the input and one or more of a desired BTCC valve position, a duration of fully closing the BTCC valve, or an amount of decreasing the amount of opening the BTCC valve as the output, to determine the commanded BTCC valve position. The controller may then send a signal to an actuator of the BTCC valve to move the BTCC valve into the desired position (e.g., fully closed or partially closed) and hold the BTCC valve in that position for the determined duration. As another example, the controller may make a logical determination (e.g., regarding a position of the BTCC valve) based on logic rules that are a function of MAP, intake valve timing, and exhaust valve timing. The controller may then generate a control signal that is sent to the actuator of the BTCC valve. In some embodiments, the method at 423 may include closing the BTCC valve until the desired scavenge manifold pressure is reached and then reopening the BTCC valve. In another example, the method at 423 may include modulating the BTCC valve between open and closed positions to maintain the scavenge manifold pressure at the desired pressure. The scavenge manifold pressure may be measured via one or more pressure sensors positioned in the scavenge manifold or exhaust runners of the scavenge exhaust valves and then the measured scavenge manifold pressure may be used, by the controller, as feedback to further adjust the position of the BTCC valve to maintain the scavenge manifold at the desired scavenge manifold pressure. In some examples, the controller may use another look-up table with the measured scavenge manifold pressure and desired scavenged manifold pressures as inputs and an adjusted BTCC valve position as the output.

If there is not a low RPM transient tip-in condition at 422, the method instead continues to 424 of FIG. 4B. At 424, the method includes determining if an engine shutdown is expected or requested. The engine shutdown may include a key off shutdown (e.g., when the vehicle is put in park and an operator turns off the engine) or a start/stop shutdown (e.g., when the vehicle is stopped but not parked and the engine automatically shuts down responsive to stopping for a threshold duration). Thus, in one example, the controller may determine that a shutdown is requested in response to receiving a key off signal from an ignition of the vehicle and/or the vehicle being stopped for a threshold duration. If a shutdown request is received at the controller, the method continues to 426 to operate in a shutdown mode. Details on operating in the shutdown mode are discussed further below with reference to FIG. 15.

If a shutdown request is not received at 424, the method continues to 428. At 428, the method includes determining if blowthrough combustion cooling (BTCC) and EGR to the intake passage via the scavenge exhaust manifold (e.g., via scavenge manifold 80 and first EGR passage 50 shown in FIG. 1A) is desired or currently enabled. For example, if engine load is above a second threshold load (e.g., higher than the threshold load at 412), blowthrough and EGR to the intake passage may be desired and enabled. In another example, if the BTCC hardware of the engine (e.g., the BTCC valve 54 and/or scavenge exhaust valves 6 shown in FIG. 1A) is activated, then blowthrough and EGR may be enabled. For example, it may be determined that the BTCC hardware is activated if the scavenge exhaust valves are operating (e.g., not deactivated) and the BTCC valve is open or at least partially open. If blowthrough and EGR are desired and/or the BTCC hardware is already activated, the method continues to 430 to operate in the baseline BTCC mode. Details on operating in the baseline BTCC mode are described further below with reference to FIGS. 10-13.

Alternatively at 428, if BTCC is not desired, the method continues to 432 to deactivate the scavenge exhaust valves and operate the engine without blowthrough. For example, this may include maintaining the scavenge exhaust valves closed and routing exhaust gases from the engine cylinders to only the exhaust passage via the blowdown exhaust valves. As one example, the controller may send a deactivation signal to the valve actuators of the scavenge valves (e.g., exhaust valve timing actuator 103 shown in FIG. 1A) to deactivate the SVs of every cylinder. Further, the method at 431 may include not operating the engine with EGR. The method then continues to 434 to maintain the charge motion control valves (e.g., CMCVs 24 shown in FIG. 1A) open so no intake air is blocked when entering the engine cylinders via the intake runners. The method then ends.

Figure 5:
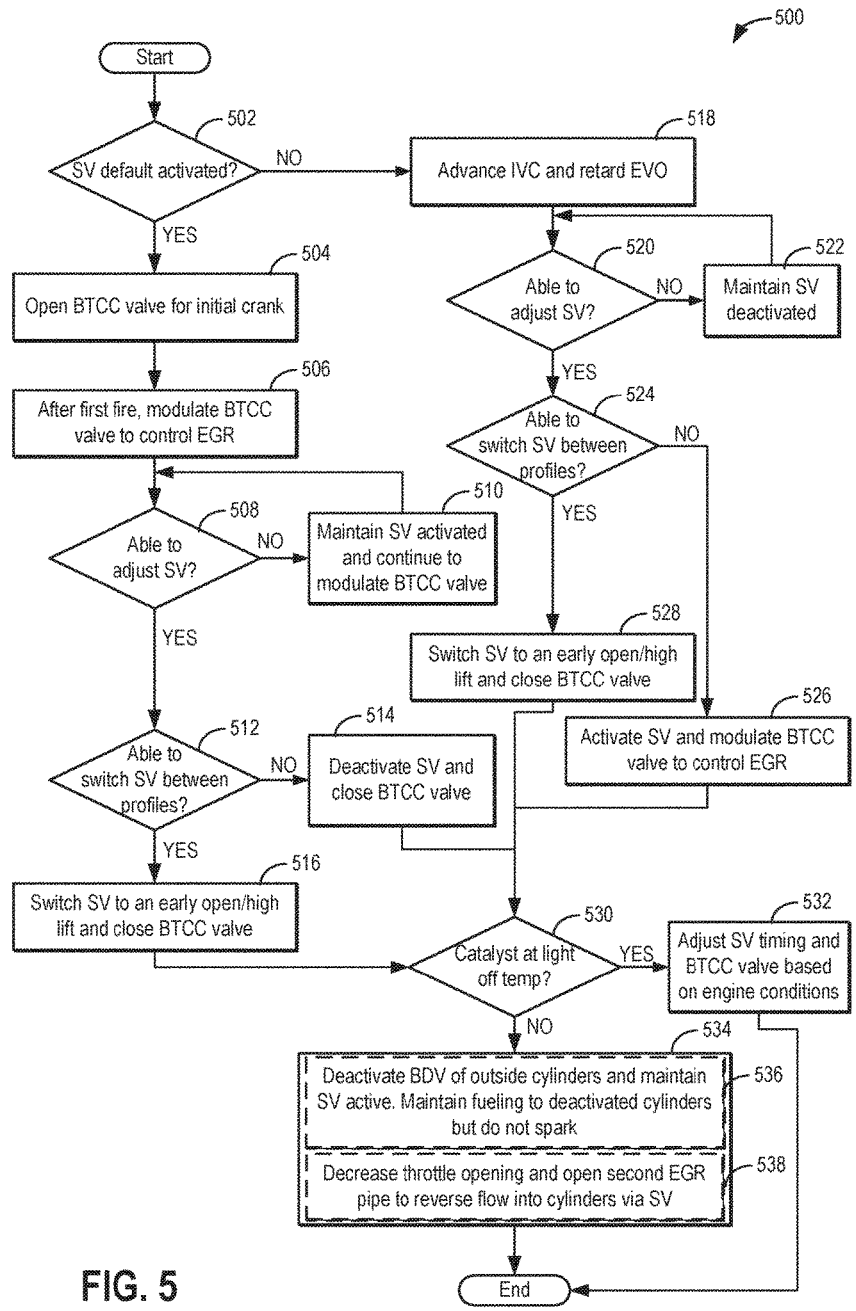
FIG. 5 shows a flow chart of a method for operating the split exhaust engine system in a cold start mode.

Turning now to FIG. 5, a method 500 for operating the engine system in a cold start mode is shown. Method 500 may continue from 406 of method 400, as described above. Method 500 begins at 502 by determining if the scavenge exhaust valves (e.g., second exhaust valves 6 shown in FIG. 1A) are default activated. The scavenge exhaust valves (SVs) may be default activated (e.g., opened) if the valve actuation mechanism (e.g., such as various valve lift and/or VCT mechanisms, as described above and shown as exhaust valve timing actuator 103 in FIG. 1B) of the scavenge exhaust valves is activated so that the scavenge exhaust valves will be actuated to open at their set timing. In some examples, the valve actuation mechanism may be deactivated so that the scavenge exhaust valves will not open (and instead remain closed) at their set timing in the engine cycle. The default setting may be the activation state of the scavenge exhaust valves at engine shutdown. In this way, the scavenge exhaust valves may either be default activated or deactivated upon engine startup and during the cold start. If the scavenge exhaust valves are default activated, the method continues to 504 to open the BTCC valve (e.g., valve 54 shown in FIG. 1A) for the initial crank (e.g., initial rotation of the crankshaft)

At 506, the method includes, after firing the first cylinder (e.g., after injecting fuel into and combusting the air and fuel within the first cylinder), modulating a position of the BTCC valve to control EGR through the EGR passage (e.g., passage 50 shown in FIG. 1A) and to the inlet of the compressor to a desired EGR flow amount. The desired EGR flow amount may be set based on engine operating conditions (e.g., such as engine load, MAF, combustion A/F, and/or set emissions thresholds). In one example, modulating the position of the BTCC valve may include switching the position of the BTCC valve between a fully open and fully closed position to maintain a desired EGR flow rate to the intake passage, upstream of the compressor. In an alternate example, where the BTCC valve is a continuously variable valve adjustable into more than two positions, modulating the position of the BTCC valve may include continuously adjusting the position of the BTCC valve into a plurality of positions between fully open and fully closed to maintain the desired EGR flow rate. Further, the method at 506 may include adjusting the position of the BTCC valve to prevent reverse flow through the EGR passage (e.g., intake air flow through the EGR passage from the intake passage to the scavenge exhaust manifold). For example, in response to a pressure of the scavenge exhaust manifold (e.g., second exhaust manifold 80 shown in FIG. 1A) being less than atmospheric pressure, the controller may actuate the BTCC valve into the fully closed position to block flow through the EGR passage. Thus, in some examples, the method at 506 may include the controller making a logical determination (e.g., regarding a position of the BTCC valve) based on logic rules that are a function of desired EGR flow and a pressure in the scavenge exhaust valve. As another example, the controller may include a look-up table stored in memory with desired EGR flow and scavenge manifold pressure as inputs and the BTCC valve position as the output. The controller may then generate a control signal that is sent to an actuator of the BTCC valve and results in adjusting the BTCC valve (e.g., adjusting a valve plate of the BTCC valve) into the determined position. If the BTCC valve is closed at 506, the method may further include, opening (or at least partially opening) the scavenge manifold bypass valve (e.g., in an engine system that includes a scavenge manifold bypass passage, such as passage 98 and SMBV 97 shown in FIG. 1A). In this way, excess pressure in the scavenge exhaust manifold may be relieved by flowing at least a portion of the exhaust gases exhausted from the scavenge exhaust valves to the scavenge exhaust manifold and then to the exhaust passage via the scavenge manifold bypass passage.

At 508, the method includes determining if it is possible to adjust the actuation state of the scavenge exhaust valves. As one example, VCT systems may include hydraulically controlled valves that rely on oil pressure to operate and switch an activation state and/or timing profile of the valves. As such, in some examples, only when oil pressure has reached a threshold pressure for switching a timing profile or activation state of the scavenge exhaust valves may the activation state of the scavenge exhaust valves be switched. In alternate embodiments, the scavenge exhaust valves may be adjusted in response to a different variable. If, at 508, it is determined that the activation state or timing profile of the scavenge exhaust valves cannot be adjusted, the method continues to 510 to maintain the scavenge exhaust valves activated and continue to modulate the BTCC valve. However, when the activation state of the scavenge exhaust valves is able to be switched, the method continues to 512 to determine whether the scavenge exhaust valves are able to switch between timing profiles. In one example, the scavenge exhaust valves may be switched between cam timing profiles (e.g., to adjust the opening and closing timing within the engine cycle) instead of being deactivated. If the scavenge exhaust valves cannot be switched between timing profiles, the method continues to 514 to deactivate the scavenge exhaust valves (e.g., deactivate the actuation/timing mechanisms of the scavenge exhaust valves such that the scavenge exhaust valves remain closed and do not open at their designated timing) and close (e.g., fully close) the BTCC valve. In some examples, the method at 514 may include holding some crank hydrocarbon emissions within the scavenge exhaust manifold until the BTCC valve may be opened again. Adjusting the scavenge exhaust valves and BTCC valve in this way, while the engine is warming up, may increase low load stability of the engine while reducing emissions during the cold start.

Alternatively at 512, if the scavenge exhaust valves may be switched between timing profiles, the method instead proceeds to 516. At 516, the method includes switching the timing of the scavenge exhaust valves to an early open/high lift profile (as shown at plot 326 of FIG. 3B, as described above) and closing the BTCC valve. In one example, the method at 516 may include advancing the timing (e.g., the opening timing) of the scavenge exhaust valves and/or increasing an amount of lift of the scavenge exhaust valves via switching the cam timing profile. In some examples, the method at 516 may further include opening the scavenge manifold bypass valve to allow exhaust gases to flow from the scavenge manifold to the exhaust passage while the BTCC valve is closed. In this embodiment of the method, the light-off catalyst may be disposed downstream of where the scavenge manifold bypass passage couples to the exhaust passage (such as emission control device 72 shown in FIG. 1A). Thus, in this embodiment, there may be no additional light-off catalyst (such as a three-way catalyst) upstream of where the scavenge manifold bypass passage couples to the exhaust passage.

Both of the methods at 516 and 514 continue to 530 to determine if a catalyst disposed in the exhaust passage is at (e.g., has reached) a light-off temperature. In one example, the catalyst may be part of one or more emission control devices positioned in the exhaust (e.g., such as emission control devices 70 and 72 shown in FIG. 1A). If the one or more catalysts are at or above their light-off temperatures (e.g., for efficient catalyst operation), the method continues to 532 to adjusting the timing of the scavenge exhaust valves based on engine conditions. In one example, the method at 532 may include adjusting the scavenge exhaust valves to their default, or baseline timing (e.g., such as the timing shown in FIG. 3A). The method then ends.

Alternately, if a temperature of the one or more catalysts is below the light-off temperature, the method continues to 534 to further adjust engine operation to increase the temperature of the catalyst. In one example, as shown at 536, the method at 534 may include deactivating the blowdown exhaust valves of the outside cylinders (e.g., blowdown exhaust valves 8 of cylinders 12 and 18 shown in FIG. 1A) while maintaining all the scavenge exhaust valves (for all the outside cylinders and inside cylinders) active. For example, the inside cylinders may be positioned physically between the outside cylinders. In this way, only exhaust gas from the inside cylinders may flow to the catalysts within the exhaust passage. The method at 536 may further include maintaining fueling to the cylinders with the deactivated blowdown exhaust valves but not sparking these cylinders (however spark is still delivered to the cylinders with the non-deactivated blowdown exhaust valves). In another example, as shown at 538, the method at 534 may include decreasing an opening of the throttle (e.g., throttle 62 shown in FIG. 1A) and opening a valve in a second EGR passage disposed between the scavenge exhaust manifold and the intake passage, downstream of the compressor and upstream of the throttle (e.g., second EGR passage 58 shown in FIG. 1A). This may cause intake air to flow in reverse through the second EGR passage, from the intake passage to the scavenge exhaust manifold, and into the cylinders via the scavenge exhaust valves. This may result in increasing the temperature of blowthrough gases that are directed to the exhaust via the blowdown exhaust manifold, thereby increasing the temperature of the catalyst. The method at 538 may be referred to herein as an idle mode and may be explained in more detail below with reference to FIGS. 7A-7B. At 534, one of the methods at 536 and 538 may be chosen based on the architecture of the engine system. For example, the method at 538 may be used if the system includes the second EGR passage. Otherwise, the method at 536 may be used. In alternate embodiments, the method at 534 may choose between the methods at 536 and 538 based on alternate engine operating conditions.

Returning to 502, if the scavenge exhaust valves are not default activated, then they may be default deactivated (and thus closed). In this case, the method continues to 518 to advance a timing of the intake valves (e.g., intake valves 2 and 4 shown in FIG. 1A) and retard a timing of the exhaust valves. Advancing the timing of the intake valves may be adjusting one or more valve timing mechanisms of the intake valves to advance a closing timing of the intake valves. Further, retarding the timing of the exhaust valves may include retarding an opening timing of both the scavenge exhaust valves and the blowdown exhaust valves together (e.g., when they are controlled via the cam timing system) or retarding the opening timing of only the blowdown exhaust valves. These adjustments may increase combustion stability during the cold start. At 520, the method includes determining if it is possible to adjust the activation state or timing profile of the scavenge exhaust valves (e.g., similar to the method at 508, as described above). If the scavenge exhaust valves cannot be adjusted (e.g., due to an oil pressure being below a threshold for switching the valve activation state), the method continues to 522 to maintain the scavenge exhaust valves deactivated. Otherwise, if the scavenge exhaust valves are able to be adjusted (or reactivated), the method continues to 524 to determine whether it is possible to switch the scavenge exhaust valves between timing profiles (e.g., similar to the method at 512, as described above) If the scavenge exhaust valves cannot be switched between profiles, the method continues to 526 to activate the scavenge exhaust valves and modulate the BTCC valve to control the EGR flow through the EGR passage and to the compressor inlet to a desired amount. However, if the scavenge exhaust valves are able to be switched between profiles, the method instead continues to 528 to switch the profile of the scavenge exhaust valves to an early open/high lift and close the BTCC valve, as described above at 516. Both of the method at 526 and 528 then continue to 530, as described above.

Figure 16:
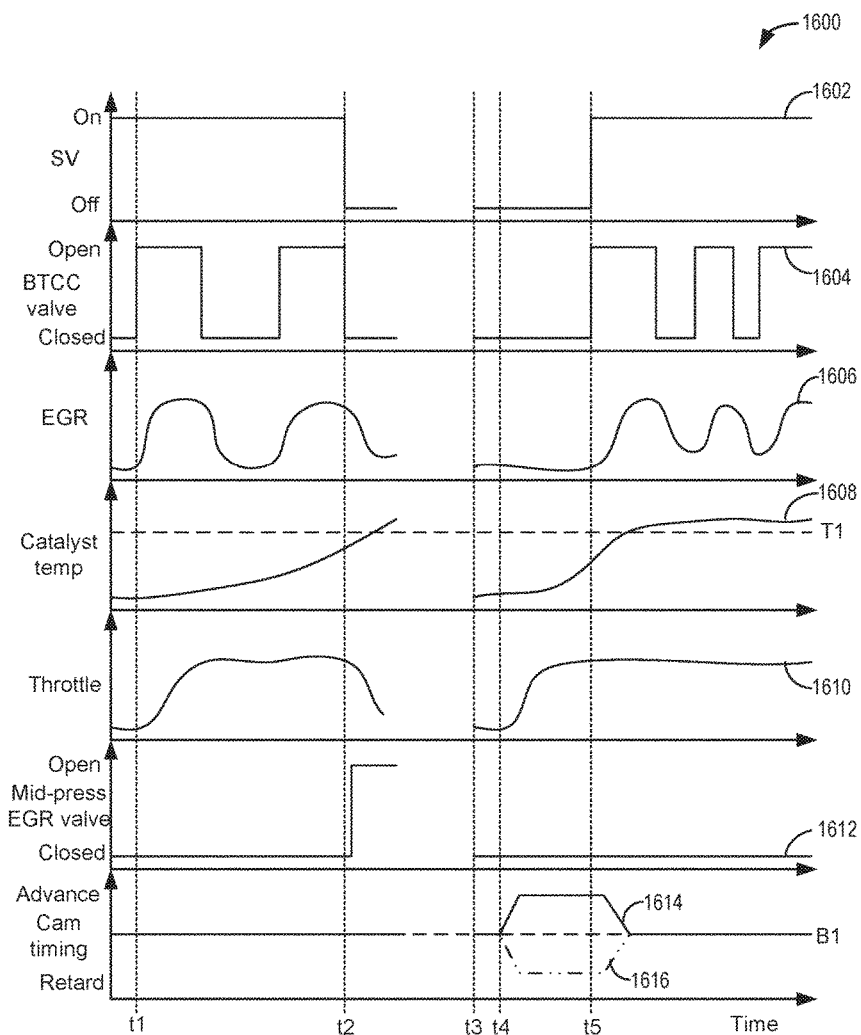
FIG. 16 shows an example graph of changes in engine operating parameters during operating the split exhaust engine system in a cold start mode.

FIG. 16 shows a graph 1600 of operating the split exhaust engine system in the cold start mode. Specifically, graph 1600 depicts an activation state of the scavenge exhaust valves (where on is activated and off is deactivated) at plot 1602, a position of the BTCC valve at plot 1604, EGR flow (e.g., an amount or flow rate of EGR flow through the EGR passage 50 and to the compressor inlet, as shown in FIG. 1A) at plot 1606, a temperature of an exhaust catalyst relative to a light-off temperature of the catalyst at plot 1608, a position of an intake throttle (e.g., throttle 62 shown in FIG. 1A) at plot 1610, a position of a second, mid-pressure EGR valve disposed in a second (e.g., mid-pressure) EGR passage (e.g., valve 59 in second EGR passage 58 shown in FIG. 1A) at plot 1612, and a cam timing of the intake valves at plot 1614 and the exhaust valves (which may include the blowdown exhaust valves and the scavenge exhaust valves when they are controlled on the same cam timing system) at plot 1616 relative to their base timings B1 (an example of the base cam timings of the intake and exhaust valves may be shown in FIG. 3B, as described above). All plots are shown over time along the x-axis.

Prior to time t1, the engine starts with the scavenge exhaust valves default activated. As such, the scavenge exhaust valves may open and close at their set timing in the engine cycle. At time t1, the BTCC valve is opened for the initial crank. As such, the EGR flow begins to increase after time t1 (and may increase and decrease over time with the opening and closing of the BTCC valve, respectively). After firing the first cylinder, the BTCC valve is modulated to control EGR flow to a desired level. Also between time t1 and time t2, the mid-pressure EGR valve is closed and both the intake and exhaust valve timings are at their base timings. At time t2, the scavenge exhaust valves can be adjusted (e.g., due to the oil pressure having reached a threshold to adjust the valves), so the scavenge exhaust valves are deactivated (e.g., turned off). After time t2, the catalyst temperature is still below its light-off temperature T1. Thus, the throttle opening is decreased and the mid-pressure EGR valve is opened to reverse flow through the system and send warmer blowthrough air to the catalyst within the exhaust passage. This may result in warming of the catalyst to a temperature above the light-off temperature T1.

During a different cold start in the split exhaust engine system, the engine may start with the scavenge exhaust valves default deactivated (e.g., off), as shown at time t3. At time t4, the intake cam timing of the intake valves is advanced and the exhaust cam timing of the blowdown exhaust valves is retarded (as shown at plot 328 in FIG. 3B, as described above). At time t5, in response to the scavenge exhaust valves being able to be adjusted, the scavenge exhaust valves are activated and the BTCC valve is modulated to adjust EGR flow.

In this way, adjusting an activation state of the scavenge exhaust valves while also controlling a position of the BTCC valve based on desired EGR flow and a pressure in the scavenge exhaust manifold, exhaust emissions during the engine cold start may be reduced. As described above with reference to FIGS. 5 and 16, a method may include, during a cold start, adjusting a position of a first valve (BTCC valve) disposed in an exhaust gas recirculation (EGR) passage based on an engine operating condition, the EGR passage coupled between a first exhaust manifold (scavenge manifold) coupled to a first set of exhaust valves (scavenge exhaust valves) and an intake passage, upstream of a compressor, while flowing a portion of exhaust gases to an exhaust passage including a turbine via a second set of exhaust valves (blowdown exhaust valves). A technical effect of adjusting the first valve and/or the first set of exhaust valves in response to an engine operating condition during a cold start is reducing cold start emissions while also aiding in engine warmup, such as increasing a temperature of the engine cylinders and/or pistons and/or one or more exhaust catalysts. In another embodiment, a method may include, in response to select engine operating conditions (such as a cold start and/or catalyst temperature below a light-off temperature), deactivating one or more valves of a set of first exhaust valves (blowdown exhaust valves) coupled to a first exhaust manifold coupled to an exhaust passage, while maintaining active all valves of a set of second exhaust valves (scavenge exhaust valves) coupled to a second exhaust manifold coupled to an intake passage via an exhaust gas recirculation (EGR) passage. A technical effect of deactivating one or more of the blowdown exhaust valves (such as the blowdown exhaust valves of the outside cylinders, as described above at 536 of method 500) during a cold start is increasing a temperature of the engine during the cold start and thus reducing engine emissions during the cold start (e.g., the catalyst may reach its light-off temperature more quickly than if all the blowdown exhaust valves stayed activated). In yet another embodiment, a method may include, while both a first exhaust valve (scavenge exhaust valve) and second exhaust valve (blowdown exhaust valve) of a cylinder are open, routing intake air through a flow passage (e.g., mid-pressure EGR passage) coupled between an intake passage and a first exhaust manifold coupled to the first exhaust valve; and further routing the intake air through the first exhaust valve, into the cylinder, and out of the second exhaust valve to a second exhaust manifold (blowdown exhaust manifold) coupled to an exhaust passage including a turbine. A technical effect of routing the intake air in this way while both the first and second exhaust valves are open, responsive to a temperature of a catalyst disposed in the exhaust passage, downstream of the turbine, being below a threshold temperature, is increasing the temperature of the blowthrough air to the exhaust passage and thus increasing the temperature of the catalyst. As a result, the catalyst may reach its light-off temperature more quickly and engine emissions during the cold start may be reduced.

Figure 6:
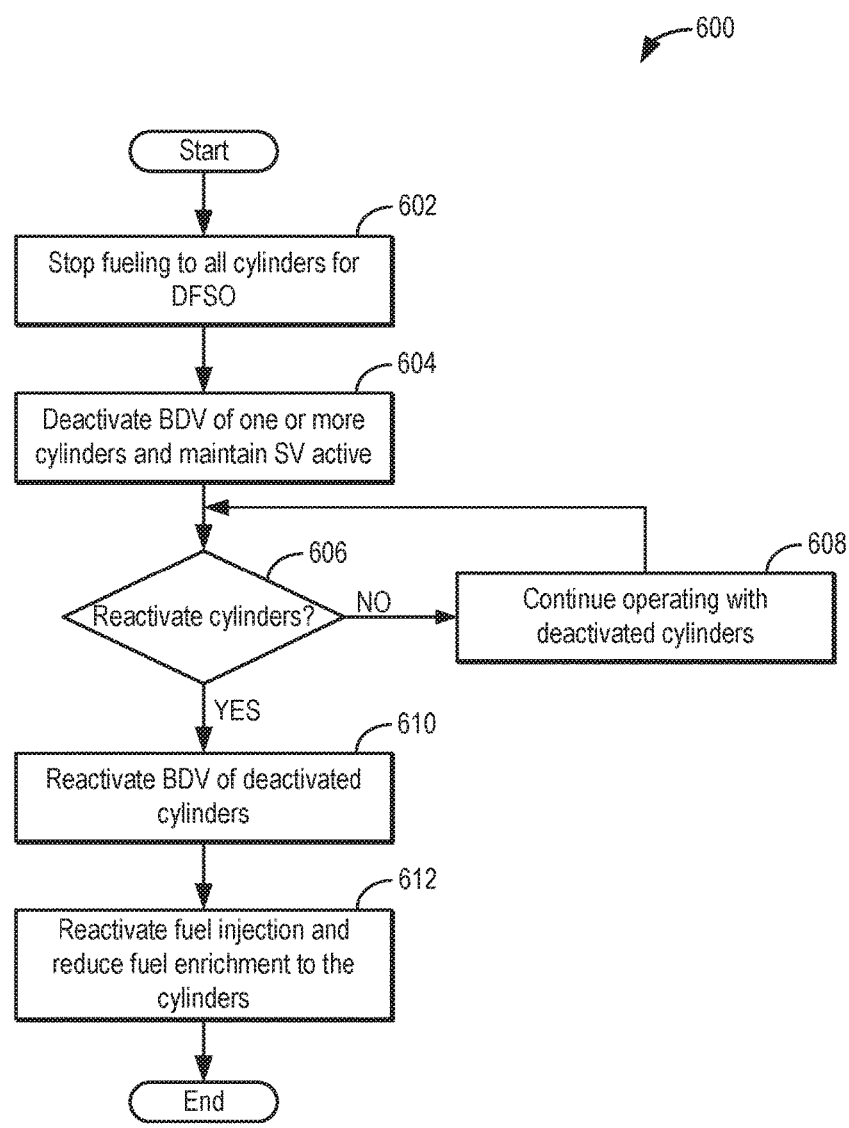
FIG. 6 shows a flow chart of a method for operating the split exhaust engine system in a deceleration fuel shut-off mode.

Turning now to FIG. 6, a method 600 for operating the engine system in a DFSO mode is shown. Method 600 may continue from 410 of method 400, as described above. At 602, the method includes stopping fueling to all cylinders to initiate the DFSO mode. The method continues to 604 to deactivate the blowdown exhaust valve (e.g., blowdown exhaust valves 8 shown in FIG. 1A) of one or more cylinders and maintain all the scavenge exhaust valves active. In one example, the method at 604 includes deactivating the blowdown exhaust valve of each and every cylinder so that no exhaust gas is directed to the catalyst(s) disposed within the exhaust passage. As a result, oxygen to the catalyst (e.g., three-way catalyst) may be reduced, thereby preserving catalyst function. In another example, the method at 604 includes deactivating the blowdown exhaust valve of a select number of cylinders (e.g., only a portion of all the engine cylinders). The select number may be based on pedal position (e.g., driver torque demand), estimated exhaust temperature, turbine speed of a turbine disposed in the exhaust passage, and/or deceleration rate of the vehicle (e.g., rate of decrease in vehicle speed). As one example, the method at 604 may include deactivating all BDVs (e.g., each BDV of each cylinder). However, in this example, the turbine may stop rotating and the catalyst may cool off. Thus, the methods at 602 and 604 may alternatively include maintaining active the BDVs of one or more cylinders and firing the corresponding one or more cylinders to reduce engine braking, spin up the turbine, and maintain catalyst temperature (e.g., without the catalyst temperature decreasing). The amount of spark on the firing cylinder(s) may be retarded to reduce torque and increase exhaust heat and engine efficiency. Then, the firing fraction (e.g., amount of cylinders fired with active BDVs) and spark for the firing cylinder(s) may be determined based on the pedal position, estimated exhaust temperature, and vehicle deceleration rate. As another example, if the turbine speed is below a threshold speed, the select number of BDVs to deactivate may be smaller than if the turbine speed were above the threshold speed. In this way, turbo lag following the DFSO event may be reduced. As an example, the controller may make a logical determination of the number of blowdown exhaust valves to deactivate at 604 and/or the number of cylinders to stop fueling as a function of turbine speed, pedal position, estimated exhaust temperature, and/or vehicle deceleration rate. The controller may then send a control signal to an actuator of the blowdown exhaust valves to deactivate the determined number of blowdown exhaust valves. As one example, each blowdown exhaust valve may include an actuator (such as actuator 103 shown in FIG. 1A) that may be used to deactivate and reactivate the associated blowdown exhaust valve.

At 606, the method includes determining if it is time to reactivate the blowdown exhaust valves of the deactivated cylinders. As one example, it may be determined that it is time to reactivate the deactivated blowdown exhaust valves at the end of the DFSO event, which may be indicated by an increase in vehicle speed and/or an depression of an accelerator pedal (e.g., a pedal position depressed beyond a threshold position). If it is not time to reactivate the blowdown exhaust valves, the method proceeds to 608 to continue operating the engine with the deactivated cylinders (e.g., cylinders with the deactivated blowdown exhaust valves). Otherwise, if the DFSO had ended and/or it is time to reactivate the cylinders, the method continues to 610 to reactivate the blowdown exhaust valves of the deactivated cylinders. As an example, reactivating the blowdown exhaust valves of the deactivated cylinders may include sending a signal to one or more valve actuation mechanisms of the blowdown exhaust valves to resume operating the blowdown exhaust valves at their set timing. Further, reactivating the blowdown exhaust valves may include sparking each deactivated cylinder following an intake valve closing event and then opening the deactivated blowdown exhaust valve. At 612, the method includes reactivating fuel injection to the cylinders and reducing the amount of fuel enrichment to the cylinders. In one example, this may include reducing the amount of fuel injected into the cylinders compared to a standard fuel injection amount following a DFSO event (e.g., without any blowdown exhaust valve deactivation). Since less oxygen was exhausted to the catalyst during DFSO due to the blowdown exhaust valve deactivation, less fuel enrichment may be needed following the DFSO event. As a result, fuel economy is increased vs. traditional DFSO.

Figure 17:
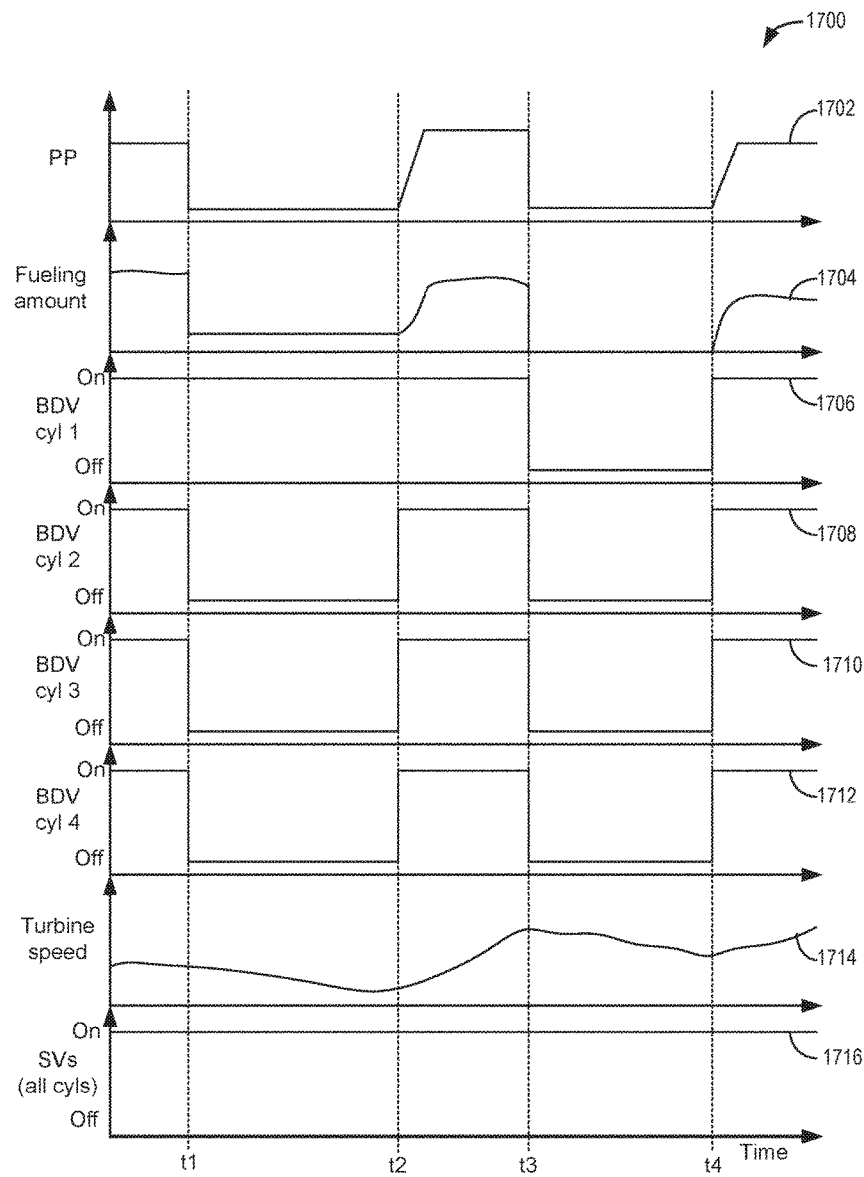
FIG. 17 shows an example graph of changes in engine operating parameters during operating the split exhaust engine system in a deceleration fuel shut-off (DFSO) mode.

FIG. 17 shows a graph 1700 of operating the split exhaust engine system in the DFSO mode. Specifically, graph 1700 depicts a pedal position (e.g., accelerator pedal position) at plot 1702, a fueling amount (injected into engine cylinders) at plot 1704, an activation state of a blowdown exhaust valve (BDV) of a first cylinder at plot 1706, an activation state of a blowdown exhaust valve (BDV) of a second cylinder at plot 1708, an activation state of a blowdown exhaust valve (BDV) of a third cylinder at plot 1710, an activation state of a blowdown exhaust valve (BDV) of a fourth cylinder at plot 1712, turbine speed at plot 1714, and an activation state of the scavenge exhaust valves of all cylinders (SVs) at plot 1716.

Prior to time t1, the pedal position is relatively steady and the BDVs and SVs of all four cylinders are activated (e.g., on). As such, each BDV may open and close according to a set timing in the engine cycle. At time t1, the pedal position decreases, indicating a deceleration event. A DFSO event is initiated by cutting off fueling to a portion of the engine cylinders. As shown at time t1, fueling may be stopped to cylinders 2-4, but maintained at cylinder 1 in order to maintain engine speed at a threshold speed, keep the turbine spinning, and maintain the catalyst warm and at stoichiometry (and thus fueling does not go to zero between time t1 and time t2). In response to the DFSO event and deactivating fueling to cylinders 2-4, the BDVs of cylinders 2, 3, and 4 are deactivated while the SVs remain activated for all cylinders. As a result, no exhaust gas travels to the exhaust passage from cylinders 2, 3, and 4. Instead, exhaust gases from the deactivated cylinders are directed to the intake passage via the SVs and scavenge exhaust manifold. At time t2, the pedal position increases and the DFSO event ends. The BDVs of cylinders 2, 3, and 4 are reactivated and the fueling amount to the cylinders may be reduced slightly compared to a DFSO event where no BDVs are deactivated.

At time t3, another DFSO event occurs. In response to the DFSO event and the turbine speed being at a higher level (e.g., higher than at time t1 during the first DFSO event), the BDVs of cylinders 1, 2, 3, and 4 are deactivated. Thus, all BDVs of all cylinders are deactivated (e.g., a greater number of BDVs are deactivated at time t3 than at time t1 due to the higher turbine speed at time t3). In response to the DFSO event ending at time t3, all the BDVs are reactivated.

In this way, in response to select engine operating conditions (such as a DFSO condition where fueling to engine cylinders is disabled), one or more valves of a set of first exhaust valves (BDVs) coupled to a first exhaust manifold coupled to an exhaust passage may be deactivated, while maintaining active all valves of a set of second exhaust valves (SVs) coupled to a second exhaust manifold coupled to an intake passage via an exhaust gas recirculation (EGR) passage. A technical effect of deactivating one or more BDVs during the DFSO event is reducing the amount of oxygen directed to a catalyst in the exhaust passage during DFSO. As a result, catalyst performance may be improved and engine emissions may be reduced. Further, reducing the amount of oxygen directed to the catalyst during DFSO may allow for less fuel enrichment to be used upon reactivation of the BDVs, at the conclusion of the DFSO event, thereby increasing fuel economy of the engine system.

Figure 7B:
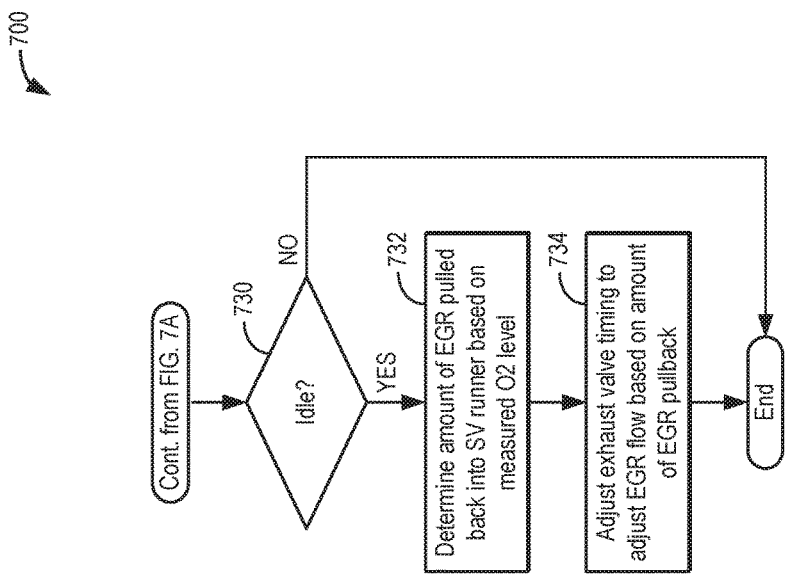

Turning now to FIGS. 7A-7B, a method 700 for operating the engine system in a part throttle mode is shown. Method 700 may continue from 414 of method 400, as described above. At 702, the method includes determining whether conditions are met for operating in a hot pipe mode. In one example, the split exhaust engine system may include a passage coupled between the scavenge exhaust manifold and the intake passage, downstream of an intake throttle (e.g., passage 30 shown in FIG. 1A, referred to herein as a hot pipe). However, in some embodiments, the split exhaust engine system may not include the hot pipe and thus hot pipe mode conditions would not be met. In one example, the hot pipe mode may be the default mode for best fuel economy when the engine is throttled (e.g., when the amount of throttle opening is less than wide open throttle). Conditions for entering the hot pipe mode include the engine system including the hot pipe and may additionally include the engine not being knock limited. For example, when engine load is below a lower threshold load (e.g., at very light loads) and no more EGR may be tolerated by the engine, the hot pipe valve may be closed and the hot pipe conditions may not be met. In another example, when engine load is above an upper threshold load (e.g., at high engine loads), knock may also occur and thus the hot pipe valve may be closed to push more EGR to the compressor inlet for engine cooling. Thus, the conditions for entering the hot pipe mode may include the engine not being knock limited (e.g., the chance of engine knocking being below a threshold) and being able to tolerate increased EGR.

If conditions are met for entering the hot pipe mode, the method continues to 704. At 704, the method includes closing (e.g., fully closing) the intake throttle, opening the BTCC valve (e.g., valve 54 shown in FIG. 1A), and opening the hot pipe valve (e.g., valve 32 shown in FIG. 1A). As a result, intake air from the intake passage, upstream of the compressor, may be directed into the EGR passage (e.g., first EGR passage 50 shown in FIG. 1A, through an EGR cooler (e.g., EGR cooler 52 shown in FIG. 1A), into the scavenge exhaust manifold, through the hot pipe (e.g., hot pipe 30 shown in FIG. 1A), into the intake manifold, downstream of the intake throttle, and into the engine cylinders. By passing through the EGR cooler, the intake air is heated before entering the engine cylinders. This may increase MAP, reduce intake pumping work of the engine, increase fuel economy, and decrease engine emissions. Further, this operation may also reduce scavenge manifold pressure, thereby increasing EGR flow. This intake air may then be combusted within the engine cylinders. A first portion of the combustion gases are then exhausted from the engine cylinders into the blowdown exhaust manifold via the blowdown exhaust valves. The first portion of combustion gases then travels through the exhaust passage to the turbine and one or more emission control devices. A second portion of the combustion gases are exhausted from the engine cylinders to the scavenge exhaust manifold via the scavenge exhaust valves. The second portion of exhaust gases are mixed with intake air within the scavenge exhaust manifold and then the mixture is routed to the intake manifold via the hot pipe. This mixing may reduce the impact of any one cylinder on EGR mixing and thus reduce pushback and manifold tuning.

At 706, the method includes adjusting (e.g., adjusting a position of) the hot pipe valve based on a desired MAP and adjusting exhaust cam timing based on engine load. As one example, the method adjusts the amount of opening (or position) of the hot pipe valve based on a desired MAP which may be determined based on engine operating conditions. For example, the controller may determine a control signal to send to the hot pipe valve actuator based on a determination of the desired MAP. The controller may determine the control signal through a determination that directly takes into account a determined desired MAP, such as increasing the amount of opening of the hot pipe valve with increasing desired MAP. The controller may alternatively determine the amount of opening of the hot pipe valve based on a calculation using a look-up table with the input being desired MAP and the output being the signal of the hot pipe valve position. As another example, the controller may make a logical determination (e.g., regarding an actuator of the cam timing system of the scavenge and blowdown exhaust valves) based on logic rules that are a function of engine load. The controller may then generate a control signal that is sent to an exhaust valve cam timing actuator. For example, as engine load increases, the cam timing of the exhaust valves (e.g., blowdown and scavenge exhaust valves if they are controlled via the same cam system) may be advanced.

At 708, the method includes determining whether conditions are met for a VDE mode where one or more blowdown exhaust valves are deactivated. In one example, conditions for entering the VDE mode may include one or more of a turbine speed above a threshold speed (e.g., that may be based on a speed at which turbo lag may occur upon an increase in torque demand) and/or engine load below a threshold load. If conditions for operating in the VDE mode are met, the method continues to 710. At 710, the method includes deactivating the blowdown exhaust valve of one or more cylinders. In one example, the number of cylinders for which the blowdown exhaust valve is deactivated may be based on engine load or torque demand. Specifically, as engine load decreases, the number of cylinders with deactivated blowdown exhaust valves may increase. For example, during a first condition, at part throttle when engine torque demand is below a lower threshold level, the blowdown exhaust valves of each and every engine cylinder may be deactivated. During a second condition, at the part throttle condition when engine torque demand is above the lower threshold level, only a portion of the blowdown exhaust valves of the engine cylinders may be deactivated, where the portion (and thus number of cylinder with deactivated blowdown exhaust valves) decreases as torque demand increases further above the lower threshold level. Additionally at 710, all scavenge exhaust valves of all the cylinders are maintained activated during the blowdown exhaust valve deactivation. Further, the method at 710 may include disabling spark to, but still fueling, the cylinders with deactivated blowdown exhaust valves. In this way, a firing decision can be made later in the engine cycle (since fuel is still injected). Further, fueling the deactivated cylinders and pumping the mixture to firing cylinders (e.g., cylinders without deactivated blowdown exhaust valves) may increase fuel evaporation on the firing cylinders (and thus reduce smoke). Further, the method at 710 may include maintaining the hot pipe valve open and the throttle closed during the blowdown valve deactivation. In some examples, the method at 710 may include reactivating the deactivated blowdown exhaust valves in response to an increase in torque demand over a threshold and/or the throttle being commanded to fully open (or the throttle opening). The method may then end.

Returning to 702, if the conditions for the hot pipe mode are not met, the method continues to 712 to determine whether the conditions are met for an EIVC (early intake valve closing) mode. In one example, the decision to enter the EIVC mode may be a function of MAP, engine speed, and engine temperature when engine load is below a threshold load. In one example, conditions for entering the EIVC mode may include engine load being below the threshold load and MAP being at atmospheric pressure (e.g., when the engine is not boosted). If conditions are met for the EIVC mode, the method continues to 714. At 714, the method includes deactivating the intake valves and opening the scavenge exhaust valves (at the set timing for each cylinder) to induct air into the engine cylinders via the scavenge exhaust valves, instead of via the intake valves. Specifically, the method at 714 may include deactivating the intake valves (e.g., both intake valves) of all engine cylinders so that no intake air is inducted into the cylinders via the intake valves. The method at 714 may further include opening (e.g., fully opening) the BTCC valve (if not already open).

At 716, the method includes retarding the blowdown exhaust valve and scavenge exhaust valve timing to reverse the direction of the intake air into the cylinder (e.g., to enter the cylinder via the scavenge exhaust valves). In one example, the method at 716 may include operating both the scavenge exhaust valves and blowdown exhaust valves at a maximum amount of exhaust cam retard (e.g., when controlled by the same cam system). As another example, with a cam in cam type control system, the method at 716 may include setting the closing of the blowdown exhaust valves to TDC and advancing the scavenge exhaust valves to decrease overlap between the scavenge and blowdown exhaust valve of each cylinder. As yet another example, with a cam profile switching system, the method at 716 may include changing the cam profiles (e.g., of the scavenge exhaust valves and blowdown exhaust valves) to a best timing for EIVC. As a result of this operation, in the EIVC mode, intake air is inducted to the engine cylinders from the intake passage via the EGR passage, scavenge exhaust manifold, and scavenge exhaust valves. Following combustion within the engine cylinders, exhaust gases are exhausted to the exhaust passage via the blowdown exhaust valves. In this way, pumping work of the cylinders during low load is reduced. Additionally, charge motion is improved for increased combustion stability.

Returning to 712, if conditions are not met for the EIVC mode, the method continues to 718 to determine whether conditions are met for closing a charge motion control valve (CMCV) coupled to an intake port of one intake runner of each cylinder (e.g., such as CMCVs 24 shown in FIG. 1A). In one example, the conditions for closing the CMCVs may include engine load being below a lower threshold load. If the conditions for closing the CMCVs are met, the method continues to 720 to close the CMCV coupled to the intake port of the intake valve of each cylinder (e.g., CMCVs 24 shown in FIG. 1A). For example, the method at 720 may include adjusting the CMCVs to at least partially block intake flow to the intake valves (e.g., one intake valve, as shown in FIG. 1A) of each cylinder. As a result, the turbulence (or swirl) of the intake air flow entering the engine cylinders may increase, thereby allowing the intake air to scavenge an increased amount of exhaust gas from inside the engine cylinders and to the scavenge exhaust manifold.

Otherwise, if conditions for closing the CMCV are not met (or they are already closed), the method continues to 722 to determine whether conditions are met for an idle boost mode. In one example, the condition for entering the idle mode includes when the engine is idling (e.g., when vehicle speed is below a threshold vehicle speed, which may be zero, and/or when engine speed is below a threshold engine speed). As one example, operating in the idle boost mode may allow for the scavenge manifold to be pressurized, thereby resulting in air purging some of the exhaust gases trapped in the cylinders. This may increase combustion stability and/or increasing warming of one or more catalysts disposed in the exhaust passage. Thus, in one example, a condition for entering the idle boost mode includes when there is a desired for purging gases from the engine cylinders. If the conditions are met at 722, the method continues to 724.

The method at 724 includes closing the turbocharger wastegate (e.g., wastegate valve 76 shown in FIG. 1A) to increase boost pressure and opening a valve in an idle boost pipe (e.g., valve 59 in second EGR passage 58 shown in FIG. 1A). The idle boost pipe may also be referred to as a second, or mid-pressure, EGR passage and may be coupled between the scavenge exhaust manifold and the intake passage, downstream of the compressor. By opening the valve in the idle boost pipe while engine load is below a threshold, intake air flow from downstream of the compressor may flow through the idle boost pipe and into the scavenge exhaust manifold. Then, while both the scavenge exhaust valve and blowdown exhaust valve of a same cylinder are open, the intake air from the idle boost pipe may flow into the engine cylinder via the scavenge exhaust valve and then to the exhaust passage via the blowdown exhaust valve. This may be referred to as blowthrough to the exhaust. This allows for purging of residual exhaust gases from within the engine cylinders to the exhaust passage at idle conditions, thereby increasing engine stability. The method at 724 may further include modulating the position of the BTCC valve to achieve a desired blowthrough amount during an overlap (e.g., opening overlap) period between the blowdown exhaust valve and scavenge exhaust valve of each cylinder. As one example, the desired blowthrough amount during the overlap period may be determined based on engine stability. For example, purging the exhaust gas from the cylinders may improve the burn rate and allow the cylinder to be fueled rich, which may increase stability. However, too much blowthrough may decrease fuel economy and reduce catalyst temperatures. For example, modulating the position of the BTCC valve includes opening and closing the BTCC valve to control a pressure of the scavenge exhaust manifold to level that produces a desired amount of blowthrough from the scavenge exhaust valve to the blowdown exhaust valve while the scavenge and blowdown exhaust valves are both open. As one example, decreasing the amount of opening of the BTCC valve and/or closing the BTCC valve for a longer duration may increase the pressure within the scavenge exhaust manifold (e.g., above the pressure in the exhaust passage) and increase the amount of blowthrough to the exhaust. As yet another example, the controller may open the scavenge manifold bypass valve (e.g., SMBV 97 shown in FIG. 1A) and adjust a position of the BTCC valve to increase the scavenge exhaust manifold pressure above the exhaust pressure. The excess air in the exhaust, created by the blowthrough, may allow for rich in-cylinder conditions that increase engine stability while still maintaining an overall stoichiometric air-fuel ratio downstream of a catalyst for reduced emissions. In some examples, the method at 724 may additionally include decreasing an amount of opening of (or fully closing) the intake throttle.

Continuing to 726, the method includes controlling an exhaust and intake valve overlap to regulate flow to the intake manifold from the scavenge exhaust manifold. For example, the method at 726 may include adjusting a timing of the scavenge exhaust valve and the intake valve of a cylinder to adjust an amount of valve overlap between the intake valve and scavenge exhaust valve and control a flow of air from the scavenge exhaust manifold to the intake manifold to a desired level. The desired level of air to the intake manifold may vary based on engine load. For example, in response to engine load increasing, the controller may send signals to timing actuators of the scavenge exhaust valves and intake valves to increase the amount of valve overlap between the intake valve and scavenge valve of each cylinder, thereby increasing the air flow from the scavenge manifold to the intake manifold. As one example, the controller may make a logical determination regarding the timing of the scavenge exhaust valve and intake valve based on logic rules that are a function of engine load. The controller may then generate a control signal that is sent to the intake and exhaust valve timing actuators.

The method may then proceed to 728 to further control boost and blowthrough to desired levels by one or more of activating (and operating) an electric compressor (e.g., electric compressor 60 shown in FIG. 1A), increasing the opening of the turbocharger wastegate, adjusting spark retard, and/or adjusting cam timing to adjust the scavenge valve and blowdown valve overlap. As one example, the method at 728 may include increasing an amount of opening of the wastegate in response to a request to decrease a pressure of the scavenge exhaust manifold and reduce an amount of blowthrough air flowing from the scavenge exhaust manifold to the blowdown exhaust manifold. As another example, operating the electric compressor may enhance the blowthrough capability by providing increased pressure to the scavenge exhaust manifold. In yet another example, increased spark retard may be used in response to a request for more blowthrough to the exhaust. In yet another example, in systems where the blowdown and scavenge exhaust valve overlap can be varied (e.g., via a cam in cam type system), the overlap may be increased to increase blowthrough.

Returning to 722, if the conditions are not met for the idle boost mode, the method continues to 730 of FIG. 7B. As one example, conditions may not be met for the idle boost mode if it is determined that it is time to measure EGR pullback into a scavenge exhaust valve runner. At 730, the method includes determining whether the engine is idling (e.g., if an accelerator pedal is not depressed and/or the engine is decoupled from the drive train of the vehicle). If the engine is idling, the method continues to 732 to determine the amount of EGR pulled back into the runner (e.g., exhaust port) of each scavenge exhaust valve based on an oxygen level measured via an oxygen sensor positioned in the exhaust runner of each scavenge exhaust valve. For example, there may be an oxygen sensor positioned in the exhaust runner of each scavenge exhaust valve of each cylinder (e.g., such as the oxygen sensors 38 shown in FIG. 1A) and thus, an output of each oxygen sensor may give an estimate of the EGR pullback for each cylinder. At 734, the method includes adjusting the exhaust valve timing (e.g., of the scavenge exhaust valves and blowdown exhaust valves) to adjust the EGR flow based on the estimated amount of EGR pullback at each engine cylinder. For example, this may include advancing the exhaust valve timing to increase EGR flow responsive to the estimated EGR pullback increasing. As another example, the controller may make a logical determination (e.g., regarding the exhaust valve timing) based on logic rules that are a function of EGR pullback in the scavenge valve exhaust runners. The controller may then generate a control signal that is sent to the exhaust valve timing actuators. Alternatively at 730, if the engine is not idling, the method ends.

Figure 18A:
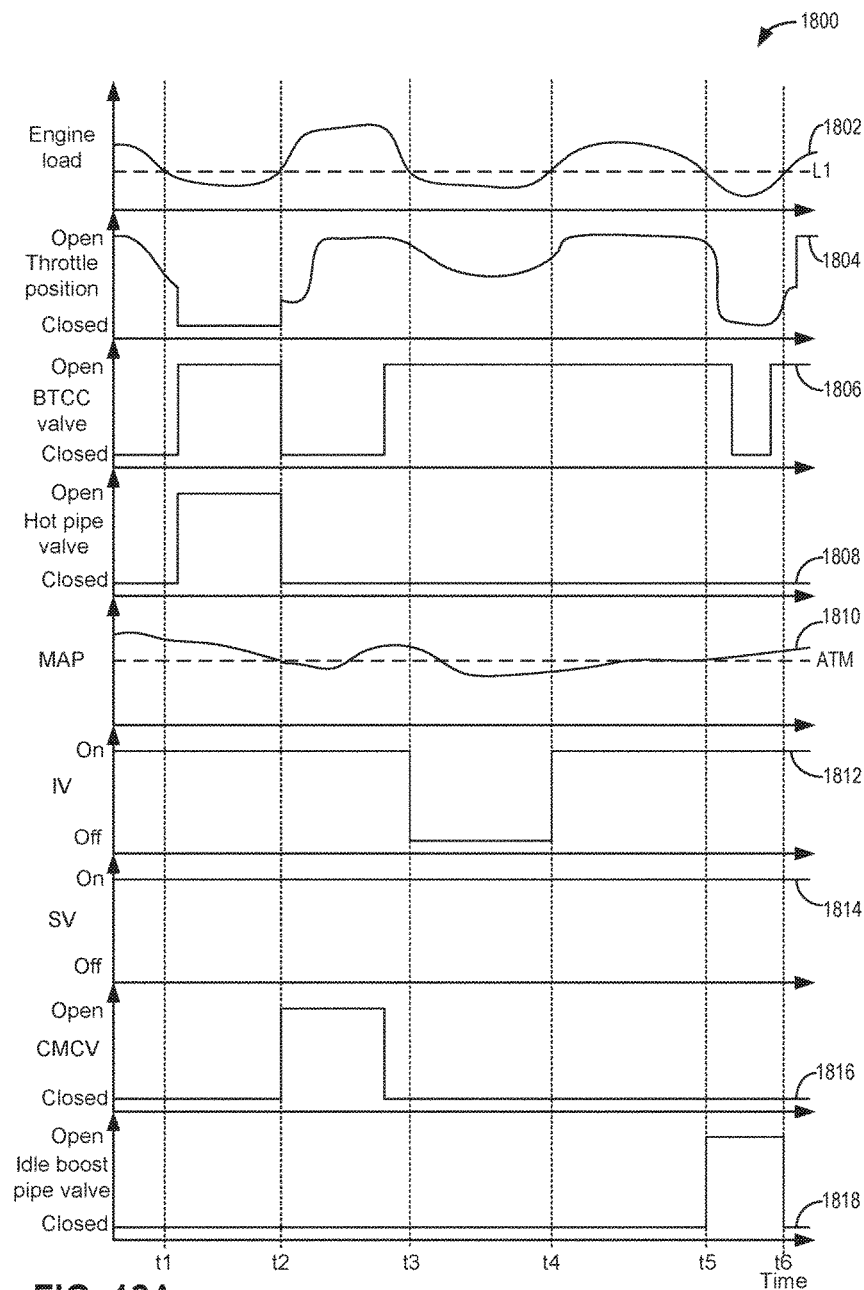
FIGS. 18A-18B show an example graph of changes in engine operating parameters during operating the split exhaust engine system in a part throttle mode.
Figure 18B:
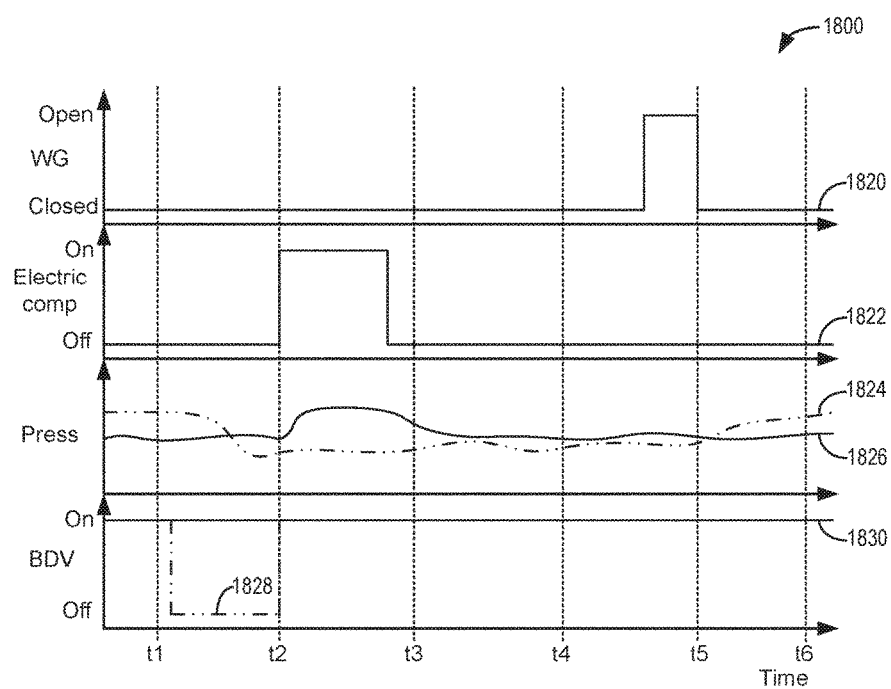

FIGS. 18A-18B show a graph 1800 of operating the split exhaust engine system in the part throttle mode. Specifically, graph 1800 depicts engine load at plot 1802, a position of an intake throttle (e.g., intake throttle 62 shown in FIG. 1A) at plot 1804, a position of the BTCC valve (e.g., valve 54 shown in FIG. 1A) at plot 1806, a position of the hot pipe valve (e.g., valve 32 shown in FIG. 1A) at plot 1808, MAP relative to atmospheric pressure (ATM) at plot 1810, an activation state (e.g., on and operating or off and disabled) of the intake valves at plot 1812, an activation state of the scavenge exhaust valves (e.g., valves 6 shown in FIG. 1A) at plot 1814, a position of the CMCVs (e.g., CMCVs 24 shown in FIG. 1A) at plot 1816, a position of the idle boost pipe valve (e.g., valve 59 shown in FIG. 1A) at plot 1818, a position of the turbocharger wastegate (e.g., wastegate 76 shown in FIG. 1A) at plot 1820, an operation state of an electric compressor (e.g., electric compressor 60 shown in FIG. 1A, where on indicates the electric compressor is being driven by an electric motor of the electric compressor), a pressure in the scavenge exhaust manifold (e.g., output from pressure sensor 34 shown in FIG. 1A) at plot 1824, a pressure at the compressor inlet of the turbocharger compressor (e.g., output from pressure sensor 31 shown in FIG. 1A) at plot 1826, an activation state of a first blowdown exhaust valve (BDV) of a first cylinder at plot 1828, and an activation state of blowdown exhaust valves (BDVs) of a second, third, and fourth cylinder at plot 1830. Though the valve positions may be shown as open and closed in FIGS. 18A-18B, in alternate embodiments, the valves may be adjusted into a plurality of positions between fully open and fully closed.

Prior to time t1, engine load is above a lower threshold load L1 and the throttle is fully open. An engine load below the lower threshold load L1 may be indicative of a low load condition where the throttle is at least partially closed (e.g., not fully open). Thus, prior to time t1, engine load is above this low load threshold. At time t1, engine load decreases below the lower threshold load and the throttle position decreases (e.g., the amount of opening of the throttle decreases). The engine may also be boosted at time t1 (e.g., MAP greater than ATM). In response to this low load condition at time t1, just after time t1 the throttle is closed, the BTCC valve is opened, and the hot pipe valve is opened to operate the engine in a hot pipe mode. The CMCVs may be maintained closed during the low load condition at time t1. Further, the BDV of the first cylinder may be deactivated just after time t1, responsive to the engine load being below the lower threshold load. However, the BDVs of the second, third, and fourth cylinder may remain activated. As a result no exhaust gas travels to the exhaust passage from the first cylinder while the BDV of the first cylinder is deactivated. In alternate embodiments, additional BDVs of additional cylinders may be deactivated in response to the low load condition. For example, if the engine load between time t1 and time t2 were further below the lower threshold load L1, the controller may deactivate the BDVs of two or more cylinders (instead of just one, as shown at time t1).

At time t2, engine load increases above the lower threshold load L1 and the throttle position gradually returns to the fully open position (e.g., wide open throttle). Thus, the hot pipe valve is closed at time t2. Further, the CMCVs are opened and all the BDVs are activated at time t2. Also at time t2, the electric compressor is turned on to increase boost. In response to the compressor inlet pressure being greater than the scavenge exhaust manifold pressure at time t2, the BTCC valve is closed. The BTCC valve is reopened prior to time t3. In response to the BTCC valve being opened, the CMCVs are closed.

At time t3, engine load again falls below the lower threshold load L1. In response to this low load condition and conditions for the EIVC mode being met, the intake valves of all the engine cylinders are deactivated at time t3. In some examples, the exhaust cam timing of the BDVs and SVs may be retarded to allow intake air to be inducted into the engine cylinders via the SVs and exhausted out of the BDVs during the EIVC mode. At time t4, engine load increases above the lower threshold load L1. As a result, the intake valves are reactivated. Prior to time t5, the wastegate opens. In one example, the wastegate may open responsive to the turbine speed increasing above a threshold turbine speed. For example, a turbine speed over the threshold turbine speed may result in a compressor outlet temperature that is higher than an upper threshold (e.g., for reducing turbocharger degradation).

At time t5, engine load again falls below the lower threshold load L1. In response to this low load condition and conditions for the idle boost mode being met, the idle boost pipe valve is opened and the wastegate is closed. Additionally, the BTCC valve is modulated to achieve a desired blowthrough amount during the BDV and SV overlap period. At time t6, engine load increases above the lower threshold load and the idle boost pipe valve is closed.

In this way, reverse flow through the EGR passage to the engine cylinders via the scavenge exhaust valves at a part throttle condition, which may cause decreased mixing and cylinder balance, may be reduced. As one embodiment of a method during the part throttle condition, a method includes routing intake air from an intake passage to a first exhaust manifold (scavenge manifold) coupled to a first set of cylinder exhaust valves (scavenge exhaust valves) via an exhaust gas recirculation (EGR) passage; heating the intake air as it passes through an EGR cooler in the EGR passage; routing the heated intake air to an intake manifold, downstream of an intake throttle, via a flow passage (hot pipe) coupled between the first exhaust manifold and the intake manifold; and exhausting combustion gases via a second set of cylinder exhaust valves (blowdown exhaust valves) to a second exhaust manifold coupled to an exhaust passage. A technical effect of routing the intake air in this way, through the hot pipe, during a part throttle condition (or when engine load is below a threshold), is increasing mixing of EGR from each cylinder with incoming intake air, reducing pumping work of the cylinders, heating the intake air via the EGR cooler to increase MAP and further reduce intake pumping, and increasing fuel economy and reducing emissions. As another embodiment of a method during the part throttle condition, a method includes, in response to engine load below a threshold, deactivating all intake valves of an engine cylinder while operating a first exhaust valve (scavenge exhaust valve) coupled to an exhaust gas recirculation (EGR) passage coupled to an intake passage and a second exhaust valve (blowdown exhaust valve) coupled to an exhaust passage at different timings; and routing intake air from the intake passage, through the EGR passage, and into the engine cylinder via the first exhaust valve. A technical effect of deactivating all the intake valves during the part throttle condition is warming the intake air via an EGR cooler disposed in the EGR passage, reducing pumping work, and increasing fuel economy. As yet another embodiment of a method during the part throttle condition, a method includes, in response to engine load below a lower threshold load, adjusting a first set of swirl valves (e.g., CMCVs) coupled upstream of a first set of intake valves to at least partially block intake air flow to the first set of intake valves, where each cylinder includes two intake valves including one of the first set of intake valves and two exhaust valves. A technical effect of adjusting the first set of swirl valves to at least partially block the intake air flow to the first set of intake valves is increasing turbulence of intake air flow entering the cylinders via the first set of intake valves, thereby increasing the scavenging of the residual burned exhaust gases from the combustion chambers. As a result, engine emissions may be reduced and engine efficiency may be increased. As still another embodiment of a method during the part throttle condition, a method includes, in response to engine load below a threshold and while a first set of exhaust valves and second set of exhaust valves are open at a same time: routing intake air through a secondary flow passage (idle boost passage) coupled between an intake passage, downstream of a compressor, and a first exhaust manifold, the first exhaust manifold coupled to the first set of exhaust valves; heating the intake air routed through the secondary flow passage via an EGR cooler coupled to the first exhaust manifold; and routing the heated intake air through engine cylinders and to a second exhaust manifold, the second exhaust manifold coupled to the second set of exhaust valves and an exhaust passage including a turbine, via the first set of exhaust valves and the second set of exhaust valves. The technical effect of routing the intake air through the secondary flow passage in this way, during the engine load below the threshold, is enabling residual exhaust gas to be pushed out of the cylinder and into the exhaust passage prior to the closing of the second exhaust valve. As a result, engine efficiency and fuel economy may be increased, even at part throttle conditions.

Figure 8:
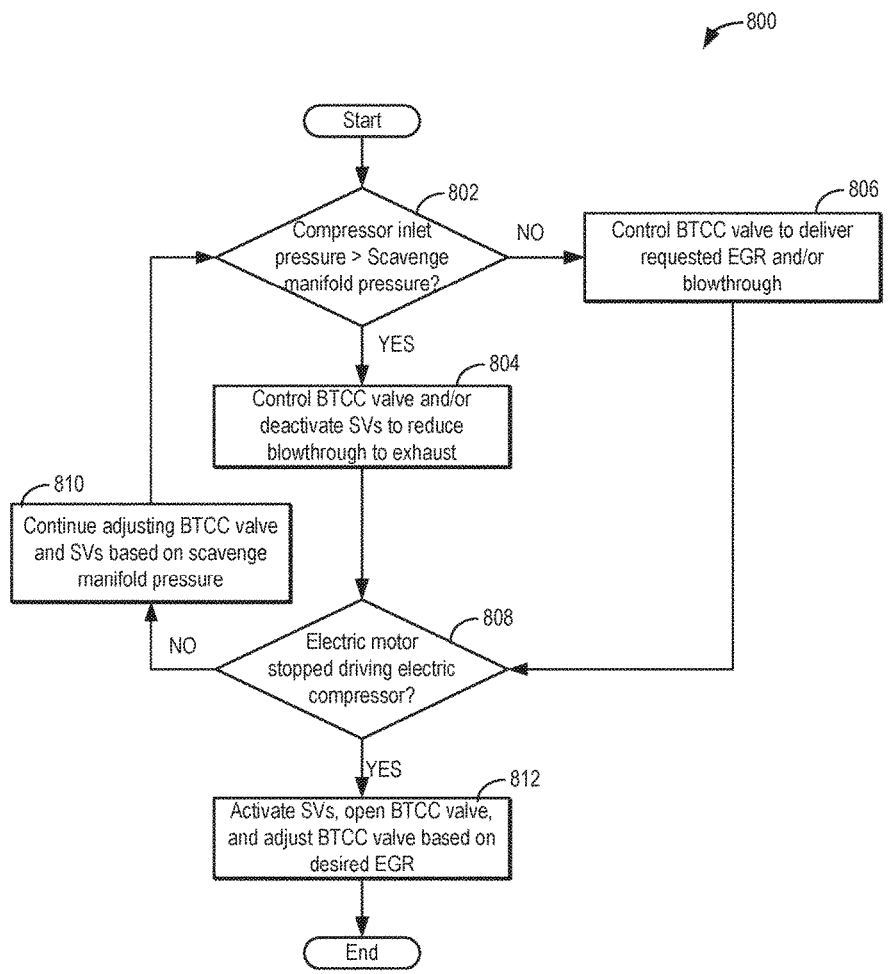
FIG. 8 shows a flow chart of a method for operating the split exhaust engine system in an electric boost mode.

FIG. 8 shows a method 800 for operating the engine system in an electric boost mode. Method 800 may continue from 418 of method 400, as described above. Thus, during method 800, the electric motor of the electric compressor may be driving the electric compressor (e.g., driving a rotor of the electric compressor to increase the pressure of the intake air). At 802, the method includes determining if a compressor inlet pressure is greater than a scavenge manifold pressure. As one example, the compressor inlet pressure may be a pressure at the inlet (or directly upstream of) the turbocharger compressor (e.g., compressor 162 shown in FIG. 1A). As another example, the compressor inlet pressure may be a pressure at an outlet of the EGR passage (e.g., where passage 50 couples to the intake passage in FIG. 1A, upstream of compressor 162). In one example, the compressor inlet pressure may be measured via a pressure sensor positioned in the intake passage upstream of the turbocharger compressor (e.g., pressure sensor 31 shown in FIG. 1A). In an alternate example, the compressor inlet pressure may be estimated by the controller based one or more alternate engine operating parameters (such as a pressure upstream of where the electric compressor couples to the intake passage). Additionally, the scavenge manifold pressure may be a pressure of the scavenge exhaust manifold (e.g., scavenge exhaust manifold 80 shown in FIG. 1A). In one example, the scavenge manifold pressure may be measured by a pressure sensor disposed in the scavenge manifold (e.g., pressure sensor 34 shown in FIG. 1A). In another example, the scavenge manifold pressure may be estimated or measured via a plurality of pressure sensors positioned in exhaust runners of the scavenge exhaust valves.

If the compressor inlet pressure is greater than the scavenge manifold pressure, the method continues to 804 to control (e.g., adjust) a position of the BTCC valve (e.g., valve 54 shown in FIG. 1A) and/or deactivate the scavenge exhaust valves (SVs, e.g., exhaust valves 6 shown in FIG. 1A) to reduce blowthrough to the exhaust. In one example, the method at 804 may include one or more of decreasing the amount of opening of the BTCC valve and deactivating the SVs in response to a pressure of the scavenge manifold being less than an inlet pressure of the turbocharger compressor while the electric motor is driving the electric compressor. In one example, the BTCC valve may be a two-position valve adjustable into a fully open and fully closed position. In another example, the BTCC valve may be a continuously adjustable valve adjustable into the fully open position, fully closed position, and a plurality of positions between fully open and fully closed. In this example, an amount of decreasing the amount of opening of the BTCC valve may increase as the amount the scavenge manifold pressure is below the compressor inlet pressure decreases. In another example, the controller may deactivate the SVs if the scavenge manifold pressure is a threshold amount below the compressor inlet pressure. As one example, the method adjusts the amount of reducing the opening of the BTCC valve based on the scavenge manifold pressure. For example, the controller may determine a control signal to send to the BTCC valve actuator (or the SV actuator which controls an activation state of the SVs) based on a determination of the scavenge manifold pressure. The controller may determine the position of the BTCC valve (open, closed, or a position between fully open and fully closed) through a determination that directly takes into account a determined scavenge manifold pressure, such as decreasing the amount of opening as the scavenge manifold pressure decreases. The controller may alternatively determine the position of the BTCC valve, or an activation state of the SVs, based on a calculation using a look-up table with the input being scavenge manifold pressure and the output being BTCC valve position (or SV activation state). As another example, the controller may make a logical determination (e.g., regarding a position of the BTCC valve) based on logic rules that are a function of scavenge manifold pressure. The controller may then generate a control signal that is sent to the actuator of the BTCC valve (and/or the SVs). Adjusting the BTCC valve and/or SVs in this way at 804 may reduce the reverse flow of gases from the scavenge manifold to the exhaust manifold and exhaust passage via the SVs and BDVs that may occur due to the scavenge manifold being at a lower pressure than the intake passage, at the compressor inlet.

The method continues to 808 to determine whether the electric motor has stopped driving the electric compressor (e.g., the electric compressor is no longer operating and boosting the intake air). If the electric motor has stopped driving the electric compressor, the method continues to 812 to reactivate the SVs (if they were deactivated at 804) and/or open the BTCC valve (if it was closed or the amount of opening was reduced at 804). The method at 812 further includes adjusting the position of the BTCC valve based on a desired EGR flow amount. As one example, the controller may make a logical determination (e.g., regarding a position of the BTCC valve) based on logic rules that are a function of a determined desired EGR flow amount. The controller may then generate a control signal that is sent to the actuator of the BTCC valve. Additionally or alternatively at 812, the method may include returning to 420 of method 400.

Returning to 808, if the electric motor is still driving the electric compressor, the method continues to 810 to continue adjusting the BTCC valve and SVs based on the scavenge manifold pressure, as described above and below. The method may then return to 802 to recheck the scavenge manifold pressure relative to the compressor inlet pressure. If the compressor inlet pressure is no longer greater than the scavenge manifold pressure, the method may continue to 806 to reopen the BTCC valve if it was closed and/or reactivate the SVs if they were deactivated. The BTCC valve is then controlled (e.g., adjusted) to deliver the requested (e.g., desired) EGR flow and/or blowthrough to the intake passage. In this way, reverse flow through the EGR passage, through the scavenge manifold, through the engine cylinders, and to the exhaust passage may be reduced while the electric compressor is operating to boost the intake air and when the intake air pressure at the compressor inlet (and where the EGR passage couples to the intake passage) is greater than the scavenge manifold pressure.

Figure 19:
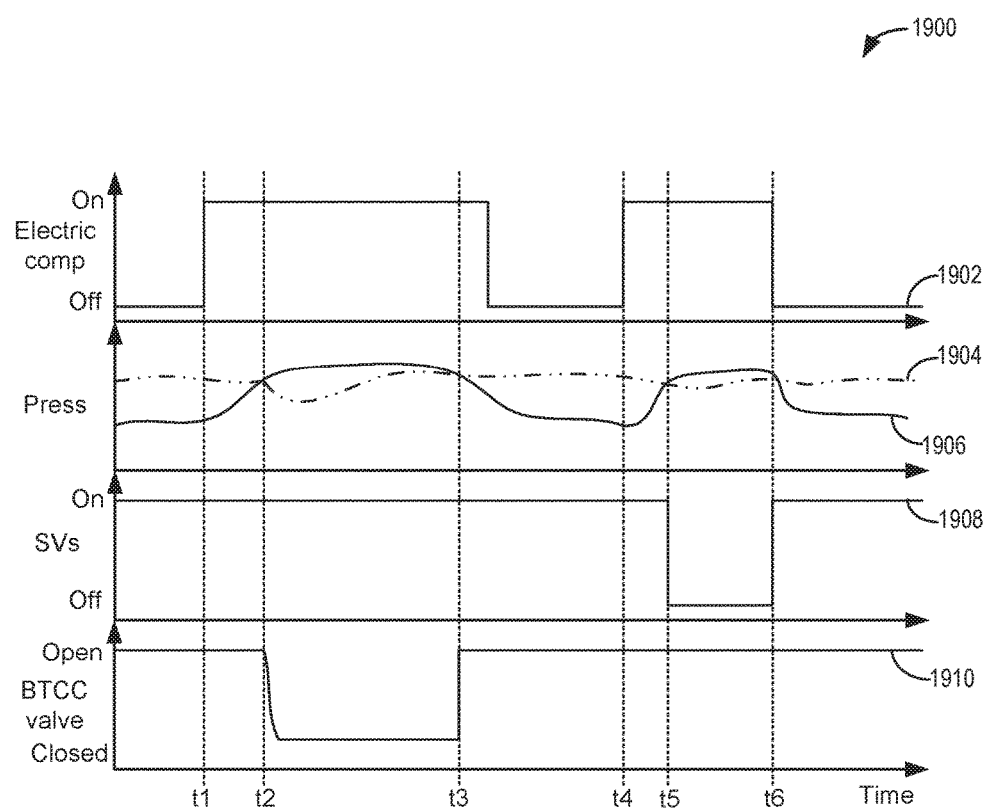
FIG. 19 shows an example graph of changes in engine operating parameters during operating the split exhaust engine system in an electric boost mode.

FIG. 19 shows a graph 1900 of operating the split exhaust engine system in the electric boost mode. Specifically, graph 1900 depicts an operation state of an electric compressor (e.g., electric compressor 60 shown in FIG. 1A) at plot 1902, a pressure in the scavenge exhaust manifold (e.g., output from pressure sensor 34 shown in FIG. 1A, referred to herein as the scavenge manifold pressure) at plot 1904, a pressure at the turbocharger compressor inlet (e.g., output from pressure sensor 31 shown in FIG. 1A, referred to herein as compressor inlet pressure) at plot 1906, an activation state of the scavenge exhaust valves (SVs) at plot 1908, and a position (open, closed, or somewhere between fully open and fully closed) of the BTCC valve (e.g., valve 54 shown in FIG. 1A) at plot 1910.

Prior to time t1 the electric compressor is off (e.g., not being driven by the electric motor) and the scavenge manifold pressure is greater than the compressor inlet pressure. At time t1, the electric motor begins driving the electric compressor and, as a result, the compressor inlet pressure (of the turbocharger compressor) begins increasing. However, since the scavenge manifold pressure is above the compressor inlet pressure between time t1 and time t2, the BTCC valve and SVs are adjusted based on a desired EGR flow amount and blowthrough level to the intake passage (e.g., based on engine operating conditions). At time t2, while the electric compressor is operating, the scavenge manifold pressure decreases below the compressor inlet pressure. In response, the amount of opening of the BTCC valve is decreased. As shown in FIG. 19, the amount of opening of the BTCC valve is decreased but the BTCC valve is not fully closed. In alternate embodiments, the BTCC valve may be fully closed or the SVs may be deactivated in response to the compressor inlet pressure increasing above the scavenge manifold pressure. At time t3, the scavenge manifold pressure increases above the compressor inlet pressure. As a result, the amount of opening of the BTCC valve is returned to a demanded level based on a desired EGR flow amount. In one example, as shown at time t3, this may include the fully open position. After time t3 (and after the BTCC valve is fully opened), the electric compressor is no longer driven by the electric motor.

At time t4, the electric compressor is again being driven by the electric motor. However, at this time, the compressor inlet pressure is less than the scavenge manifold pressure so the current position of the BTCC valve and the activation state of the SVs are maintained In response to the compressor inlet pressure increasing above the scavenge manifold pressure at time t5, the SVs (of all the engine cylinders) are deactivated. At time t5, electric compressor operation is stopped. In response to the electric compressor no longer being driven by an electric motor, the SVs are reactivated. Shortly thereafter, the compressor inlet pressure decreases below the scavenge manifold pressure.

In this way, the position of the BTCC valve and/or the activation state of the scavenge exhaust valves may be controlled in response to operation of an electric compressor, in order to reduce reverse from through the EGR passage, to the exhaust passage, via the scavenge exhaust valves. A technical effect of adjusting a position of the BTCC valve in response to an electric motor driving the electric compressor, based on the pressure in the scavenge exhaust manifold, is reducing reverse flow through the EGR passage to the exhaust passage via the scavenge exhaust while the compressor inlet pressure is greater than the scavenge manifold pressure, thereby increasing engine efficiency and reducing engine emissions.

Figure 9:
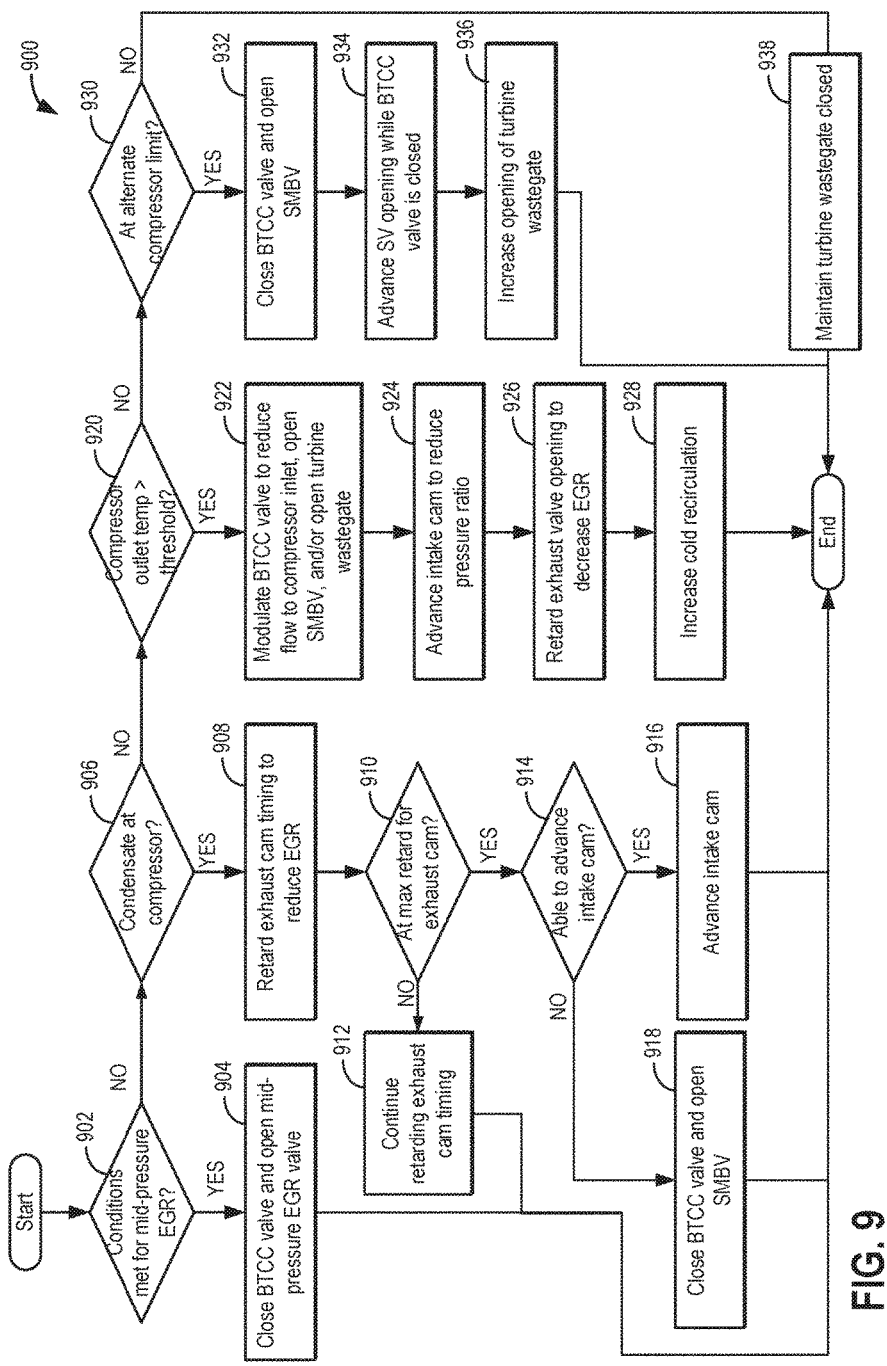
FIG. 9 shows a flow chart of a method for operating the split exhaust engine system in a compressor threshold mode.

FIG. 9 shows a method 900 for operating the engine system in a compressor threshold mode. Method 900 may continue from 421 of method 400, as described above. The method begins at 902 by determining whether conditions are met for mid-pressure EGR. In one example, the engine system may include a mid-pressure EGR passage (e.g., second EGR passage 58 shown in FIG. 1A) coupled between a low-pressure EGR passage (e.g., first EGR passage 50 shown in FIG. 1A) and an intake passage, downstream of the turbocharger compressor. Flowing exhaust gases from the scavenge manifold to the intake passage via the mid-pressure EGR passage may provide mid-pressure EGR to the intake system of the engine. Since the exhaust gases are delivered downstream of the compressor via the mid-pressure EGR passage, a temperature at the compressor and/or compressor speed may be reduced while exhaust gases are directed to the intake from the scavenge exhaust manifold via the mid-pressure EGR passage. In one example, the conditions for enabling mid-pressure EGR (e.g., conditions for flowing exhaust gases from the scavenge manifold to the intake passage, downstream of the compressor via the mid-pressure EGR passage) may include one or more of EGR demand (e.g., desired EGR flow) being over a threshold level (e.g., high EGR demand), no EGR cooler being present in the EGR system (e.g., no EGR cooler in the first EGR passage, such as EGR cooler 52 shown in FIG. 1A), no compressor bypass in the engine system (e.g., compressor recirculation passage 41 shown in FIG. 1A), a temperature of the exhaust from the scavenge exhaust valves being above an upper threshold temperature, and/or compressor flow conditions (e.g., if flow through the compressor is above an upper threshold, EGR cannot be added to the compressor inlet without degraded compressor operation/efficiency). If one or more of the conditions are met for enabling mid-pressure EGR, the method continues to 904 to close the BTCC valve (e.g., valve 54 shown in FIG. 1A) and open a mid-pressure EGR valve (e.g., valve 59 shown in FIG. 1A) disposed in the mid-pressure EGR valve. For example, opening the mid-pressure EGR valve may include a controller sending a single to an actuator of the mid-pressure EGR valve to fully open the mid-pressure EGR valve or increase the amount of opening of the mid-pressure EGR valve (e.g., from a fully closed position). Closing the BTCC valve may include fully closing the BTCC valve such that no exhaust gases are routed to the intake passage upstream of the compressor. In an alternate embodiment, the method at 904 may include opening the mid-pressure EGR valve and decreasing the amount of opening of the BTCC valve (but not fully closing) or maintaining the BTCC valve open. For example, in response to compressor surge conditions, both the BTCC valve and mid-pressure EGR valve may be opened. In yet another embodiment, the method at 904 may include increasing the amount of opening of the mid-pressure EGR valve while decreasing the amount of opening of the BTCC valve, where the amount of increasing and decreasing the amount of opening of these valves is based on the compressor conditions (e.g., inlet temperature, outlet temperature, and rotational speed). For example, the controller may determine a control signal to send to the actuators of the BTCC valve and mid-pressure EGR valve based on a determination of the compressor inlet temperature, compressor outlet temperature, and/or speed of the compressor. These compressor conditions may be measured via one or more sensors in the system (as shown in FIG. 1A), or determined based on operating conditions such as engine speed and load and/or combustion air-fuel ratio. The controller may determine the desired position of the BTCC and mid-pressure EGR valves through a determination that directly takes into account the determined compressor conditions, such as increasing the amount of opening of the mid-pressure EGR valve and decreasing the amount of opening of the BTCC valve with increasing compressor outlet temperature, increasing compressor speed, and/or decreasing compressor inlet temperature (e.g., above/below the thresholds described above with reference to 420 in FIG. 4A). The controller may alternatively determine the valve positions based on a calculation using a look-up table with the input being the compressor conditions and the output being the signal sent to the valve actuators which corresponds to a valve position of the BTCC valve and mid-pressure EGR valve. After 904, the method ends. In alternate embodiments, the method may continue from 904 to 906 to determine whether additional engine actuator adjustments are desired to move the compressor away from operating at the operational thresholds.

Returning to 902, if conditions are not met for mid-pressure EGR or additional actuator adjustments are desired to move the compressor away from operating at or above the operational thresholds, the method continues to 906. At 906, the method includes determining whether condensate is forming at the compressor (e.g., at the compressor inlet). In one example, it may be determined that condensate is forming at the compressor in response to an inlet temperature of the compressor (e.g., a temperature of the gases entering the compressor inlet) being below a first threshold temperature. In another example, it may be determined that condensate is forming, or expected to from, at the compressor when ambient humidity is above a threshold humidity value and/or when ambient temperature is below a threshold temperature. If condensate is forming (or expected to from, in some examples) at the compressor, the method continues to 908 to retard the exhaust valve cam (e.g., camshaft) timing to reduce the amount of EGR flowing from the scavenge manifold to the intake passage, upstream of the compressor, via the EGR passage. Retarding the exhaust valve cam timing may include retarding the timing of only the scavenge exhaust valves or both the scavenge and blowdown exhaust valves based on the valve timing hardware of the engine system. By retarding the timing of the scavenge exhaust valves, each scavenge exhaust valve may open and close later in the engine cycle (e.g., open at −90 crank angle degrees relative to TDC vs. approximately −135 crank angle degrees, as shown in FIG. 3B, as described above). As explained above with reference to FIGS. 1A-1B, various variable camshaft timing (VCT) system may be used to achieve the retarded timing of the scavenge exhaust valves (and possibly the blowdown exhaust valves). In one example, which may be the base engine system, both the scavenge exhaust valves and the blowdown exhaust valves are controlled together via a single camshaft system. Thus, retarding the exhaust cam results in retarding the timing of the scavenge exhaust valves and the blowdown exhaust valves (even though the opening and closing timing of the scavenge exhaust valves is different than the blowdown exhaust valves). In this way, the timing of the scavenge exhaust valves and blowdown exhaust valves are retarded by a same amount using the single cam system. In another example, the VCT system for the exhaust valves may include a CAM in CAM system where the timing of the scavenge exhaust valves and blowdown exhaust valves may be varied independently from set timings. In yet another example, the VCT system for the exhaust valves may include a multi-air type system for the scavenge exhaust valves. In this system, the opening timing and lift for the scavenge exhaust valves may be individually controlled separately from the blowdown exhaust valves (e.g., in this case, retarding only the scavenge exhaust valve timing). In still another example, the VCT system for the exhaust valves may include an electric valve lift control on the scavenge exhaust valves where the timing of the scavenge exhaust valves may be set separately from the blowdown exhaust valves (e.g., retarded while the timing of the blowdown exhaust valves is maintained).

At 910, the method includes determining whether the exhaust valve timing (of the scavenge exhaust valves) is at a maximum amount of retard. For example, the timing of the scavenge exhaust valves may only be retarded by a set number of crank angle degrees. Once the exhaust valve timing reaches the maximum amount of retard (e.g., a maximum amount of adjustment), the exhaust valve timing may not be retarded any further. If the timing of the scavenge exhaust valves has not reached the maximum amount of retard, while the condensate is at the compressor (e.g., when the compressor inlet temperature is below the first threshold temperature), the method continues to 912 to continue retarding the exhaust cam timing of the scavenge exhaust valves. In some examples, this may include retarding the exhaust cam to the maximum amount of retard. In other examples, this may include retarding the exhaust cam to an amount of retard that is less than the maximum amount of retard.

Alternatively at 910, if the maximum amount of retard for the exhaust cam has been reached and the scavenge exhaust valve timing cannot be retarded any further, the method continues to 914 to determine whether the intake cam of the intake valves may be advanced. Advancing the timing of the intake valves may result in more overlap between an intake valve and scavenge exhaust valve of each cylinder, thereby increasing an amount of blowthrough hot air recirculation to the compressor inlet. This may increase the compressor inlet temperature and reduce condensate formation at the compressor. The intake cam may be able to be advanced if it is not already advanced to its most advanced position (e.g., if it is not already at its maximum amount of advance). If the intake cam may be advanced to advance the timing of the intake valves, the method continues to 916 to advance the timing of the intake valves. This may include actuating the intake cam (e.g., intake cam 151 shown in FIG. 1B) via an intake valve timing actuator (e.g., intake valve timing actuator 101 shown in FIG. 1B) to advance the intake valve timing and thus open and close each intake valve sooner in the engine cycle. Otherwise, if the intake cam cannot be advanced any further, the method proceeds from 914 to 918 to close the BTCC valve. For example, the method at 918 may include fully closing the BTCC valve to block the flow of exhaust gases from the scavenge manifold (e.g., scavenge exhaust manifold) to the compressor inlet, thereby reducing low-pressure EGR and reducing condensate formation at the compressor. The method at 918 may further include opening a scavenge manifold bypass valve (SMBV) arranged in a bypass passage coupled between the scavenge manifold and the exhaust passage (e.g., SMBV 97 in bypass passage 98 shown in FIG. 1A). For example, the controller may send a signal to an actuator of the SMBV to open the SMBV in response to the BTCC valve closing. As a result, the exhaust gases from the scavenge manifold may be directed to the exhaust passage while the BTCC valve is closed. In alternate embodiments, the method at 918 may include decreasing the amount of opening of the BTCC valve (without fully closing) and increasing the amount of opening of the SMBV (without fully opening). In some examples, the amount of increasing the amount of opening of the SMBV may be approximately the same as (e.g., proportional to) the amount of decreasing the amount of opening of the BTCC valve.

Returning to 906, if condensate is not forming or expected to form at the compressor (e.g., if the compressor inlet temperature is not below the first threshold temperature), the method continues to 920 to determine whether the compressor outlet temperature is greater than a second threshold temperature. In one example, the compressor outlet temperature (e.g., a temperature of gases exiting the turbocharger compressor) may be measured via a temperature sensor positioned downstream of or at the outlet of the compressor (e.g., temperature sensor 43 shown in FIG. 1A). In other examples, the compressor outlet temperature may be estimated based on various other sensor outputs and engine operating conditions, such as the compressor inlet temperature and a rotational speed of the compressor or an intake manifold temperature. If the compressor outlet temperature is greater than the second threshold temperature, the method continues to 922.

At 922, the method includes modulating the BTCC valve to reduce the amount of exhaust flow to the compressor inlet from the scavenge manifold, opening the SMBV, and/or opening the turbine wastegate (e.g., wastegate 76 shown in FIG. 1A). In one example, modulating the BTCC valve may include switching the BTCC valve between fully open and fully closed positions to reduce the amount of exhaust gas flow to the compressor inlet via the EGR passage (compared to if the BTCC valve were left fully open) to a first level. Modulating the BTCC valve may include increasing the duration that the BTCC valve is closed compared to the duration that the BTCC valve is opened. The amount of modulating, or the average duration that the BTCC valve is closed, may be based on the compressor outlet temperature and/or a desired EGR flow amount. For example, as the compressor outlet temperature increases further above the second threshold temperature, the BTCC valve may be closed for a longer duration and/or the average amount of time that the BTCC valve is closed during a period of modulation may increase. In some examples, the method at 922 may include fully closing the BTCC valve. In yet another example, the method at 922 may include decreasing the amount of opening of the BTCC valve (e.g., to a position between fully open and fully closed, without modulating). The method at 922 may additionally include opening the SMBV or increasing the amount of opening of the SMBV while the BTCC valve is closed or modulated between open and closed. Additionally or alternatively, the method at 922 may include opening the turbine wastegate while modulating the BTCC valve. Opening the turbine wastegate valve reduces the turbocharger speed and thus may reduce the load on the compressor.

The method continues to 924 to advance the intake cam of the intake valves to reduce a pressure ratio across the compressor. For example, the intake cam may be advanced while the position of the BTCC valve is being modulated to reduce the EGR flow to the compressor inlet to the first level. The method then continues to 926 to retard the exhaust cam to retard the exhaust valve opening timing (e.g., of at least the scavenge exhaust valves) to further decrease EGR. For example, retarding the exhaust cam may result in the EGR flow to the compressor inlet to be reduced to a second level, lower than the first level. At 928, the method includes increasing cold recirculation via opening the BTCC valve. Since EGR flow is reduced because the exhaust valve (e.g., scavenge exhaust valve) timing was retarded at 926, opening the BTCC valve at 928 increases the flow of pressurized, colder air back to the compressor inlet, thereby decreasing the compressor temperature.

Returning to 920, if the compressor outlet temperature is not greater than the second threshold temperature, the method continues to 930 to determine whether the compressor is operating at an alternate compressor limit (e.g., threshold). For example, the compressor speed (e.g., rotational speed of the compressor) may be higher than a threshold speed which may result in degradation or reduced performance of the compressor. If the compressor is operating at the alternate limit, such as the compressor speed being higher than the threshold speed, the method continues to 932 to close the BTCC valve and open the SMBV. In one example, this may include fully closing the BTCC valve and fully opening the SMBV. In another example, the method at 932 may include decreasing the amount of opening of the BTCC valve (without fully closing) and increasing the amount of opening of the SMBV (without fully opening). The amount of decreasing the amount of opening of the BTCC valve and amount of increasing the amount of opening of the SMBV may be based on a desired scavenge manifold pressure, where the desired scavenge manifold pressure is based on the intake manifold pressure and a timing of the intake valves and exhaust valves. For example, the amount of overlap between when the scavenge exhaust valve and intake valve are both open may determine the time available for blowthrough air, but the difference in pressure between the intake manifold (e.g., MAP) and the scavenge manifold may determine the driving pressure for the blowthrough flow. When MAP is greater than scavenge manifold pressure, excess oxygen may flow to the exhaust passage via the scavenge manifold bypass passage. The desired driving pressure for the blowthrough flow may be based on desired oxygen levels in the exhaust, as discussed above with reference to FIGS. 2A-2B. Thus, as the intake manifold pressure increases, the desired scavenge manifold pressure may decrease for a set intake valve and exhaust valve timing and desired blowthrough amount. For example, the controller may determine the desired scavenge manifold pressure through a determination that directly takes into account a determined intake manifold pressure and current intake valve and exhaust vale timing and then determine corresponding positions of the BTCC valve and SMBV that may achieve the desired scavenge manifold pressure. As another example, the controller may make a logical determination (e.g., regarding a position of the BTCC valve and SMBV) based on logic rules that are a function of intake manifold pressure, intake valve timing, and exhaust valve timing. The controller may then generate a control signal that is sent to actuators of the BTCC valve and SMBV.

At 934, the method includes advancing the scavenge exhaust valve timing (e.g., the opening timing of the scavenge exhaust valves) while the BTCC valve is closed (or while the amount of opening of the BTCC valve is decreased). For example, the amount of advance used for the scavenge exhaust valve opening may increase as the desired blowthrough amount to the exhaust passage (e.g., to a second, downstream catalyst in the exhaust passage, as shown in FIG. 1A) decreases. The method then continues to 936 to increase the opening of the turbine wastegate, thereby decreasing turbocharger speed.

Alternatively at 930, if the compressor is not at an alternate limit, the method continues to 938 to maintain the turbine wastegate closed. In some embodiments, the default position of the turbine wastegate may be closed. The wastegate may then only be opened at high turbocharger speeds. The method at 938 may include returning to method 400 of FIGS. 4A-4B.

Figure 20:
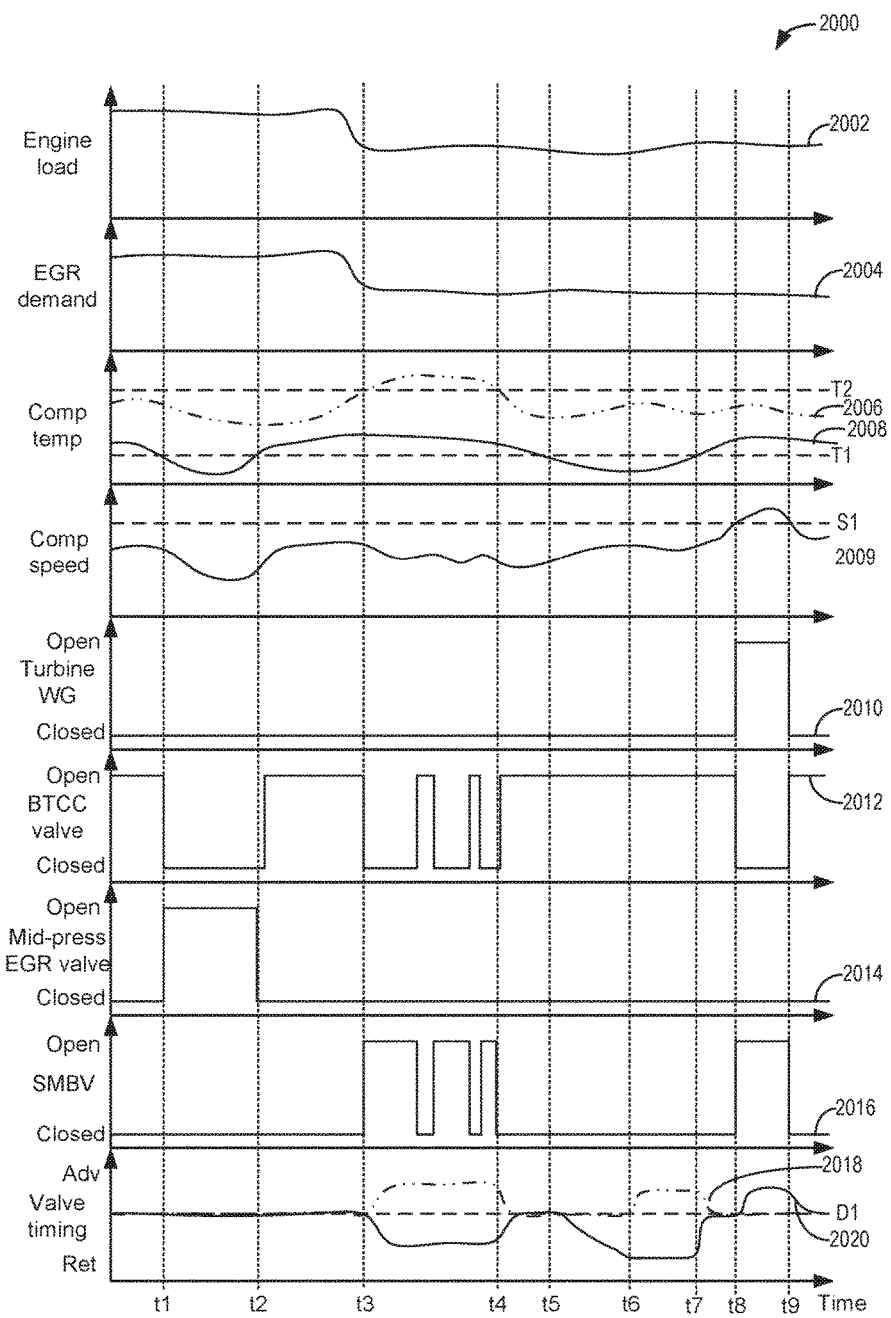
FIG. 20 shows an example graph of changes in engine operating parameters during operating the split exhaust engine system in a compressor threshold mode.

FIG. 20 shows a graph 2000 of operating the split exhaust engine system in the compressor threshold mode. Specifically, graph 2000 depicts engine load at plot 2002, EGR demand (e.g., desired EGR flow to the intake passage) at plot 2004, compressor outlet temperature at plot 2006, compressor inlet temperature at plot 2008, compressor (e.g., turbocharger) speed at plot 2009, a position of the turbine wastegate at plot 2010, a position of the BTCC valve at plot 2012, a position of the mid-pressure EGR valve at plot 2014, a position of the SMBV at plot 2016, an intake valve timing of the intake valves at plot 2018, and an exhaust valve timing of the scavenge exhaust valves at plot 2020. In an embodiment where the scavenge exhaust valves and blowdown exhaust valves are controlled via a same cam system, the exhaust valve timing at plot 2020 may be the timing for both the scavenge exhaust valves and the blowdown exhaust valves. Though the valve positions may be shown as open and closed in FIG. 20, in alternate embodiments, the valves may be adjusted into a plurality of positions between fully open and fully closed.

Prior to time t1, compressor inlet temperature is above the first threshold temperature T1, compressor outlet temperature is below the second threshold temperature T2, and compressor speed is below the threshold speed S1. Thus, the BTCC valve is open, the mid-pressure EGR valve is closed, and the relief pipe valve is closed. The intake and exhaust valve timings are also at their default timings (as shown by default line D1) for best fuel economy prior to time t1. At time t1, the compressor inlet temperature decreases below the first threshold temperature T1, thereby indicating that condensate may be forming at the compressor. Also at this time, the EGR demand is relatively high, thus, in response to the compressor inlet temperature being below the first threshold temperature T1 while the EGR demand is relatively high, the BTCC valve is closed and the mid-pressure EGR valve is opened. This may reduce low-pressure EGR flow to the compressor inlet, thereby reducing condensate formation. At time t2, the compressor inlet temperature increases above the first threshold temperature T1, thus, the BTCC valve is reopened and the mid-pressure EGR valve is closed shortly after time t2.

At time t3, the compressor outlet temperature increases above the second threshold temperature T2 while EGR demand is at a relatively lower level (e.g., lower than at time t1). In response to these conditions, the BTCC valve is modulated to reduce EGR flow and the SMBV is correspondingly modulated to be open when the BTCC valve is closed. Additionally, between time t3 and time t4, the intake valve timing is advanced and the exhaust valve timing is retarded. At time t4, in response to the compressor outlet temperature decreasing below the second threshold temperature T2, the BTCC valve is opened and the SMBV is closed and the intake and exhaust valve timings are returned to their default positions for best fuel economy.

At time t5, the compressor inlet temperature again decreases below the first threshold temperature T1 while the EGR demand is at a lower level (compared to the higher EGR demand level at time t1). Thus, the exhaust valve timing is retarded just after time t5 to reduce EGR flow to the compressor inlet. At time t6, the exhaust valve timing reaches the maximum amount of retard (e.g., cannot be retarded any further). In response to reaching this maximum level, the intake valve timing is advanced. At time t7, the compressor inlet temperature increases above the first threshold temperature and, in response, the intake and exhaust valve timings are returned to their default timings.

At time t8, the compressor speed increases above the threshold speed S1. In response to this increase in compressor speed, the BTCC valve is closed and the SMBV is opened. Also after time t8, the scavenge exhaust valve timing is advanced and the turbine wastegate is opened. After the turbine speed decreases back below the threshold speed S1 at time t9, the BTCC valve is opened, the SMBV closed, and the scavenge exhaust valve timing is returned to the default timing. In this way, the intake valve timing, exhaust valve timing of the scavenge exhaust valves, and a position of the BTCC valve (and in some examples, the SMBV) may be adjusted in coordination in response to a condition at the compressor (e.g., the compressor reaching one or more operational thresholds, as described above). For example, as shown at time t3, the BTCC valve is modulated to reduce EGR flow to a first level and the exhaust valve timing is retarded to decrease the EGR flow to a lower, second level. At the same time, intake valve timing is advanced to reduce the pressure ratio across the compressor. As another example of adjusting the intake valve timing, exhaust valve timing, and BTCC valve timing in coordination with one another, as shown at times t5 to t7, the scavenge exhaust valve timing is retarded and upon hitting its maximum amount of retard while the compressor inlet temperature is still below the first threshold temperature, the intake valve timing is advanced. A technical effect of adjusting the intake valve timing, exhaust valve timing of the scavenge exhaust valves, and the position of the BTCC valve, in coordination with one another, is to reduce EGR flow to the compressor inlet and thus reduce condensate formation at the compressor, reduce the compressor outlet temperature, and/or reduce the compressor speed, thereby reducing degradation of the compressor. In another embodiment, as shown at time t1, in response to the compressor inlet temperature being below the threshold inlet temperature, the mid-pressure EGR valve may be opened to direct exhaust from the scavenge exhaust valves to the intake passage, downstream of the compressor. A technical effect of routing exhaust from the scavenge exhaust valves to the intake passage, downstream of the compressor, in response to a condition of the compressor, is to reduce EGR flow to the compressor inlet, thereby reducing condensate formation at the compressor, increasing the compressor outlet temperature, and reducing compressor speed. As a result, compressor degradation may be reduced. In yet another embodiment, as shown at times t3 and t8, the BTCC valve may be closed (or modulated between open and closed) while the SMBV is correspondingly opened (or modulated) to reduce EGR flow to the compressor inlet and instead direct the exhaust gases from the scavenge manifold to the exhaust passage. A technical effect of decreasing gas flow from the scavenge exhaust manifold to the intake passage, upstream of the compressor, in response to an engine operation condition (such as a compressor outlet temperature being greater than a threshold outlet temperature and/or a compressor speed being greater than a threshold speed) and, in response to the decreasing gas flow, increasing gas flow from the scavenge exhaust manifold to the exhaust passage via the scavenge manifold bypass passage is reducing compressor degradation while also reducing pressures in the scavenge exhaust manifold and trapping of residual gases within the cylinders.

Figure 10:
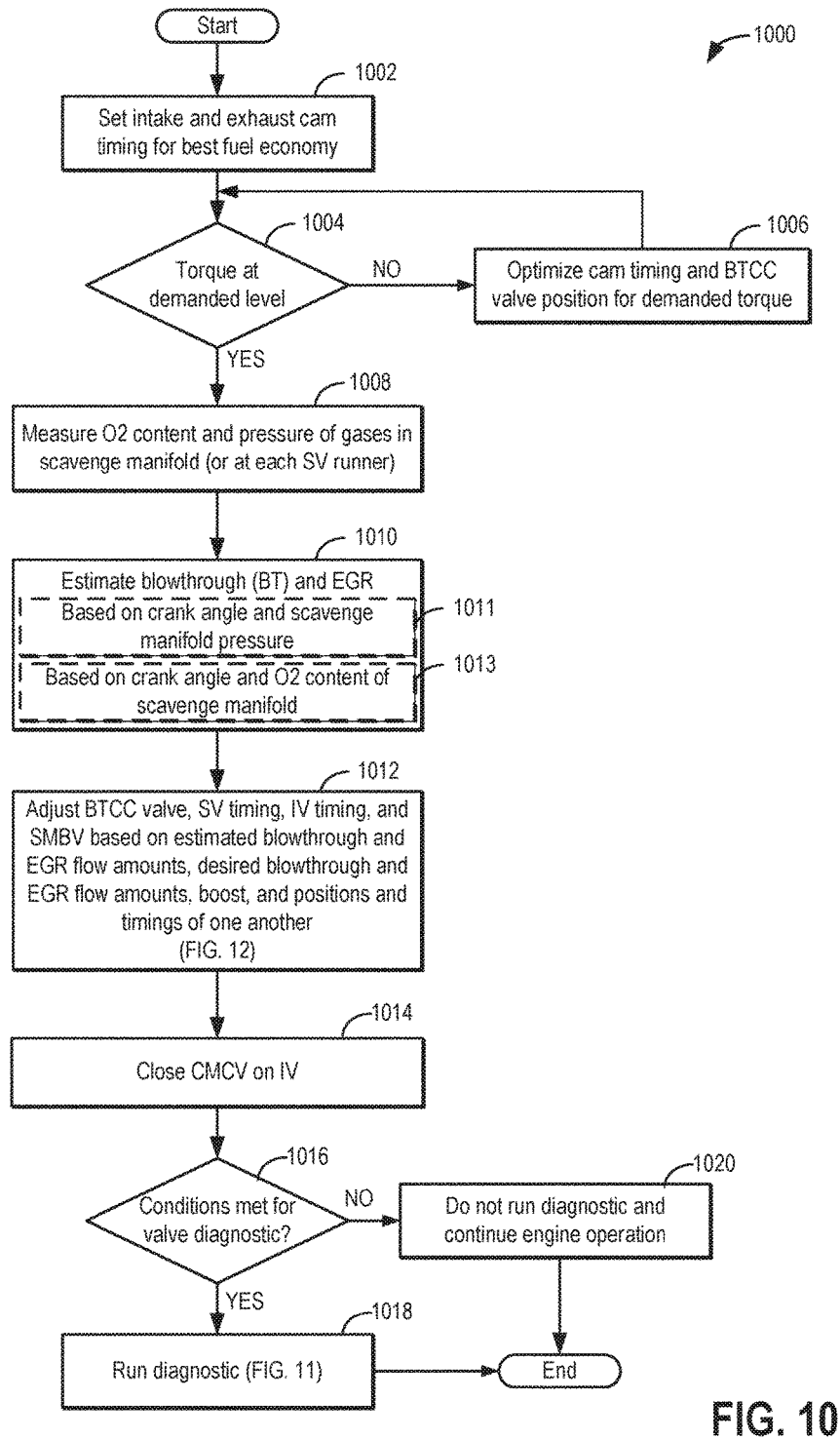
FIG. 10 shows a flow chart of a method for operating the split exhaust engine system in a baseline blowthrough combustion cooling (BTCC) mode.

FIG. 10 shows a method 1000 for operating the engine system in a baseline BTCC mode. Method 1000 may continue from 430 of method 400, as described above. Method 1000 begins at 1002 by setting the intake cam timing of the intake valves and the exhaust cam timing of the scavenge exhaust valves and blowdown exhaust valves for best fuel economy. For example, the timing of the exhaust valves and intake valves may be set for the best achievable brake specific fuel consumption (BSFC) at the current engine operating conditions. In one example, this may include setting the timing of the scavenge exhaust valve, blowdown exhaust valve, and intake valve of each cylinder at the timings shown in FIG. 3A, as described above. In some embodiments, the timing of the exhaust valves and intake valves may be adjusted slightly from the timings shown in FIG. 3A based on engine speed and load. For example, the intake timing may be adjusted to full retard at lighter engine loads and advanced when the engine is boost limited or there is a request for increase blowthrough to reduce knock. In another embodiment, exhaust valve timing may be adjusted so that the exhaust valves open earlier as engine speed increases. The exhaust valve timing may then be retarded as boost decreases (e.g., at low engine speed and high engine load conditions) or when engine speed is high and the EGR temperature is greater than a threshold temperature.

At 1004, the method includes determining whether engine torque output is at a demanded level. The demanded torque level may be a vehicle operator torque demand determined based on a position of an accelerator pedal of the vehicle, in one example. In one example, the controller may determine the demanded torque in response to a pedal position signal received from a pedal position sensor of the accelerator pedal. If torque is not at the demanded level, the method continues to 1006 to optimize the cam timing and BTCC valve position for the demanded torque. As one example, this may include restricting the scavenge exhaust valve flow to increase the torque output and modifying the amount of restricting based on a surge threshold of the turbocharger compressor. For example, restricting the scavenge exhaust valve flow may include retarding the cam timing of the scavenge exhaust valves to reduce EGR flow. In yet another example, this may include alternatively or additionally retarding the cam timing of the intake valves to reduce blowthrough from the scavenge exhaust valves to the intake passage. Further, modifying the amount of restricting the scavenge exhaust valve flow may include decreasing the amount of restricting as compressor operation (e.g., flow rate and pressure drop across the compressor) approaches the surge threshold or surge line. In yet another example, the method at 1006 may additionally or alternatively include restricting the amount of opening of the BTCC valve (e.g., closing or decreasing the amount of opening).

If the engine torque output is at the demanded level, the method continues to 1008 to measure the oxygen content and pressure of gases in the scavenge manifold (e.g., scavenge exhaust manifold 80 shown in FIG. 1A). In another embodiment, the method at 1008 may additionally or alternatively include measuring the oxygen content and/or pressure of gasses in the exhaust runner of each scavenge exhaust valve. For example, the method at 1008 may include obtaining pressure and oxygen content measurements from one or more pressure sensors and oxygen sensors disposed in the scavenge manifold and/or scavenge exhaust valve runners (e.g., pressure sensor 34, oxygen sensor 36, and/or oxygen sensors 38 shown in FIG. 1A).

As described above, both exhaust gases (e.g., EGR, after the cylinder fires via combusting an air-fuel mixture in the cylinder) and blowthrough air (during an overlap period between opening of the intake valve and scavenge exhaust valve) may be expelled into the scavenge manifold from the engine cylinders via the scavenge exhaust valves. Further, each scavenge exhaust valve of each engine cylinder may expel EGR and blowthrough air at different times than the other engine cylinders (e.g., based on a set firing order of the cylinders during one engine cycle). As used herein, an engine cycle refers to a period during which each engine cylinder fires once, in the cylinder firing order. For example, if the cylinder firing order includes firing the cylinders in the following order: cylinder 1, cylinder 2, cylinder 3, and then cylinder 4, then the scavenge exhaust manifold may receive four separate pulses of EGR and blowthrough from each cylinder, in the cylinder firing order, during each engine cycle. As such, at 1010, the method includes estimating blowthrough (BT, e.g., the amount of non-combusted gases entering the scavenge manifold from the scavenge exhaust valve during an overlap period between the intake valve and scavenge exhaust valve of each cylinder) and EGR (e.g., combusted exhaust gases). Estimating BT and EGR may include estimating a BT amount and EGR amount expelled into the scavenge exhaust manifold for each cylinder and/or estimating a total amount of BT and EGR entering the intake passage for all cylinders during a single engine cycle (e.g., total BT and EGR amount for four cylinders in a four cylinder engine, or as many cylinders that have activated scavenge exhaust valves). In a first embodiment of the method at 1010, the method at 1011 may include estimating the BT and EGR amount based on crankshaft angle (e.g., engine position) and scavenge manifold pressure (e.g., based on an output of a pressure sensor in the scavenge manifold). In a second embodiment of the method at 1010, the method at 1013 may include estimating the BT and EGR amount based on crankshaft angle (or a corresponding time of opening and closing the intake valve and scavenge exhaust valve of each cylinder) and the oxygen content of the scavenge manifold (e.g., based on an output of an oxygen sensor in the scavenge manifold or in each scavenge exhaust valve runner).

Figure 21:
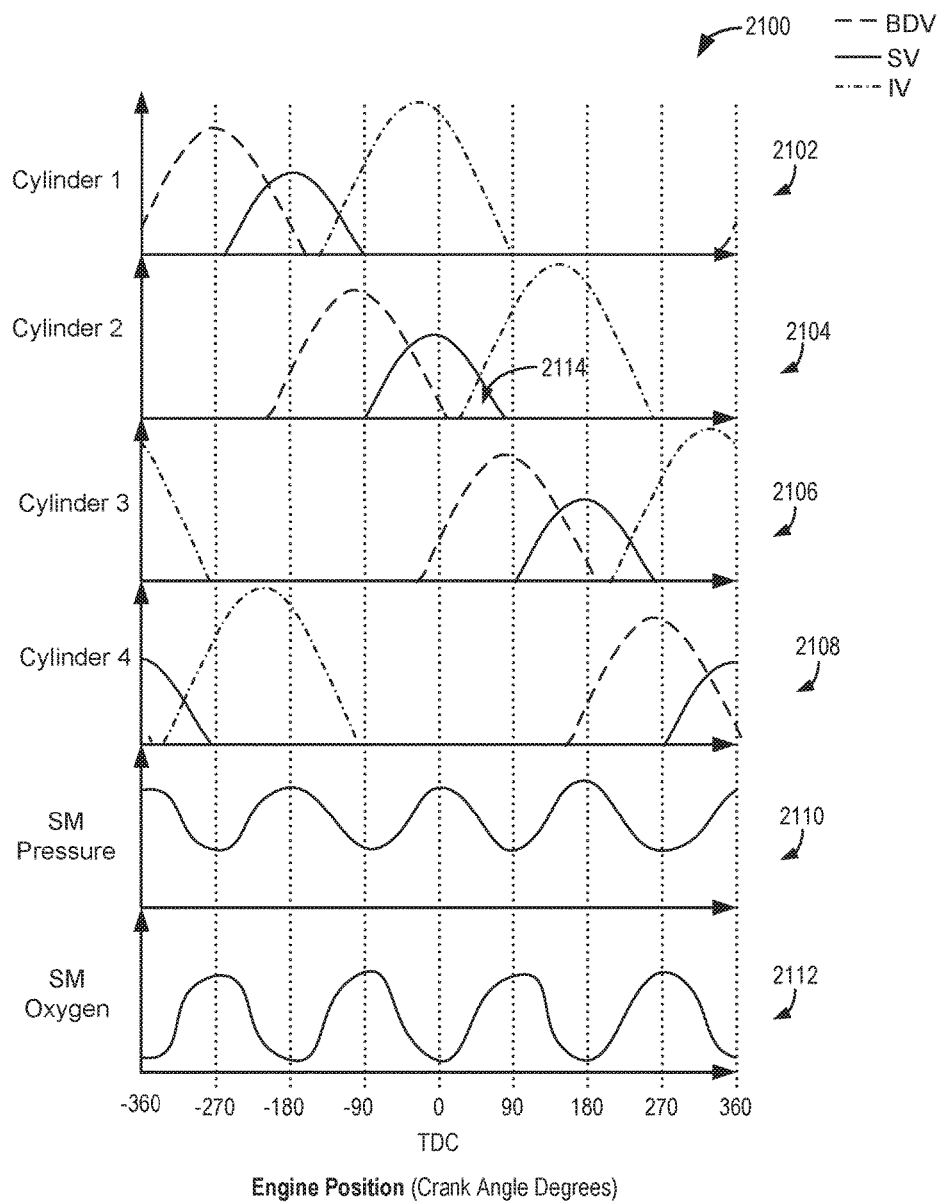
FIG. 21 shows an example graph of changes in pressure and oxygen content of a scavenge exhaust manifold over a single engine cycle of the split exhaust engine system.

FIG. 21 shows a graph 2100 of changes in scavenge manifold pressure and oxygen content over a single engine cycle that includes firing of four cylinders (e.g., cylinders 1-4 shown in FIG. 21). Specifically, graph 2100 illustrates an engine position along the x-axis in crank angle degrees (CAD) for a complete engine cycle (e.g., from −360 CAD to 360 CAD) where four cylinders of a representative four-cylinder engine fire (e.g., such as the engine shown in FIGS. 1A-1B). For each cylinder, a timing, lift, and duration of opening (relative to the engine position) of the intake valve (IV), scavenge exhaust valve (SV), and blowdown exhaust valve (BDV) are shown. Plot 2102 depicts the cylinder valve events for a first engine cylinder, cylinder 1; plot 2104 depicts the cylinder valve events for a second engine cylinder, cylinder 2; plot 2106 depicts the cylinder valve events for a third engine cylinder, cylinder 3; and plot 2108 depicts the cylinder valve events for a fourth engine cylinder, cylinder 4. Changes in the measured scavenge manifold pressure over the engine cycle are shown at plot 2110 and changes in the measured scavenge manifold oxygen content are shown at plot 2112. The measured scavenge manifold oxygen content may also represent an air-fuel ratio of the gases entering the scavenge exhaust manifold from the SVs.

As shown in graph 2100, each time a SV of one of the cylinder opens, there is a positive pulse in the scavenge manifold pressure and a negative pulse in the scavenge manifold oxygen content. For example, when a SV opens (e.g., at −90 CAD for cylinder 2), combusted exhaust gases are expelled into the scavenge manifold. While the same SV is open and upon opening of an IV of the same cylinder (e.g., overlap period, as indicated by 2114 for cylinder 2), blow-through air is expelled into the scavenge manifold. Thus, an increase in scavenge manifold pressure occurs upon opening of the SV and the scavenge manifold oxygen content decreases due to the combusted exhaust gases entering the scavenge manifold. While the SV is open and before opening of the IV, the scavenge manifold oxygen content represents an air-fuel ratio of the combusted exhaust gases (which may be richer). Then, the scavenge manifold content increases again as the blowthrough air (e.g., that doesn't include combusted gases and thus is more oxygen rich than exhaust gases) enters the scavenge manifold. While both the SV and the IV are open at the same time for each cylinder, the scavenge manifold oxygen content represents an air-fuel ratio of the blowthrough air which is leaner than the combustion gases.

Thus, by correlating the pulses in scavenge manifold pressure and/or oxygen content to CAD, the pressure and/or oxygen changes due to exhaust gases and blowthrough air for each cylinder may be determined and differentiated between. By observing the size (e.g., magnitude) of these pulses over the known period (e.g., CAD and firing order) of expelling exhaust gases or blowthrough air into the scavenge manifold, the amount of EGR and blowthrough air flowing to the intake passage via the scavenge manifold may be determined for each cylinder or for each engine cycle (e.g., by summing the pulses). As another example, estimating blowthrough and/or EGR flow from the scavenge manifold oxygen content may include measuring (via an oxygen sensor) a transition between a combustion air-fuel content of the gases (e.g., combustion gases) expelled from each SV (e.g., the valleys, or low points, of plot 2112) and a leaner air-fuel content of gases (e.g., blowthrough air) expelled from each SV (e.g., the peaks, or high points, of plot 2112). The transition, or change between a peaks (e.g., maximum) and valley (e.g., minimum) of the oxygen sensor output, for each cylinder, may be indicative of the EGR and blow-through air amount exiting the SV for each cylinder and flowing to the intake For example, the transition may include an increase in the oxygen level of the blowthrough air expelled from the SVs. The increase in the oxygen level may be an increase from a lower, first level of oxygen (at the valleys) to a higher, second level of oxygen (at the peaks). The transition between the combustion air-fuel ratio content of the expelled gases and the leaner air-fuel content of the gases may be determined, on a cylinder to cylinder basis, to determine the EGR flow and blowthrough amounts for each cylinder. Additionally, the total amount of the blowthrough air flowing to the intake passage from the scavenge manifold during a single engine cycle may be determined based on the second level of oxygen for each SV of each cylinder.

Returning to 1010 of FIG. 10, in this way, the BT amount and EGR amount may be determined based on an output of a pressure sensor and/or oxygen sensor positioned in the scavenge manifold (or scavenge exhaust valves runners) that is correlated to crank angle degree (e.g., engine position). As one example, the controller may determine the BT amount for a first cylinder based on the received output of the pressure sensor between a time of opening the intake valve of the first cylinder and a time of closing the scavenge exhaust valve of the first cylinder. The controller may repeat this process for each engine cylinder and then sum all values to determine a total BT amount to the intake passage for a compete engine cycle. As another example, the controller may determine the EGR flow amount for the first cylinder based on the received output of the pressure sensor between a time of opening the scavenge exhaust valve of the first cylinder and a time right before opening the intake valve of the first cylinder (e.g., the time up until the intake valve opens and, thus, before BT air enters the scavenge manifold). The same process may be performed using the output of the oxygen sensor instead of the pressure sensors. As one example, the controller may make a logical determination regarding the amount of EGR or BT in the scavenge manifold based on logic rules that are a function of the pressure (or oxygen content) of the scavenge manifold (for the set BT or EGR period, as discussed above, for each cylinder).

At 1012, the method includes adjusting the BTCC valve (e.g., adjusting a position of the BTCC valve), scavenge exhaust valve (SV) timing, intake valve (IV) timing, and/or SMBV (e.g., adjusting a position of the SMBV) based on the estimated blowthrough and EGR flow amounts (as determined at 1010), desired blowthrough and EGR flow amounts, boost level (e.g., boost pressure downstream of turbocharger compressor), and current positions and timings of each of the above-listed valves. As one example, the BTCC valve may be opened in response to the engine being boosted (e.g., with the turbocharger compressor operating and resulting in MAP greater than atmospheric pressure). As another example, if more of less EGR flow or blowthrough to the intake passage via the scavenge manifold and EGR passage is desired relative to the estimated levels (estimated at 1010), the controller may adjust the positions or timings of one or more of the BTCC valve, SV, IV, and SMBV to achieve the desired EGR flow and blowthrough flow. Details on adjusting the BTCC valve, SMBV, and SV timing to achieve desired EGR and blowthrough flow are described further below with reference to FIGS. 12-13. Further, adjusting the valve positions and timings at 1012 may include adjusting the valve positions and/or timings relative to the positions and timings of one another. For example, if the BTCC valve is closed, and the desired scavenge manifold pressure is lower than the currently measured scavenge manifold pressure, the method at 1012 may include opening or increasing the amount of opening of the SMBV to decrease the scavenge manifold pressure.

In another example of the method at 1012, the scavenge manifold pressure at certain SV timings may change the control of the BTCC valve, SMBV, and/or intake valve. For example, the SV timing may be adjusted based on the measured scavenge manifold pressure. In one example, in response to the measured scavenge manifold pressure being greater than the desired scavenge manifold pressure, the method may include retarding the SV timing to decrease the scavenge manifold pressure. The desired scavenge manifold pressure may be determined based on (e.g., as a function of) one or more of intake manifold pressure, exhaust pressure, and/or boost conditions (e.g., whether the engine is boosted or not). Further, in response to adjusting the SV timing based on the measured pressure and in response to the scavenge manifold pressure, the positions of the BTCC valve and/or SMBV may be adjusted. For example, after adjusting the SV timing, the position of the SMBV may be adjusted to maintain the scavenge manifold pressure at the desired scavenge manifold pressure (based on engine operating conditions) and the position of the BTCC valve may be adjusted to maintain EGR flow at a desired EGR flow (e.g., based on engine operating conditions such as engine load, knock, and compressor operating conditions such as temperature and speed).

The method proceeds to 1014 to close the charge motion control valves (e.g., CMCVs 24 shown in FIG. 1A) positioned in at least one intake runner of each cylinder. As one example, closing the CMCVs may include the controller actuating a valve actuator of the CMCVs to move the CMCVs into the closed position that restricts airflow entering the cylinder via the intake valves of the intake runners that the CMCVs are coupled within. For example, the closed position may include when the CMCVs are fully activated and the valve plate of the CMCVs may be fully tilted into the respective intake runner (e.g., port), thereby resulting in maximum air charge flow obstruction. This may reduce short circuiting of air from the intake valve directly to the SV without fully scavenging exhaust gases from inside the cylinders. As a result of closing the CMCVs while operating in the baseline BTCC mode, more exhaust gas scavenging may result, thereby increasing engine performance and torque output during subsequent cylinder combustion events.

At 1016, the method includes determining whether conditions are met for running a valve diagnostic for one or more of the BTCC valve, SMBV, or SVs. In one example, the conditions for running the valve diagnostic may include one or more of a duration passing since a previous valve diagnostic, a duration of engine operation, and/or a number of engine cycles. For example, the valve diagnostic may be run at regular intervals (e.g., after a set duration of engine operation or a set number of engine cycles), after each shutdown event (e.g., upon engine restart), or in response to a diagnostic flag set at the controller. For example, a diagnostic flag may be set if a measured scavenge manifold pressures is a threshold amount different than expected based on the current valve positions and timings of the BTCC valve, SMBV, and/or SVs. If conditions are met for running the valve diagnostic, the method proceeds to 1018 to run the valve diagnostic and diagnose a position or timing of the BTCC valve, SMBV, and SVs based on scavenge manifold pressure. Details on running this diagnostic routine are described in further detail below with reference to FIG. 11. Alternatively at 1016, if conditions are not met for running the valve diagnostic, the method proceeds to 1020 to not run the diagnostic and instead continue engine operation at the current valve positions/timings Method 1000 then ends.

In this way, the BTCC valve, SV timing, IV timing, and/or SMBV may be adjusted based on an estimate of blowthrough and EGR flow that is determined based on a scavenge manifold pressure or oxygen content measurement (or estimate). As one example, a method includes adjusting an amount of opening overlap between the intake valves and the scavenge exhaust valves (e.g., via advancing or retarding the SV and IV timing, as explained above) responsive to a transition from an estimated combustion air-fuel content to a leaner air-fuel content of the blowthrough air on a cylinder to cylinder basis. As explained above, for each cylinder, there may be a transition from the estimated combustion air-fuel content to the leaner air-fuel content corresponding to a SV opening event for each cylinder. A technical effect of adjusting the opening overlap responsive to this transition is delivering the desired amount of blowthrough to the intake passage and thus, increasing engine efficiency and reducing engine knock. As another example, a method includes adjusting the BTCC valve, the SMBV, SV timing, and/or IV timing based on measured pressure in the scavenge exhaust manifold. A technical effect of adjusting these valves and/or valve timings based on the scavenge manifold pressure increasing the accuracy of the control of the blowthrough and EGR flow amounts to the intake passage, thereby increasing engine efficiency, reducing engine emissions, and reducing engine knock.

Figure 11:
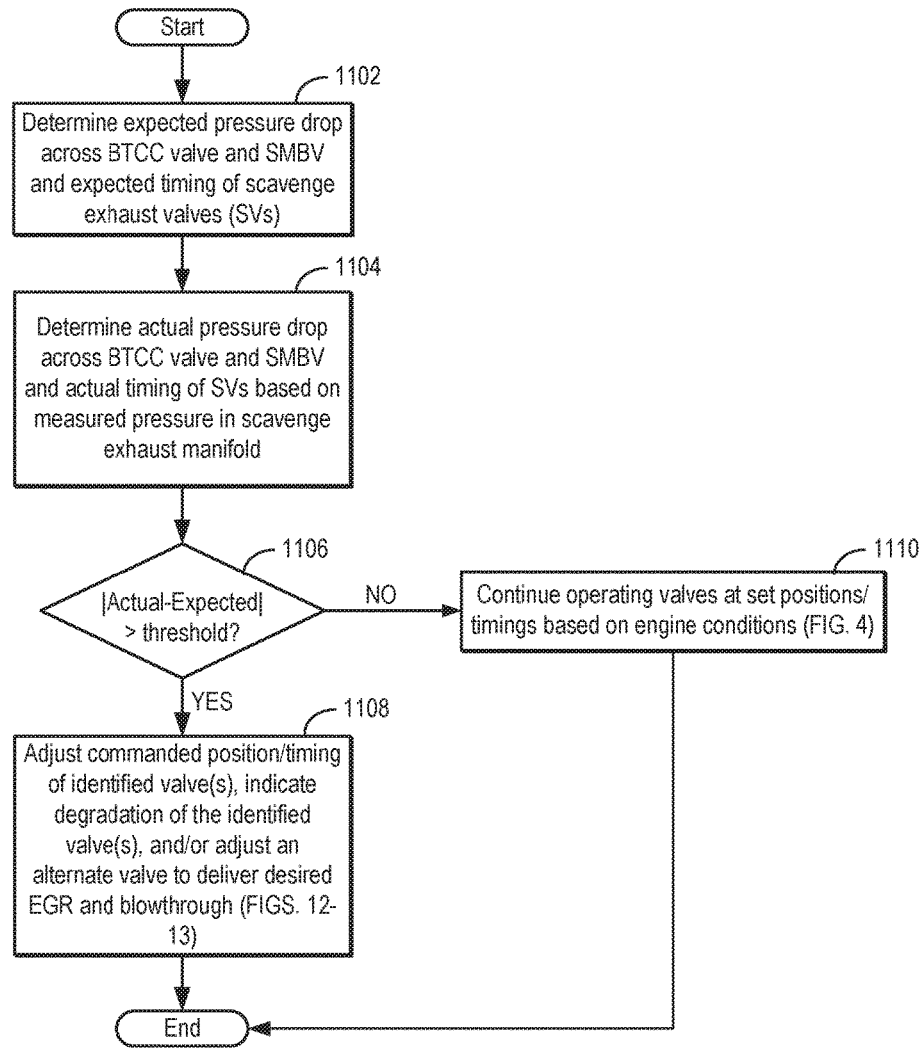
FIG. 11 shows a flow chart of a method for diagnosing one or more valves of the split exhaust engine system based on scavenge manifold pressure.

Turning to FIG. 11, a method 1100 for diagnosing one or more valves of the split exhaust engine system based on scavenge manifold pressure is shown. Method 1100 may continue from 1018 of method 1000, as described above. The method begins at 1102 by determining an expected pressure drop across each of the BTCC valve and the SMBV and determining the expected timing of the scavenge exhaust valves (SVs). As one example, the expected pressure drop (e.g., difference) across the BTCC valve and the SMBV may be determined based on a commanded position of the BTCC valve and the SMBV and additional engine operating conditions. For example, the commanded position of the valves may include a fully open position, fully closed position, or one of a plurality of positions between the fully open and fully closed positions. In the case of the expected pressure drop across the BTCC valve, the additional engine operating conditions may include a pressure in the intake passage, upstream of the compressor (e.g., where the EGR passage couples to the intake passage), atmospheric pressure (e.g., if there is no electric compressor upstream of the compressor or the electric compressor is not operating), a position of the SMBV (e.g., open or closed), an exhaust pressure in the exhaust passage where the scavenge manifold bypass passage couples to the exhaust passage, and/or a timing of the SVs. As one example, the controller may determine the expected pressure drop across the BTCC valve based on a look-up table stored in memory of the controller, where the look-up table includes one or more of the commanded BTCC valve position, intake pressure, atmospheric pressure, exhaust pressure, SMBV position, and SV timing as inputs and the expected pressure drop across the BTCC valve as the output. In another example, the controller may determine the expected pressure drop according to a relationship stored in the memory of the controller that is a function of the commanded BTCC valve position, intake pressure, atmospheric pressure, exhaust pressure, SMBV position, and/or SV timing. Similarly, the controller may determine the expected pressure drop across the SMBV based on the commanded SMBV position and engine operating conditions which may include one or more of a position of the BTCC valve, a timing of the SVs, and the exhaust pressure in the exhaust passage where the scavenge manifold bypass passage couples to the exhaust passage (e.g., using look-up tables or stored relationships, as explained above). In one example, the exhaust pressure in the exhaust passage where the scavenge manifold bypass passage couples to the exhaust passage may be a pressure measured via a pressure sensor disposed in the exhaust passage, such as pressure sensor 96 shown in FIG. 1A. In another example, the intake pressure where the EGR passage couples to the intake passage may be measured via a pressure sensor disposed in the intake passage upstream of the compressor, such as pressure sensor 31 shown in FIG. 1A. The expected timing of the SVs may be the currently set (or last commanded) timing of the SVs. For example, the controller may look-up or determine the last commanded, or baseline, timing for the SVs and use that as the expected SV timing.

At 1104, the method includes determining the actual pressure drops across the BTCC valve and across the SMBV and determining the actual timing of the SVs based on a measured pressure in the scavenge manifold. As one example, the scavenge manifold pressure may be measured via a pressure sensor disposed within the scavenge manifold (e.g., pressure sensor 34 shown in FIG. 1A). The controller may receive the time varying signal of the scavenge manifold pressure sensor and then determine either an instantaneous or average scavenge manifold pressure (e.g., averaged over an engine cycle or a plurality of engine cycles). As one example, the actual pressure drop across the BTCC valve may be determined based on the output of the scavenge manifold pressure sensor and atmospheric pressure (or based on an output of a pressure sensor disposed in the intake passage, where the EGR passage couples to the intake passage, upstream of the compressor). For example, the controller may determine the actual pressure drop across the BTCC valve based on a look-up table stored at the controller, where the look-up table includes the measured scavenge manifold pressure and atmospheric (or intake pressure) as inputs and the actual BTCC valve position as the output.

Similarly, the controller may determine the actual pressure drop across the SMBV based on the output of the pressure sensor positioned in the scavenge manifold and an output of a pressure sensor positioned in the exhaust passage, at an outlet of the scavenge manifold bypass passage (e.g., pressure sensor 96 shown in FIG. 1A). Additionally, the controller may determine the actual timing (e.g., opening timing) of the SVs based on a spike in the output of the scavenge manifold pressure sensor during a single engine cycle. For example, as described above in reference to FIG. 21, the pressure signal of the scavenge manifold pressure sensor may pulse (or spike) each time a SV opens. The controller may correlate this pulse to the CAD (or engine position) at which the pulse occurs and thus determine the opening and closing timing of the SVs.

The method then proceeds to 1106 to determine whether an absolute value of a difference between the actual pressure drop or timing determined at 1104 and the expected pressure drop or timing determined at 1102 is greater than a threshold difference. The method at 1106 may include determining this difference for each of the BTCC valve, SMBV, and the SVs. The threshold difference may be a difference that is non-zero and indicative of the valves being in a different position than desired or at a different timing than desired. For example, this difference may be a difference that indicates that the BTCC valve is mis-positioned (e.g., opened instead of closed or closed instead of opened). In another example, this difference may be a difference that indicates that the timing of the SVs is a threshold amount of CADs different than desired (or commanded). These differences may result in degraded engine performance, such as reduced torque output, increased emissions, and/or degradation of the turbocharger or emission control devices.

If the absolute value of the difference between the actual pressure drop or timing and the expected pressure drop or timing is not greater than a threshold difference, the method continues to 1110 to continue operating the valves at the set positions and/or timings based on the current engine operating conditions (e.g., according to method 400 described above with reference to FIGS. 4A-4B). For example, if the difference between the actual pressure drop or timing and the expected pressure drop or timing is not greater than the threshold difference, the valves may not be degraded and they may be in their commanded or set positions.

Alternatively at 1106, if the difference between the actual pressure drop or timing and the expected pressure drop or timing is greater than the threshold difference, the method continues to 1108 to adjust the commanded position/timing of the identified valve(s), indicate degradation of the identified valve(s), and/or adjust an alternate valve to deliver the desired EGR and blowthrough amounts to the intake passage. As introduced above, method 1100 may be performed for one or more of or each of the SVs, BTCC valve, and SMBV. As such, the method proceeds to 1108 to perform the above-described actions for any and all of the valves for which the difference between the actual pressure drop or timing and the expected pressure drop or timing is greater than the corresponding threshold difference. In one example, the controller may indicate degradation of the identified valve(s) by setting a diagnostic flag and/or alerting a vehicle operator that the identified valve(s) need to be serviced or replaced (e.g., via an audible or visual signal). In another example, the controller may actuate the identified valve(s) into the desired (e.g., originally commanded) positions or timings. For example, if the BTCC valve is diagnosed as being mispositioned, the method at 1108 may include actuating the valve into the desired position (e.g., open or closed)

and then the controller may re-run the diagnostic to see if the BTCC valve was moved into the desired position. In another example, if the identified valve are the SVs, the method at 1108 may include further retarding the SV timing, past a desired or previously commanded level, if the actual timing is more advanced that the desired timing. In this way, adjusting the valve positions or timings at 1108 may include compensating for the difference determined at 1106 and thus result in achieving a desired valve position or timing. In yet another example, and as explained in further detail below with reference to FIGS. 12-13, the method at 1108 may include adjusting an alternate valve, other than the identified valve, (e.g., one of the non-degraded or correctly positioned valves) to deliver the desired EGR or blowthrough flow. For example, if the BTCC valve is identified as being mispositioned based on the difference determined at 1106, the method may include adjusting the timing of the SVs to deliver the desired EGR and blowthrough and not adjusting the BTCC valve. In another example, in response to the difference between the actual pressure drop and the expected pressure drop across the BTCC being greater than the threshold difference, the EGR flow to the intake passage may be adjusted to the desired level via adjusting the position of the SMBV and/or the timing of the SVs and not by adjusting the position of the BTCC valve. In yet another example, in response to determining that the SMBV is mispositioned, the controller may instead adjust the BTCC valve to deliver the desired EGR flow and blowthrough. In yet another example, the method at 1108 may include adjusting the flow of exhaust gases from the SVs to the intake passage via adjusting only the BTCC valve and not the timing of the SVs in response to the actual opening timing of the SVs being a threshold amount different than the expected timing. In this way, the desired EGR flow and blowthrough may still be delivered to the intake passage, even if one or more of the above-described valves is degraded or mispositioned.

In this way, a position of one or more of the BTCC valve and SMBV, and/or a timing of the SVs, may be diagnosed based on an output of a pressure sensor positioned in the scavenge exhaust manifold. The valve that is diagnosed as being degraded or mispositioned may then be commanded into a different position and/or an alternate valve may be adjusted to achieve desired operating conditions (such as a desired EGR flow or pressure in the first exhaust manifold). Thus, a technical effect of diagnosing the BTCC valve, SMBV, and/or SVs based on scavenge manifold pressure is increasing an ease of determining valve degradation (e.g., determining when a valve may need to be serviced or replaced) and being able to deliver the desired EGR flow or blowthrough amount to the intake passage, even when one or more of these valves is mispositioned or degraded, by adjusting an alternate valve. In this way, engine efficiency and fuel economy may be maintained, even when one or more valves are diagnosed as being degraded or mispositioned.

In embodiments where a hot pipe valve or mid-pressure EGR valve are included in the split exhaust engine system (e.g., hot pipe valve 32 and mid-pressure EGR valve 59 shown in FIG. 1A), method 1100 may further include diagnosing the positions of these valves, similar to diagnosing the BTCC valve and SMBV, as disclosed above.

Figure 12:
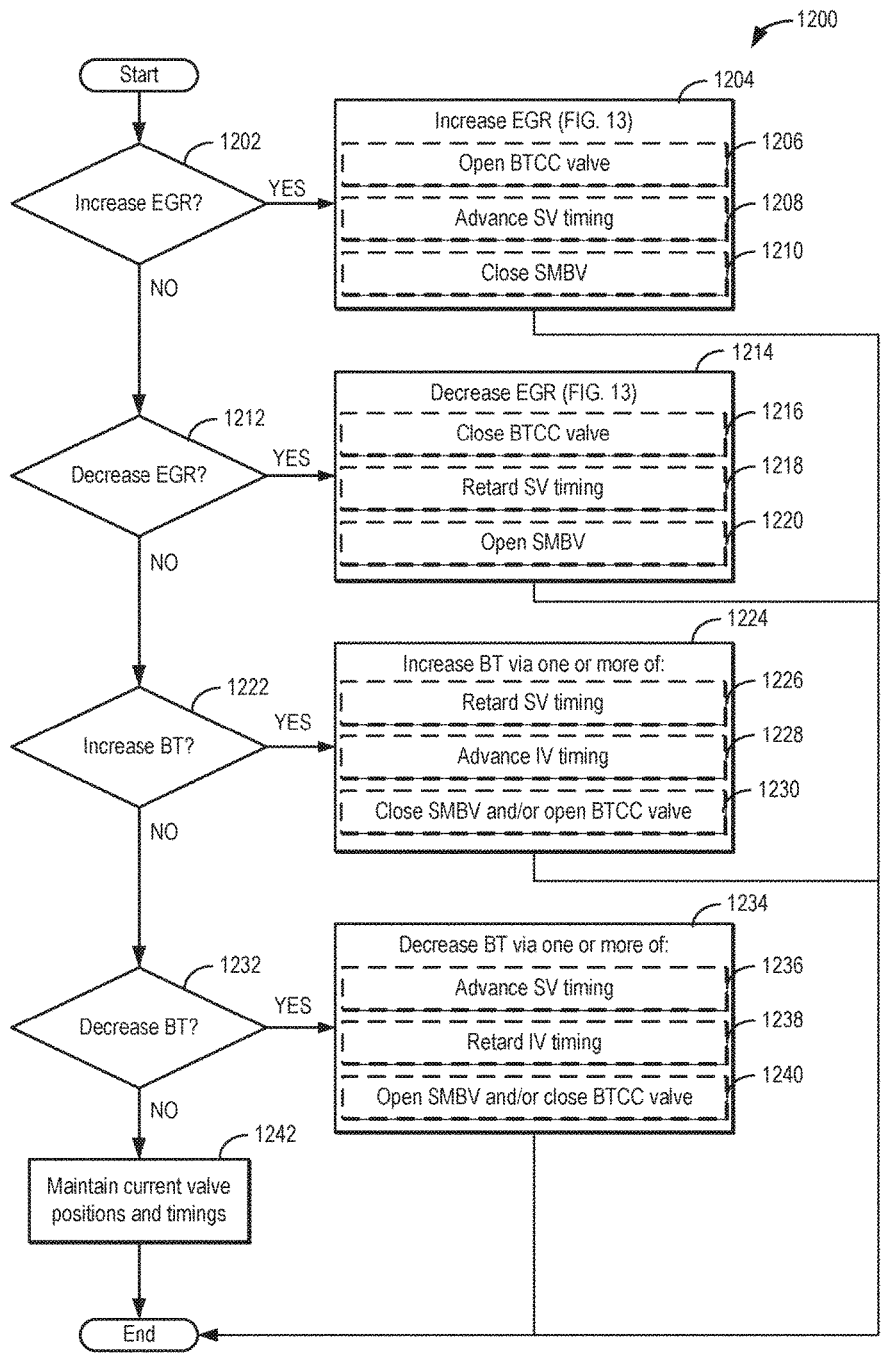
FIG. 12 shows a flow chart of a method for controlling EGR flow and blowthrough air to an intake passage from a scavenge manifold via adjusting operation of one or more valves of the split exhaust engine system.

Turning now to FIG. 12, a method 1200 for controlling EGR flow and blowthrough air to the intake passage from the scavenge manifold via adjusting operation of one or more valves of the engine system is shown. Method 1200 may continue from 1012 of method 1000 or from 1108 of method 1100, as described above. For example, method 1200 may run in response to changing engine operating conditions (which may include changes in valve positions, cylinder valve timings, system pressures, etc.) that result in a change in the desired EGR flow amount or rate or the desired blowthrough flow amount or rate to the intake passage from the scavenge exhaust manifold (e.g., scavenge manifold). Method 1200 may additionally or alternatively continue from one or more of the other methods described herein (e.g., with reference to FIGS. 4A-10) that describe changing (e.g., increasing or decreasing) the EGR flow of blowthrough flow to the intake passage.

Method 1200 begins at 1202 by determining whether there is a request to increase EGR. In one example, there may be a request to increase EGR (e.g., from scavenge manifold 80, via EGR passage 50, to the intake passage, as shown in FIG. 1A) when an estimated EGR flow rate is less than a desired EGR flow rate (as described above with reference to FIG. 10). In another example, there may a request to increase EGR following an engine cold start where the BTCC valve was closed or at least partially closed. Further, a request to increase EGR may be generated in response to an outlet temperature of the turbocharger compressor decreasing below a threshold outlet temperature, an inlet temperature of the turbocharger compressor increasing above a threshold inlet temperature, and/or a speed of the compressor decreasing below a threshold speed. If there is a request to increase EGR (e.g., increase the amount of exhaust gas flow from the engine cylinders to the intake passage via the scavenge exhaust valves (SVs) and the scavenge manifold), the method proceeds to 1204 to adjust one or more engine actuators to increase EGR flow from the scavenge manifold to the intake passage. Increasing EGR at 1204 may include one or more of opening the BTCC valve at 1206, advancing the timing (e.g., opening and closing timing) of the SVs at 1208, and closing the SMBV at 1210. Opening the BTCC valve (e.g., valve 54 shown in FIG. 1A) may include the controller sending a signal to an actuator of the BTCC valve to fully open or increase the amount of opening of (but not fully opening) the BTCC valve. Similarly, closing the SMBV (e.g., SMBV 97 shown in FIG. 1A) may include the controller sending a signal to an actuator of the SMBV to fully close or decrease the amount of opening of (but not fully closing) the SMBV. Further, advancing the SV timing may include the controller sending a signal to an actuator of the SVs (e.g., SVs 6 shown in FIG. 1A) to advance the timing of the SVs alone or all the exhaust valves (e.g., when the SVs and BDVs are controlled via a same actuator and cam timing system). The method at 1204 may include selecting which one or more of the adjustments at 1206, 1208, and 1210 to utilize to increase EGR to the desired level based on engine operating conditions, as described further below with reference to FIG. 13.

If there is not a request to increase EGR at 1202, the method continues to 1212 to determine if there is a request to decrease EGR. In one example, there may be a request to decrease EGR (e.g., from scavenge manifold 80 via EGR passage 50, as shown in FIG. 1A) when an estimated EGR flow rate is greater than a desired EGR flow rate (as described above with reference to FIG. 10). For example, in response to a condition of the turbocharger compressor, including one or more of condensate formation at the compressor, a compressor inlet temperature less than a lower threshold temperature, a compressor outlet temperature greater than an upper threshold temperature, and a compressor speed greater than a threshold speed, there may be a request to decrease EGR flow to the intake passage, upstream of the compressor. If there is a request to decrease EGR (e.g., decrease the amount of exhaust gas flow from the engine cylinders to the intake passage via the scavenge exhaust valves (SVs) and the scavenge manifold), the method proceeds to 1214 to adjust one or more engine actuators to decrease EGR flow from the scavenge manifold to the intake passage. Decreasing EGR at 1214 may include one or more of closing (or decreasing the amount of opening of) the BTCC valve at 1216, retarding the timing (e.g., opening and closing timing) of the SVs at 1218, and opening (or increasing the amount of opening of) the SMBV at 1220. The method at 1214 may include selecting which one or more of the adjustments at 1216, 1218, and 1220 to utilize to decrease EGR to the desired level based on engine operating conditions, as described further below with reference to FIG. 13.

If there is not a request to decrease EGR, the method continues to 1222 to determine whether there is a request to increase blowthrough (BT). As explained above, increasing blowthrough may include increasing an amount of fresh, non-combusted air (or mixed intake air from the intake manifold where at least some of the mixed intake air has not undergone combustion) flowing from an intake valve to a SV during a valve overlap period of the intake valve and SV and then flowing to the intake passage via the scavenge manifold and EGR passage. In one example, there may be a request to increase blowthrough in response to an outlet temperature of the compressor being above a threshold outlet temperature, engine knock, and/or compressor surge. If there is a request to increase blowthrough, the method continues to 1224 to increase blowthrough via one or more of retarding the timing of the SVs at 1226, advancing the timing of the intake valves (IV) at 1228, and closing the SMBV and/or opening the BTCC valve at 1230. For example, increasing the amount of opening overlap between the SV and IV of the same cylinder (e.g., increasing the amount of time both the SV and IV of a same cylinder are open at the same time) may result in increasing the amount of blowthrough to the intake. Specifically, increasing the amount of opening overlap between the IV and SV may include retarding the SV timing (e.g., retarding the closing timing of the SV) and/or advancing the IV timing (e.g., advancing the opening timing of the IV). In one example, increasing the amount of opening (or fully opening) the BTCC valve and/or decreasing the amount of opening (or fully closing) the SMBV may increase the amount of blowthrough air flowing from the engine cylinders to the intake passage. However, if the BTCC valve is already fully opened and the SMBV is already fully closed, the method at 1224 may include retarding the SV timing and/or advancing the IV timing. Further, if the SV timing is already at the maximum amount of retard, the method at 1224 may include advancing the IV timing to increase blowthrough to the intake Similarly, if the intake valve timing is already fully advanced, the method at 1224 may include retarding the SV timing to increase blowthrough. Further still, the method at 1224 may include first retarding the SV timing and then advancing the IV timing if blowthrough is still not at the requested level when the SV timing reaches the maximum amount of retard. In yet another example, the decision to adjust more than one of the engine actuators at 1224 may be based on the amount of requested change in the amount of blowthrough. For example, as the requested blowthrough increases further above the current level, the method at 1224 may include increasing the amount of adjusting the SV timing, IV timing, and valve positions and/or adjusting at least two or more actuators at 1224 (e.g., at the same time, retarding the SV timing and advancing the IV timing to achieve the desired blowthrough amount). In this way, increasing blowthrough at 1224 may include adjusting one or more of the SV timing, IV timing, SMBV, and BTCC valve based on the current timings and positions of one another and the magnitude of the requested increase in blowthrough.

If there is not a request to increase blowthrough, the method proceeds to 1232 to determine whether there is a request to decrease blowthrough. In one example, there may be a request to decrease blowthrough in response to the turbine operating below a threshold speed and above a threshold load and/or a flow rate through the compressor being above a threshold flow rate (where the threshold flow rate may be a flow rate at which compressor efficiency decreases and results in heating of the charge air). If there is a request to decrease blowthrough, the method continues to 1234 to decrease blowthrough via one or more of advancing SV timing at 1236, retarding IV timing at 1238, and opening the SMBV and/or closing the BTCC valve at 1240. For example, decreasing the amount of opening overlap between the SV and IV of the same cylinder (e.g., decreasing the amount of time both the SV and IV of a same cylinder are open at the same time) may result in decreasing the amount of blowthrough to the intake Specifically, decreasing the amount of opening overlap between the IV and SV may include advancing the SV timing (e.g., advancing the closing timing of the SV) and/or retarding the IV timing (e.g., retarding the opening timing of the IV). In one example, decreasing the amount of opening (or fully closing) the BTCC valve and/or increasing the amount of opening (or fully opening) the SMBV may decrease the amount of blowthrough air flowing from the engine cylinders to the intake passage. However, if the BTCC valve must remain open to deliver the requested EGR amount to the intake passage, the method at 1234 may include advancing the SV timing and/or retarding the IV timing. Further, if the SV timing is already at the maximum amount of advance, the method at 1234 may include retarding the IV timing to decrease blowthrough to the intake Similarly, if the intake valve timing is already fully retarded, the method at 1234 may include advancing the SV timing to decrease blowthrough. Further still, the method at 1234 may include first advancing the SV timing and then retarding the IV timing if blowthrough is still not at the requested level when the SV timing reaches the maximum amount of advance. In yet another example, the decision to adjust more than one of the engine actuators at 1234 may be based on the amount of requested change in the amount of blowthrough. For example, as the requested blowthrough decreases further below the current level, the method at 1234 may include increasing the amount of adjusting the SV timing and IV timing, or adjusting both, at the same time, the SV timing and IV timing to achieve the desired blowthrough amount.

If there is not a request to decrease blowthrough, the method continues to 1242 to maintain the current valve positions and timings. Method 1200 then ends.

Figure 13:
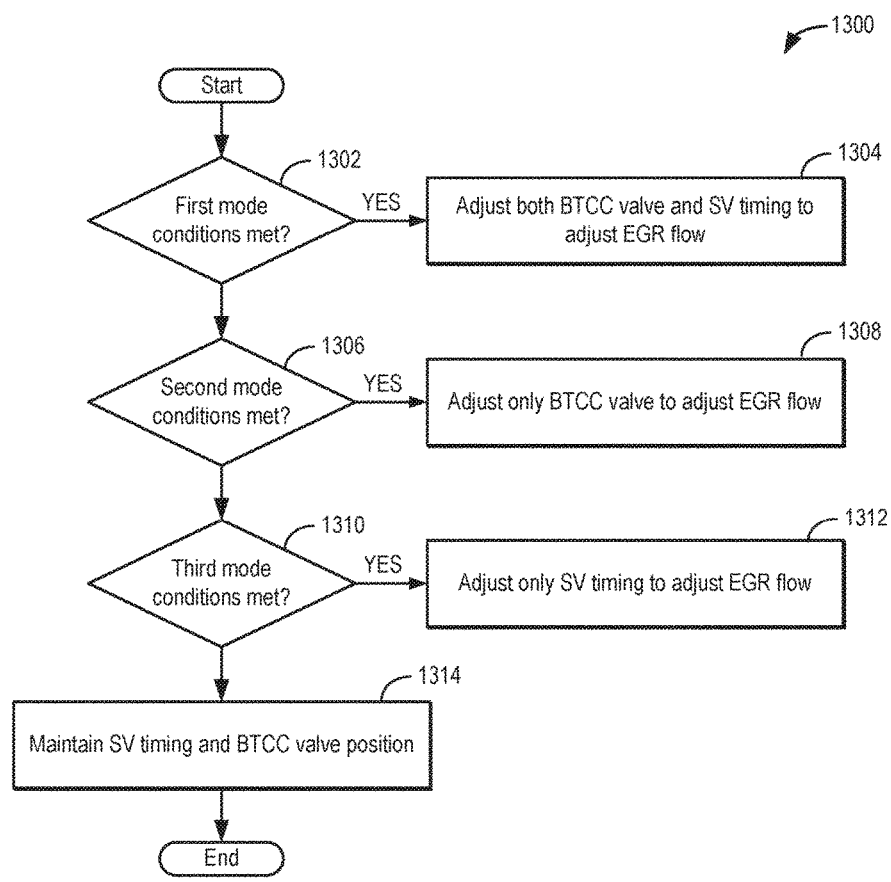
FIG. 13 shows a flow chart of a method for selecting between operating modes to adjust a flow of exhaust gases from engine cylinders to an intake passage via scavenge exhaust valves and a scavenge exhaust manifold of the split exhaust engine system.

FIG. 13 shows a method 1300 for selecting between operating modes to adjust the flow of exhaust gases (e.g., EGR flow) from engine cylinders to the intake passage via scavenge exhaust valves and the scavenge exhaust manifold. Method 1300 may continue from 1204 and 1214 of method 1200, as described above. Method 1300 begins at 1302 by determining whether first mode conditions are met. In one embodiment, first mode conditions for adjusting EGR flow may include when a requested change in the EGR flow to the intake is greater than a threshold level. The threshold level may be a non-zero, threshold amount of EGR flow that may not be achievable via only a single actuator adjustment. In another embodiment, first mode conditions for adjusting EGR flow to the intake may include when none of the BTCC valve and SVs are diagnosed as being mispositioned or degraded (e.g., such as during method 1100, as described above with reference to FIG. 11). If the first mode conditions are met at 1302, the method continues to 1304 to adjust both the BTCC valve and the SV timing to adjust the amount of EGR flow to the intake passage. For example, the method at 1304 may include adjusting together, at a same time, the position of the BTCC valve and the timing of the SVs to adjust the EGR flow to the desired level (e.g., to increase or decrease EGR flow, as described above with reference to FIG. 12). In another example, the method at 1304 may include first adjusting one of the BTCC valve position and the SV timing and then, directly following adjusting the first actuator, adjusting the other one of the BTCC valve position and the SV timing. In this way, adjusting the BTCC valve (e.g., opening) may adjust (e.g., increase or decrease) the EGR flow by a first amount and adjusting the SV timing (e.g., advancing or retarding) may adjust the EGR flow by a second amount. Thus, a larger adjustment in EGR flow may be achieved by adjusting both the BTCC valve position and the SV timing during the first mode.

Alternatively at 1302, if the first mode conditions are not met, the method continues to 1306 to determine whether the second mode conditions for adjusting EGR flow are met. In one embodiment, the second mode conditions may include one or more of when the timing of the SVs cannot be adjusted further for a current demanded direction of adjustment of the EGR flow and when the BTCC valve is in a partially open position and there is a request for both increased EGR flow and increased blowthrough air from the SVs to the intake passage. For example, the SV timing may not be able to be further adjusted if it is already at its maximum amount of retard (in the case of decreasing EGR flow) or advance (in the case of increasing EGR flow). In another embodiment, the second mode conditions may additionally or alternatively include when the difference between an actual timing of the SVs and an expected timing of the SVs is greater than a threshold (e.g., as explained above with reference to method 1100 of FIG. 11). Thus, if the SVs are diagnosed as not being at the correct timing or being degraded, they may not be used to adjust EGR flow. In this case, the BTCC valve may be adjusted to adjust the EGR flow to the desired level based on the actual timing of the SVs. If the second mode conditions are met at 1306, the method proceeds to 1308 to adjust only the BTCC valve to adjust the EGR flow to the desired level. For example, the method at 1308 may include only adjusting the position of the BTCC valve (e.g., increasing or decreasing the amount of opening or modulating the position between fully opened and fully closed) to adjust the EGR flow to the desired level and not adjusting the SV timing.

Alternatively at 1306, if the second mode conditions are not met, the method continues to 1310 to determine whether the third mode conditions for adjusting EGR flow are met. In one embodiment, the third mode conditions may include when the BTCC valve is already in a fully open position and in response to a request to increase the flow of exhaust gas from the SVs to the intake passage. In another embodiment, the third mode conditions may additionally or alternatively include when the difference between the actual pressure drop across the BTCC valve and the expected pressure drop across the BTCC valve is greater than a threshold (e.g., as explained above with reference to method 1100 of FIG. 11).

Thus, if the BTCC valve is diagnosed as mispositioned or degraded, it may not be used to adjust EGR flow. If the third mode conditions are met at 1310, the method proceeds to 1312 to adjust only the SV timing to adjust EGR flow. For example, the method t 1312 may include advancing or retarding the SV timing to adjust the EGR flow to the desired level and not adjusting the BTCC valve. As one example, if the BTCC valve is already fully opened and there is a request to increase EGR flow, the method at 1312 includes maintaining the BTCC valve in a fully open position and adjusting the timing of the SVs to adjust the EGR flow to the desired level.

If the third mode conditions are not met at 1310, the method continues to 1314 to maintain the SV timing and BTCC valve position at the current timings/positions. Method 1300 then ends.

Figure 22:
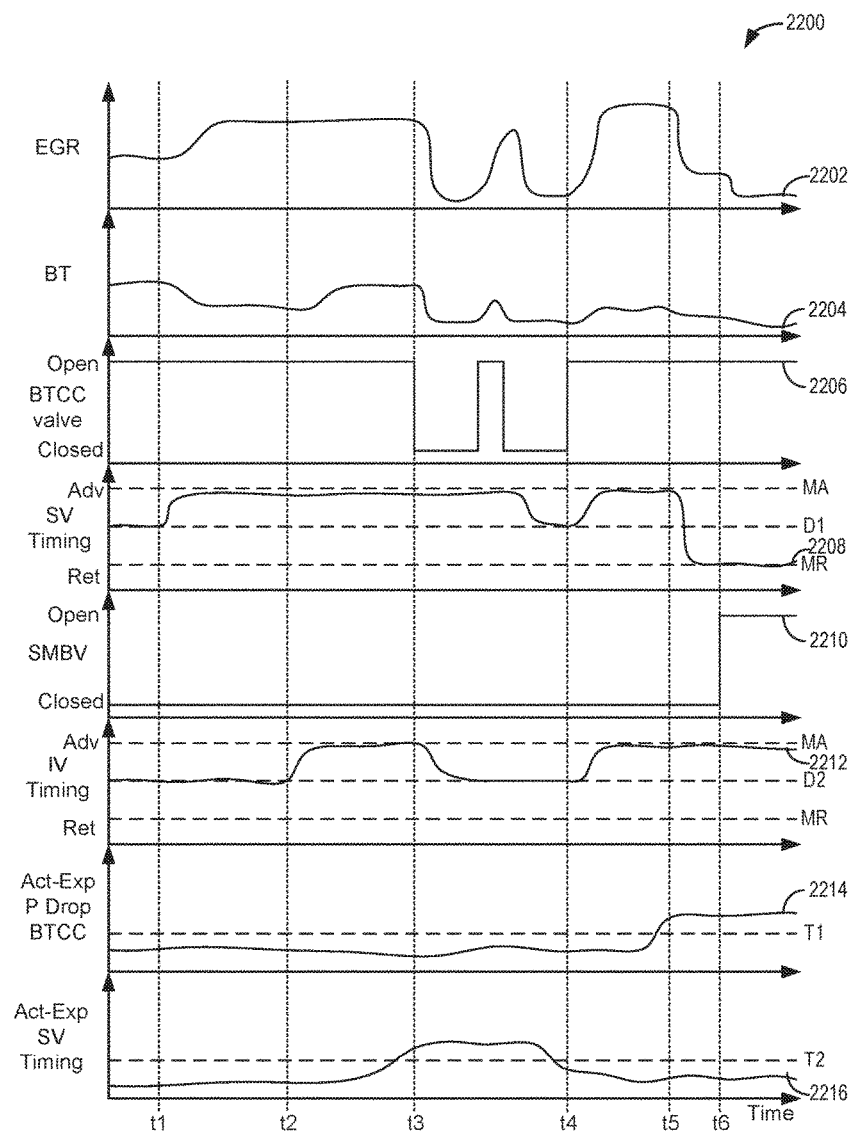
FIG. 22 shows an example graph of controlling one or more engine actuators to adjust exhaust gas recirculation (EGR) flow and blowthrough flow to an intake passage of the split exhaust engine system from scavenge exhaust valves of engine cylinders.

FIG. 22 shows a graph 2200 of controlling one or more engine actuators to adjust EGR flow and blowthrough flow to the intake passage from the scavenge exhaust valves. Specifically, graph 2200 depicts changes in EGR flow at plot 2202, changes in blowthrough flow (BT) at plot 2204, changes in a position of the BTCC valve at plot 2206, changes in SV timing at plot 2208 (relative to a default timing, D1, for best fuel economy, a maximum amount of advance, MA, and a maximum amount of retard, MR), changes in a position of the SMBV at plot 2210, changes in IV timing at plot 2212 (relative to a default timing, D2, for best fuel economy, a maximum amount of advance, MA, and a maximum amount of retard, MR), changes in a difference between an actual pressure drop and expected pressure drop across the BTCC valve (e.g., during valve diagnosis) at plot 2214, and changes in a difference between an actual timing and expected timing of the SVs at plot 2216.

Prior to time t1, the BTCC valve is fully opened, the SMBV is fully closed, IV timing is at its default timing D2, and SV timing is at its default timing D1. At time t1, there may be a request to increase EGR flow to the intake passage to a first level. In response to this request and because the BTCC valve is already in the fully open position, the SV timing is advanced to increase the EGR flow to the first level. Advancing the SV timing may also decrease BT. Thus, at time t2 there is a request to increase BT. However, since the EGR flow demand may still be at the first level, the intake valve timing is advanced at t2 while the SV timing is maintained at the advanced timing.

Prior to time t3, the difference between the actual and expected timing of the SVs increases above a threshold T2. Then, at time t3, there may be a request to decrease EGR flow and blowthrough. Thus, in response to the request and the diagnosis of the SV timing, at time t3, the BTCC valve is closed to decrease EGR flow and BT. Further, since the BTCC valve is closed, the intake valve timing may be returned to the default timing D2. Between time t3 and time t4, the position of the BTCC valve may be modulated between fully opened and fully closed to achieve the desired EGR flow to the intake. In alternate embodiments where the BTCC valve is a continuously variable valve adjustable into a plurality of positions between and including fully open and fully closed, the BTCC valve may be adjusted into and maintained at a partially closed position that delivers the desired EGR flow to the intake (e.g., instead of being modulated). Prior to time t4, the difference between the actual and expected SV timing may reduce back below the threshold T2. At time t4, there may again be a request to increase EGR, but to a second level that is higher than the first level requested at time t1. In response to this higher request that may be above a threshold increase in EGR flow, the BTCC valve is opened at time t4 and the SV timing is advanced. The IV timing may also be advanced at time t4 to maintain the BT at the desired level. In this way, both the BTCC valve and the SV timing are concurrently adjusted to adjust the EGR flow to the requested second level.

At time t5 there may be a request to decrease EGR flow. However, just before time t5, the difference between the actual and expected pressure drop across the BTCC valve may increase of a threshold T1. In response to the request and the diagnosis of the BTCC valve, the SV timing is retarded. However, at time t6 the SV timing may reach its maximum amount of retard but the EGR flow may still need to be reduced further. As a result, the SMBV may be opened to further reduce EGR flow to the intake passage. In this way, under different operating modes, one or more actuators (e.g., the BTCC valve, SV timing, IV timing, and/or the SMBV) may be adjusted to achieve the desired EGR flow and BT flow. For example, during a first mode, as shown at time t4, both the SV timing and BTCC valve are adjusted to deliver the desired EGR flow to the intake passage. As another example, during a second mode, as shown at time t3, only the BTCC valve is adjusted to deliver the desired EGR flow since the SVs are diagnosed as not being at the correct timing (and may possible have degraded function). However, at this time, the IV timing is also adjusted to maintain the desired BT flow. Further, during a third mode, as shown at time t5, only the SV timing is adjusted to adjust the EGR flow since the BTCC valve is diagnosed as having degraded function and/or being mispositioned. However, at time t6, when the SV timing reaches its maximum amount of retard, the SMBV is opened, in addition to the retarding SV timing, to achieve the higher desired EGR level. Adjusting the different valve actuators in coordination with one another (e.g., based on one another's current position, timing, and/or degradation or mispositioning state) may enable efficient delivery of both a desired EGR flow and BT flow amount to the intake passage via the SVs. A technical effect of adjusting a flow of exhaust gas from the scavenge exhaust valves to the intake passage, upstream of the compressor, via adjusting one or both of the BTCC valve and the timing of the scavenge exhaust valves, in the different modes described above, is delivering the desired EGR flow and blowthrough flow to the intake, even when one of the BTCC valve or SV timing is not able to be adjusted. Further, controlling the EGR flow in the third mode by adjusting only the SV timing may provide a more consistent EGR flow where a fixed amount of EGR is pushed to the intake passage in each engine cycle. For example, controlling the EGR flow in this way may allow the EGR valve to be an on/off valve, thereby simplifying EGR valve control and reducing engine system costs.

Figure 14:
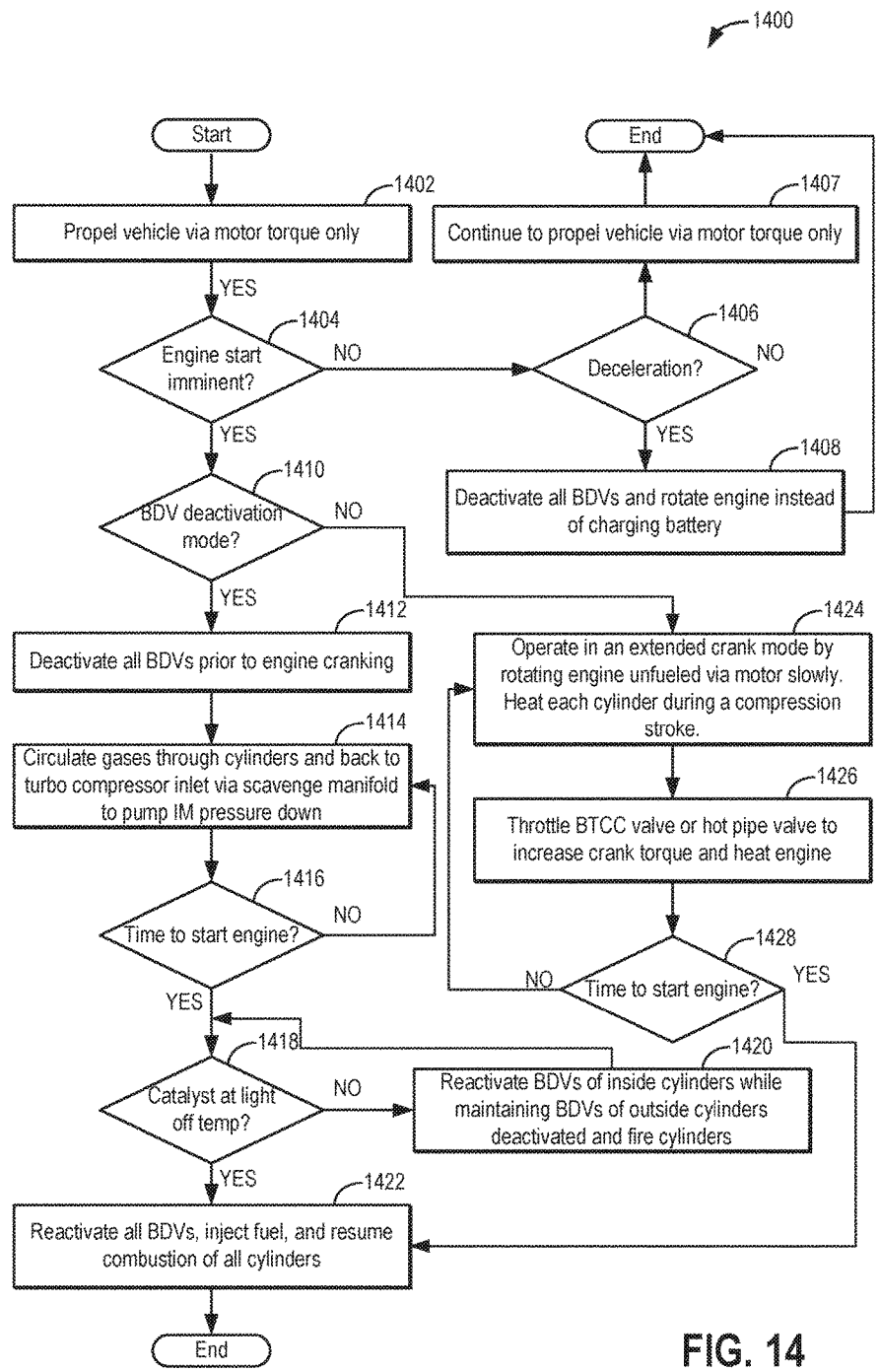
FIG. 14 shows a flow chart of a method for operating a hybrid electric vehicle including the split exhaust engine system in an electric mode.

FIG. 14 shows a method 1400 for operating the vehicle in the electric mode (e.g., electric-only mode). Method 1400 may continue from 405 of method 400, as described above. Method 1400 begins at 1402 by propelling the hybrid electric vehicle via motor torque only. For example, one or more clutches may be moved to disconnect the crankshaft of the engine from an electric machine and the components connected thereto and connect the electric machine with the transmission and wheels of the vehicle (such as the electric machine 161, transmission 167, and clutches 166 shown in FIG. 1B). In this way, the electric machine (e.g., motor) may provide torque to the vehicle wheels (using electrical power received from a traction battery).

At 1404, the method includes determining whether an engine start is imminent As one example, the controller may determine than an engine start (e.g., where the engine must be started to begin combusting to provide torque to propel the vehicle) is imminent in response to the battery state of charge and the driver torque demand. For example, if the demanded torque cannot be provided by the battery (at the current state of charge), a request to start the engine and operate the vehicle in the engine mode may be generated. In another example, if the demanded torque can only be provided by the battery for a limited duration, a request to start the engine within that limited duration may be generated. This duration may be based on an amount of time to increase the intake manifold pressure and/or piston temperature above threshold levels for starting the engine with reduced emissions, as described further below. However, if the demanded torque can be provided by only the battery (e.g., for longer than the limited duration), and thus an engine start is not imminent, the method may continue to 1406 to determine whether the vehicle is decelerating. In one example, the vehicle may be decelerating if an accelerator pedal is released and/or a brake pedal is depressed. In another example, the vehicle may be decelerating if engine speed is decreasing. If the vehicle is not decelerating, the method continues to 1407 to continue propel the vehicle via motor torque only. However, if the controller determines that the vehicle is decelerating, the method continues to 1408 to deactivate all blowdown exhaust valves (e.g., first exhaust valves 8 shown in FIG. 1A) of the engine cylinders and rotate the engine (via the crankshaft) using torque from the vehicle wheels instead of charging the battery. In one example, deactivating all the blowdown exhaust valves may include the controller deactivating one or more valve actuation systems of the blowdown exhaust valves to maintain the blowdown exhaust valves closed so that no gases travel to the exhaust passage via the cylinders. As a result, no gases may travel through the exhaust passage, thereby decreasing engine emissions. Rotating (e.g., spinning) the engine during the deceleration may result in warming up the engine, thereby increasing engine performance and reducing engine emissions upon engine startup.

Returning to 1404, if an engine start is imminent, the method continues to 1410 to determine whether to operate in a blowdown valve deactivation mode prior to the engine start (e.g., prior to the engine firing). In one embodiment, the controller may determine to operate the engine in the blowdown deactivation mode in response to an intake manifold pressure being above a threshold pressure. The threshold pressure may be based on an intake manifold pressure at which increased emissions may occur upon engine startup. In one example, the threshold pressure may be a pressure at or above atmospheric pressure. In another embodiment, the controller may determine not to operate the engine in the blowdown deactivation mode and to instead operate in an extended crank mode in response to a piston temperature being less than a threshold temperature. The threshold temperature may be a threshold temperature for restarting the engine with reduced emissions. For example, if the engine starts with the piston temperature below the threshold temperature, increased emissions may result. In one example, whether to operate in the blowdown valve deactivation mode or the extended crank mode, may be determined based on a threshold cylinder (or piston) temperature at which fuel is evaporated. Thus, the decision at 1410 may also be based on fuel type. If the piston (or cylinder) temperature is below the threshold temperature, which may be the temperature necessary to evaporate the current fuel type, the controller may determine to operate the engine in the extended crank mode at 1410.

If the blowdown valve deactivation mode is chosen at 1410, the method continues to 1412 to deactivate all the blowdown exhaust valves (e.g., deactivate the blowdown exhaust valve 8 of each cylinder, as shown in FIG. 1A) prior to engine cranking As a result, no gases passing through the engine cylinders may flow to the exhaust passage. At 1414, the method includes circulating gases through the engine cylinders and back to the turbocharger compressor inlet (e.g., compressor 162 shown in FIG. 1A) via the scavenge exhaust manifold (e.g., second exhaust manifold 80 shown in FIG. 1A) and the scavenge exhaust valves (e.g., scavenge exhaust valves 6 shown in FIG. 1A) to pump the intake manifold pressure down. In this way, gases may enter the engine cylinders via the intake manifold, exit the engine cylinders via the scavenge exhaust valve of each cylinder, and then flow into the scavenge exhaust manifold, through the EGR passage, to the intake passage, and back to the intake manifold. This may be repeated for multiple rotations of the crankshaft For example, the method at 1414 may be repeated until the manifold pressure decreases below a lower threshold pressure or until an indication that the engine needs to be started is received. At 1416, if it is decided that it is time to start the engine (e.g., based on the intake manifold pressure decreasing below the lower threshold pressure for the engine start and/or based on the torque demand no longer being able to be supplied by the battery), the method continues to 1418 to determine whether a catalyst disposed in the exhaust passage (e.g., emission control device 70 and/or 72 shown in FIG. 1A) is at a light-off temperature. If the catalyst is not at the light-off temperature, the method continues to 1420 to reactivate the blowdown exhaust valves of the inside cylinders while maintaining the blowdown exhaust valves of the outside cylinder deactivated and firing the cylinders. As one example, the inside cylinders may include the cylinder oriented inside of and between the outside cylinders of the engine (e.g., as shown in FIG. 1A, cylinders 14 and 16 are inside cylinders and cylinders 12 and 18 are outside cylinders). This may help the catalyst(s) to reach their light-off temperatures more quickly. Alternately at 1418, if the catalyst is at the light-off temperature, the method continues to 1422 to reactivate all the blowdown exhaust valves of all the cylinders, inject fuel into each of the cylinders, and resume combustion at each of the cylinders. As a result, the vehicle may begin operating in the engine (e.g., engine-only or assist mode) mode and stop operating in the electric-only mode.

Returning to 1410, if it is determined that the engine should operate in the extended crank mode instead of the blowdown valve deactivation mode, the method continues from 1410 to 1424. At 1424, the method includes operating in the extended crank mode by rotating the engine unfueled via the motor (e.g., electric motor) slowly. The method at 1424 further includes heating each cylinder during a compressor stroke of the cylinder. For example, the method at 1424 may include, while propelling the hybrid vehicle via only motor torque and before engine restart, rotating the engine unfueled via the motor torque at lower than a threshold speed. Herein, the electric motor of the vehicle may be propelling the vehicle and rotating the engine. The threshold speed may be, in one example, an engine cranking speed. That is, the engine may be spun at a speed slower than the speed at which the engine would have been spun by a starter motor during engine crank and restart. For example, during engine cranking, the engine may be rotated unfueled via a starter motor at 150rpm. In comparison, during the slow rotating for cylinder heating, the engine may be rotated at 10-30rpm via the electric motor/generator of the hybrid vehicle. In alternate examples, the threshold speed at or below which the engine is slowly rotated may be higher or lower based on operating parameters such as oil temperature, ambient temperature, or NVH. In one example, slow engine rotating may be initiated in a cylinder (e.g., a first cylinder) selected based on a proximity of a cylinder piston position relative to a compression stroke TDC. For example, a controller may identify a cylinder having a piston positioned closest to compression stroke TDC or at a position where at least a threshold level of compression is experienced. The engine is then rotated so that each cylinder is sequentially heated during a compression stroke of the cylinder. As rotation continues, each cylinder may be cooled during an expansion stroke of the cylinder, immediately following the compression stroke. However, the cylinder may be heated more during the compression stroke than the cylinder is cooled during the expansion stroke allowing for a net heating of each cylinder via a heat pump effect. As such, during a compression stroke of each cylinder, air-charge is compressed, generating heat. By rotating an engine so that a cylinder is held in the compression stroke, heat from the compressed air can be transferred to the cylinder walls, cylinder head, and piston, raising engine temperature.

Continuing to 1426, the method includes throttling the BTCC valve (e.g., first EGR valve 54 shown in FIG. 1A) or the hot pipe valve (e.g., third valve 32 shown in FIG. 1A) to increase the cranking torque and, as a result, further heat the engine. In one example, throttling the BTCC valve or the hot pipe valve may include at least partially closing (or decreasing the amount of opening of) the BTCC valve or the hot pipe valve. In some examples at 1426, the intake throttle and the BTCC valve may be closed to recirculate gases through the cylinders via the hot pipe (and not the EGR passage) while the hot pipe valve is partially closed (e.g., throttled) to increase cranking torque. In other example, the intake throttle may remain open and the hot pipe valve may be fully closed to recirculate gases through the cylinders via the EGR passage (e.g., first EGR passage 50 shown in FIG. 1A) while the BTCC valve is partially closed (e.g., throttled) to increase cranking torque. At 1428, the method includes determining whether it is time to start (e.g., restart) the engine. In one example, the engine may not be started until the piston temperature increases above the threshold temperature. If it is not time to start the engine, the method returns to 1424 and 1426 to continue operating in the extended crank mode. Otherwise, if it is time to start the engine, the method continues to 1422 to restart the engine, as described above.

Figure 23:
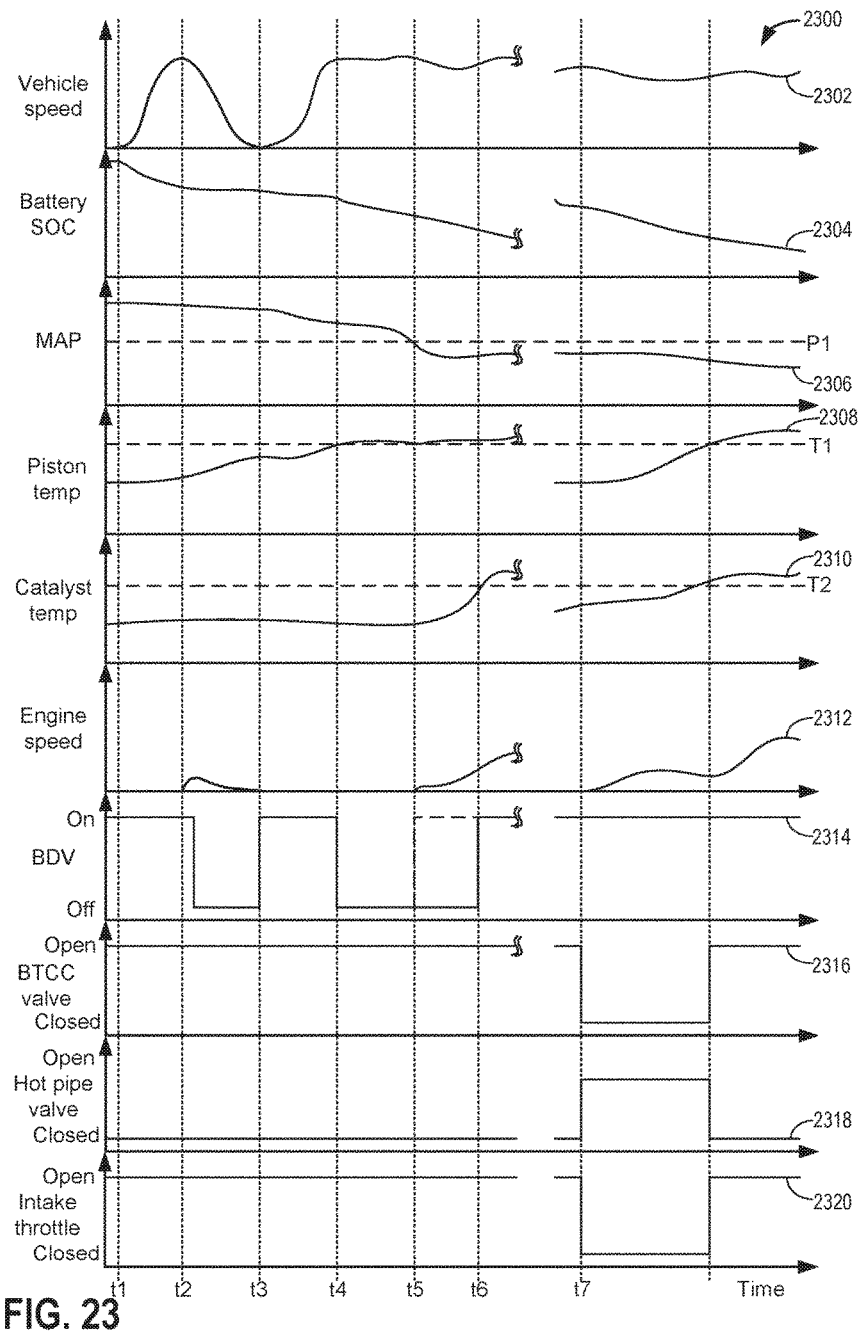
FIG. 23 shows an example graph of operating a hybrid electric vehicle in an electric mode to heat the split exhaust engine system prior to starting the engine.

FIG. 23 shows a graph 2300 of operating the hybrid electric vehicle in the electric mode to heat the engine system prior to starting the engine. Specifically, graph 2300 depicts vehicle speed at plot 2302, battery state of charge (SOC) at plot 2304, intake manifold pressure (MAP) at plot 2306, piston temperature at plot 2308, catalyst temperature at plot 2310, engine speed at plot 2312, an activation state of cylinder blowdown exhaust valve (BDVs) at plot 2314, a position of the BTCC valve (e.g., first EGR valve 54 shown in FIG. 1A) at plot 2316, a position of a hot pipe valve (e.g., valve 32 shown in FIG. 1A) at plot 2318, and a position of an intake throttle (e.g., throttle 62 shown in FIG. 1A) at plot 2320. All plots are shown over time along the x-axis.

The vehicle may be operating in an electric mode and propelled via motor torque only prior to time t1. For example, engine start conditions may not be met prior to time t1. Between time t1 and t2, as operator torque demand and correspondingly vehicle speed vary, the battery SOC may vary with the battery SOC being reduced at a higher rate when the vehicle speed increases. While the vehicle is propelled using motor torque between time t1 and t2, the piston temperature may be below threshold temperature T1 and MAP may be above threshold pressure P1.

At time t2, operator torque demand and vehicle speed decrease. As a result, the battery SOC may stop decreasing, or decrease at a slowly rate. Shortly after time t2, a vehicle deceleration event occurs. During this event, instead of dissipating the wheel torque as heat or using it to recharge the battery, the engine is opportunistically rotated, unfueled, via the wheels and the blowdown exhaust valves of all the engine cylinders are deactivated. For example, at least some of the wheel torque is applied to engine rotation via a motor/generator of the vehicle with a transient increase in the speed of engine rotation. As a result of rotating the engine and deactivating the blowdown valves, air is recirculated through the engine via the scavenge exhaust valves, EGR passage, and open BTCC valve and thus, the piston temperature is increased. Once the vehicle speed drops, the opportunistic engine rotation is stopped. In alternate embodiments, in an engine system including a hot pipe (e.g., hot pipe 30 shown in FIG. 1A) coupled between the scavenge exhaust manifold and the intake manifold, downstream of an intake throttle, the intake throttle and BTCC valve may be closed while a valve in the hot pipe is opened to allow recirculation of air through the engine cylinders via the scavenge exhaust valves and the hot pipe.

At time t3, the deceleration event ends and the vehicle speed increases again. At time t4, there may be an indication that an engine start is imminent In response to the MAP being above the threshold pressure P1 and piston temperature being above the threshold temperature T1 during the indication of the imminent engine start, all the BDVs of all the engine cylinders are again deactivated. While the BTCC valve is open, gases are circulated through the engine cylinders and back to the intake passage via the scavenge exhaust valves, the scavenge exhaust manifold, and the EGR passage. As a result, the intake manifold pressure decreases. At time t5, the intake manifold pressure decreases below the threshold pressure P1. As a result, the engine may be started. However, since the catalyst temperature is below the light-off temperature T2, the BDVs of only the inside engine cylinders may be reactivated while the BDVs of the outside cylinders remain deactivated. Then, when the catalyst temperature increases above the light-off temperature T2 at time t6, the BDVs of the outside cylinders are reactivated.

After a duration of time (e.g., after an engine shutdown and/or key-off shutdown of the vehicle), the vehicle may again be operating in the electric mode and propelled entirely via motor torque. At time t7, there may be an indication that an engine start is imminent while piston temperature is below the threshold temperature T1. In response, the vehicle may be operated in an extended crank mode where the engine is rotated unfueled via the electric motor slowly (e.g., at less than a cranking speed). While rotating the engine, the BTCC valve may be closed, the hot pipe valve at least partially opened, and the intake throttle closed. Further, the hot pipe valve may not be fully opened (so that it is partially throttled) in order to increase cranking torque and further increase heating of the engine. As a result of this operation, air is warmed in the cylinders during the compression stroke and then recirculated through the engine system via the scavenge exhaust valves, scavenge exhaust manifold, hot pipe, and intake manifold, thereby increasing piston temperature. At time t8, the piston temperature increases above the threshold temperature T1. As a result, the engine is restarted and the BTCC valve and intake throttle are opened and the hot pipe valve is closed.

In this way, an engine of a hybrid vehicle may be slowly cranked using a motor during a transition from operating in an electric mode to an engine mode to heat the engine before an engine start. By slowly spinning the engine, unfueled, for a duration before an engine restart, heat generated from air compressed in a cylinder during a compression stroke can be transferred to cylinder walls and pistons, and advantageously used to heat the engine. Further, by throttling the hot pipe valve (or BTCC valve if gases are recirculated via the EGR passage instead of the hot pipe), the cranking torque is increased, thereby further increasing the warming of the engine. Thus, a technical effect of rotating the engine unfueled via motor torque at less than a cranking speed while at least partially throttling the BTCC valve or hot pipe valve, is increasing the piston temperature and the rest of the engine, thereby reducing cold start emissions and starting the engine more quickly. In another example, by deactivating the blowdown exhaust valves and recirculating air through the engine cylinders, scavenge exhaust manifold, and EGR passage, the intake manifold pressure may be pumped down and/or the engine temperature may be increased. In this way, the engine may be started more quickly and overall engine cold-start exhaust emissions and engine performance can be improved. Thus, a technical effect of deactivating the blowdown exhaust valves and circulating air through the engine cylinders during the electric mode is decreasing the intake manifold pressure, increasing the engine temperature, and thus, starting the engine more quickly while reducing emissions.

Figure 15:
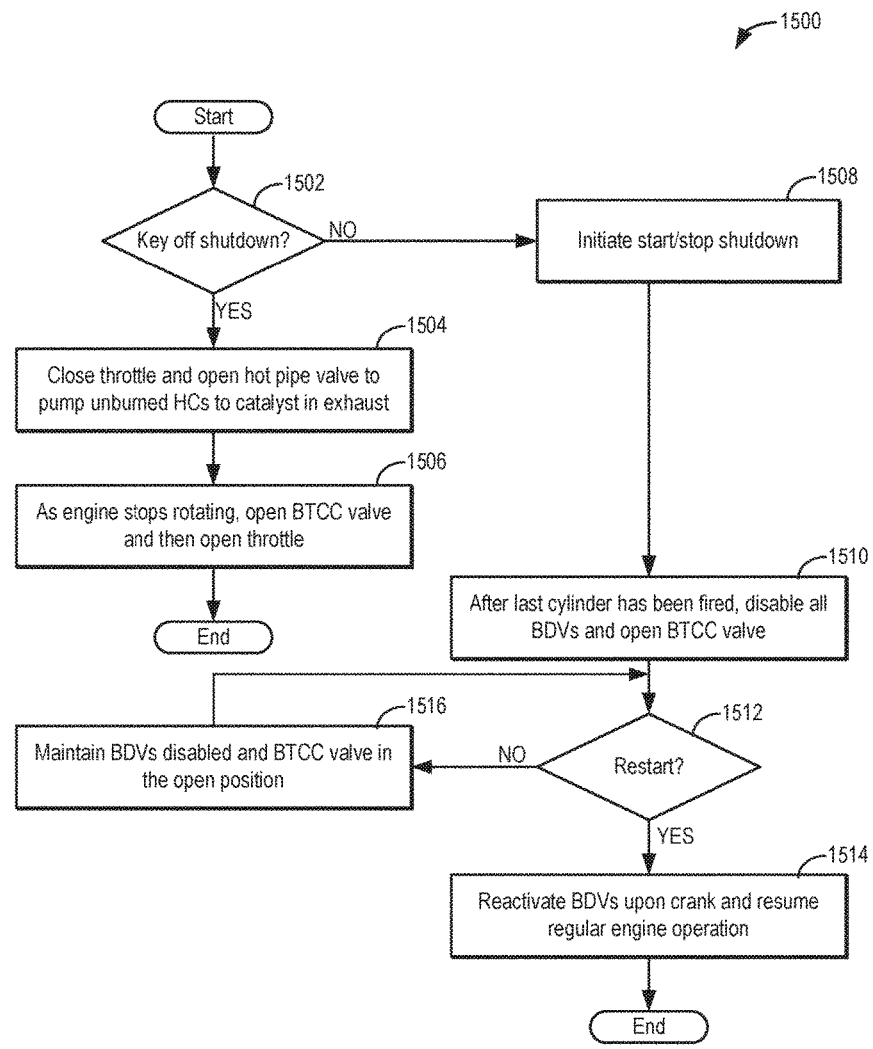
FIG. 15 shows a flowchart of a method for operating the split exhaust engine system in a shutdown mode.

FIG. 15 shows a method for operating the engine system in a shutdown mode. Method 1500 may continue from 426 of method 400, as described above. Method 1500 begins at 1502 by determining if the detected or indicated shutdown event is a key off shutdown. In one example, the indicated shutdown event may be determined to be a key off shutdown event in response to the controller receiving a signal that an ignition (operated by a user) of the engine has been turned off. In another example, the indicated shutdown event may be determined to be a key off shutdown event in response to the controller receiving signal that the engine has been turned off (e.g., via an ignition being turned off) and the vehicle being put in park. In this way, the key off shutdown may be a shutdown during which the engine is expected to be turned off for a threshold amount of time and not restarted for a duration. If the shutdown at 1502 is a key off shutdown, the method continues to 1504 to close the intake throttle (e.g., throttle 62 shown in FIG. 1A) and open the hot pipe valve (e.g., valve 32 shown in FIG. 1A) to pump unburned hydrocarbons to a catalyst (e.g., one of emission control devices 70 and 72 shown in FIG. 1A) in the exhaust passage of the engine. During this time, the blowdown exhaust valves may remain activated. Further, the method at 1504 may further include, during the closing the intake throttle and opening the first hot pipe valve, closing the BTCC valve (e.g., valve 54 shown in FIG. 1A). As a result, unburned hydrocarbons may be recirculated from engine cylinders back to the intake manifold via the scavenge exhaust valves, scavenge exhaust manifold, and hot pipe (e.g., passage 30 shown in FIG. 1A). The recirculated unburned hydrocarbons may then be pumped from the engine cylinders to the exhaust passage including the catalyst via the blowdown exhaust valves. This may reduce the amount of hydrocarbons in the engine while the engine is shut down and may maintain the catalyst at stoichiometry at shutdown and for a subsequent restart.

At 1506, the method includes, as the engine stops rotating, opening the BTCC valve and then opening the throttle. For example, in response to a crankshaft of the engine stopping rotating, the controller may actuate an actuator of the BTCC valve to open the BTCC valve and an actuator of the throttle to open the throttle. This may reduce the amount of exhaust gases pulled back into the intake (e.g., intake passage) of the engine. Further, the method at 1506 may include first opening the BTCC valve and then, in response to the BTCC valve being opened, opening the throttle.

Returning to 1502, if the shutdown is not a key off shutdown, the method may determine the shutdown to be a start/stop shutdown and thus continue to 1508. As one example, the controller may determine that the shutdown is a start/stop shutdown request responsive to the vehicle being stopped for a threshold duration but not keyed off (e.g., when the vehicle is stopped at a stoplight). At 1508 the method includes initiating the start/stop shutdown. The method then continues to 1510 to disable (e.g., deactivate) all the blowdown exhaust valves (e.g., valves 8 shown in FIG. 1A) of the engine and open the BTCC valve, after the last cylinder of all the engine cylinders has been fired. Said another way, once the final cylinder fires (e.g., the final cylinder that undergoes combustion before no more cylinders are fired and the engine shuts down), the controller may deactivate the valve actuators of the blowdown exhaust valves such that the blowdown exhaust valves remain closed and do not exhaust gases to the exhaust passage. As a result, gases from all the engine cylinders are recirculated to the intake manifold via the scavenge exhaust valves and the EGR passage. This will run down the pressure in the intake manifold during engine rundown (e.g., while the speed of the crankshaft decreases and eventually comes to a stop).

At 1512, the method includes determining if there is a request to restart the engine. In one example, the request to restart the engine may be generated in response to an increase in torque demand from a stopped position of the vehicle. For example, if a brake pedal is released and/or an accelerator pedal of the vehicle is depressed, a restart request may be generated. If there is not a request to restart the engine, the method continues to 1516 to maintain the blowdown exhaust valves disabled and the BTCC valve in the open position. Otherwise, if there is a request to restart the engine, the method continues to 1514 to reactivate the blowdown exhaust valves upon an initial cranking operation of the crankshaft Regular engine operation is then resumed. For example, the method may end and/or return to method 400. As explained above, reactivating the blowdown exhaust valves may include the controller sending a signal to the valve actuators of the blowdown exhaust valves to resume opening and closing the blowdown exhaust valves at their set timing.

Figure 24:
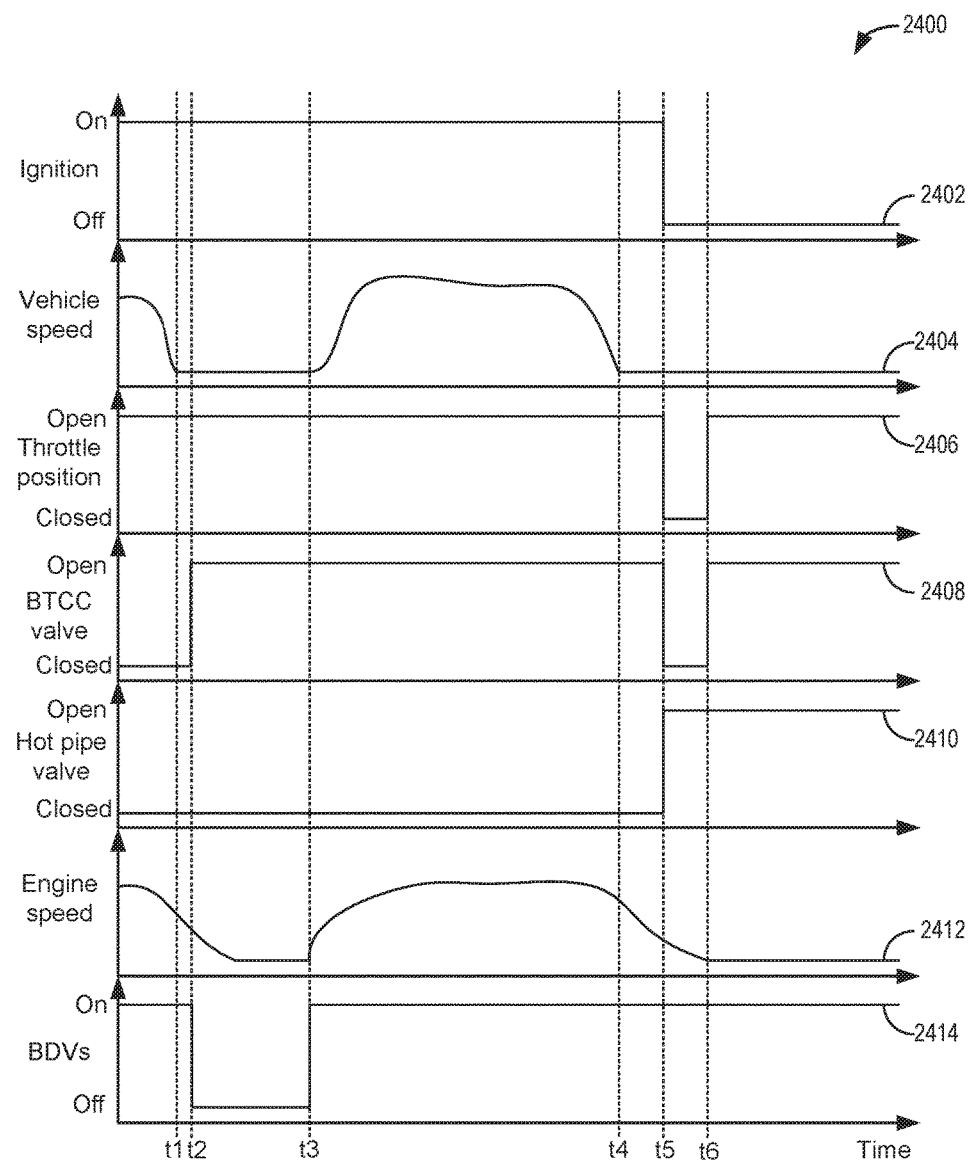
FIG. 24 shows an example graph of changes in engine operating parameters during operating the split exhaust engine in a shutdown mode.
Figure 25:
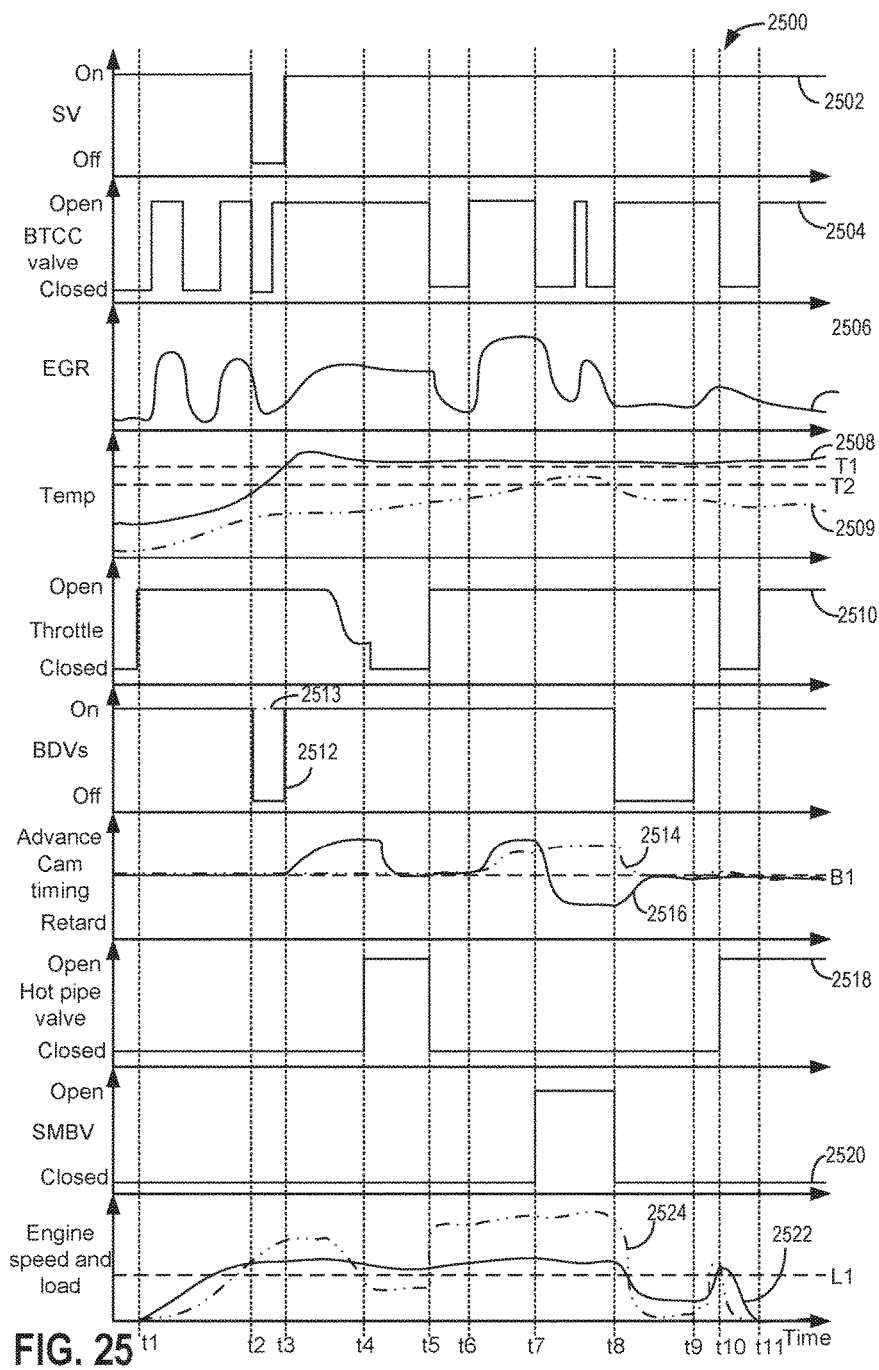
FIG. 25 shows an example graph of operation of the split exhaust engine system from startup to shutdown.

FIG. 24 shows a graph 2400 of operating the split exhaust engine system of the vehicle in the shutdown mode. Specifically, graph 2400 depicts whether an ignition of the vehicle is on or off at plot 2402, vehicle speed at plot 2404, a position of the throttle at plot 2406, a position of the BTCC valve at plot 2408, a position of the hot pipe valve at plot 2410, engine speed at plot 2412, and an activation state (e.g., on/off or enabled/disabled) of the blowdown exhaust valves (BDVs) at plot 2414. All plots are shown over time along the x-axis.

Prior to time t1, the engine is operating and vehicle speed is above a stationary level (e.g., a level at which the vehicle may be stationary and not moving). Further, all BDVs of all engine cylinders are activated and operating at their set timing (which is different than the opening timing of the scavenge exhaust valves) prior to time t1. At time t1, the vehicle speed decreases to approximately zero, thereby indicating that the vehicle is stopped. The ignition of the engine remains on at time t1. In response to the vehicle being stopped, a start/stop shutdown is initiated. This may include firing a last engine cylinder at time t2. Then, in response to firing the last engine cylinder, all the BDVs (e.g., each BDV of each cylinder) are disabled at time t2 at the BTCC valve is opened. During this time, the scavenge exhaust valves may remain active and thus gases from the engine cylinders are routed to the intake passage via the scavenge exhaust manifold and EGR passage. When the BDVs are disabled, they may remain closed and thus no gases from the engine cylinders are routed to the exhaust passage of the engine. Just before time t3, a request to restart the engine may be received by the controller (e.g., via an operator releasing a brake pedal and pressing an accelerator pedal, thereby indicating an increase in torque demand from the stopped position). The crankshaft is cranked at time t3 and thus the engine speed begins to increase. At the initial crank at time t3, the BDVs are reactivated. The cylinders begin firing again and at least some exhaust gases may be directed to the exhaust passage via the BDVs. Regular engine operation is resumed.

After a period of time, at time t4, the vehicle speed decreases to substantially zero, indicating that the vehicle has stopped. At time t5, the ignition to the engine is turned off (e.g., manually turned off via a vehicle operator). In response to the vehicle be stopped (e.g., in park) and the engine being turned off via the ignition (e.g., keyed off), the throttle is closed, the BTCC valve is close, and the hot pipe valve is opened. As a result, engine gases are recirculated via the scavenge exhaust manifold and the hot pipe, thereby decreasing intake manifold pressure. As the engine stops rotating (engine speed reaches approximately zero), the throttle and the BTCC valve are both opened.

In this way, during a key off engine shutdown (as shown at time t5) or a start/stop shutdown (as shown at time t1), the throttle valve, BTCC valve, BDVs, and/or hot pipe valve may be adjusted to reduce the amount of hydrocarbons in the intake of the engine, reduce the intake manifold pressure, and bring a catalyst to or near stoichiometry. This may reduce engine emissions during the shutdown and improve engine operation (and reduce emissions) during a subsequent engine start or restart. A technical effect of closing the intake throttle and opening the hot pipe valve in response to a request to shut down the engine (e.g., key off request) is reducing engine reversal and flowing unburned hydrocarbons to the catalyst in the exhaust, thereby reducing hydrocarbons in the engine system and maintaining the catalyst at stoichiometry. A technical effect of deactivating the BDVs and opening the BTCC valve is recirculating gases through the engine, thereby reducing the intake manifold pressure before shutting down the engine.

FIG. 25 shows a graph 2500 of example operation of the split exhaust engine from startup to shutdown. Specifically, graph 2500 depicts an activation state of the scavenge exhaust valves (SV, where on is activated and off is deactivated) at plot 2502, a position of the BTCC valve at plot 2504, EGR flow (e.g., through the EGR passage 50 and to the compressor inlet, as shown in FIG. 1A) at plot 2506, a temperature of an exhaust catalyst (e.g., such as a catalyst of one of emission control devices 70 and 72 shown in FIG. 1A) relative to a light-off temperature T1 at plot 2508, a temperature at an outlet of the turbocharger compressor (e.g., compressor 162 shown in FIG. 1A) relative to a threshold outlet temperature T2 at plot 2509, a position of an intake throttle (e.g., throttle 62 shown in FIG. 1A) at plot 2510, an activation state of the blowdown exhaust valves (BDVs) of outside cylinders (e.g., cylinders 12 and 18 shown in FIG. 1A) at plot 2512, an activation state of the BDVs of inside cylinders (e.g., cylinders 14 and 16 shown in FIG. 1A) at plot 2513, a cam timing of the intake valves at plot 2514 and the exhaust valves (which may include the blowdown exhaust valves and the scavenge exhaust valves when they are controlled on the same cam timing system) at plot 2516 relative to their base timings B1 (an example of the base cam timings of the intake and exhaust valves may be shown in FIG. 3B, as described above), a position of the hot pipe valve (e.g., valve 32 shown in FIG. 1A) at plot 2518, a position of the SMBV (e.g., SMBV 97 shown in FIG. 1A), engine speed at plot 2522, and engine load at plot 2524. All plots are shown over time along the x-axis.

Prior to time t1, the engine starts (e.g., in response to an operator of the vehicle turning on an ignition) with the scavenge exhaust valves default activated. As such, the scavenge exhaust valves may open and close at their set timing in the engine cycle. At time t1, the BTCC valve is opened for the initial crank. As such, the EGR flow begins to increase after time t1 (and may increase and decrease over time with the opening and closing of the BTCC valve, respectively). After firing the first cylinder, the BTCC valve is modulated to control EGR flow to a desired level. Also between time t1 and time t2, the hot pipe valve and SMBV are closed and both the intake and exhaust valve timings are at their base timings B1. At time t2, the scavenge exhaust valves can be adjusted (e.g., due to the oil pressure having reached a threshold to adjust the valves), so the scavenge exhaust valves are deactivated (e.g., turned off). After time t2, the catalyst temperature is still below its light-off temperature T1. Thus, the BDVs of the outside cylinders (e.g., cylinders 12 and 18 shown in FIG. 1A) are deactivated to reduce heat loss during catalyst light off. Further, compression heat may warm up the cylinder further since airflow to all cylinders is maintained during the BDV deactivation. This may result in warming of the catalyst to a temperature above the light-off temperature T1.

At time t3, the catalyst temperature increases above its light-off temperature T1 and there may also be a request to increase EGR flow to the intake passage via the EGR passage and scavenge manifold. In response to the request to increase EGR flow, the BTCC valve is maintained open and the SV timing is advanced at time t3. Just before time t4, engine load decreases below a threshold load L1 and the throttle position is adjusted to a partially closed position (e.g., part throttle). In response to this low load condition, at time t4 the throttle is closed, the BTCC valve is opened, and the hot pipe valve is opened to operate the engine in a hot pipe mode. At time t5, there is an increase in torque demand (and thus engine load increases). As a result, an electric compressor may be turned on to increase boost pressure. In response to the electric compressor turning on, the BTCC valve may be closed. At time t6, the electric compressor may be turned off upon reaching the target boost pressure and there may also be a request for increased EGR. In response to this request (which may be over a threshold amount of EGR flow), both the BTCC valve is opened and the SV timing is advanced to increase EGR flow. The IV timing may also be advanced at time t6 to maintain blowthrough to the intake at the desired level while advancing the SV timing to increase EGR flow. Between time t6 and time t7 engine load continues to increase and thus EGR flow to the intake passage, upstream of the compressor also increases.

At time t7, the outlet temperature of the compressor increases above a threshold outlet temperature T2. In response to this increase, the position of the BTCC valve is modulated to decrease EGR flow, the SMBV is opened, the SV timing is retarded, and the IV timing is advanced. As a result, EGR flow to the intake passage, upstream of the compressor decreases and the compressor outlet temperature decreases. At time t8, there is a sudden decrease in engine load that may result from an operator taking their foot off of an accelerator pedal. Thus, a deceleration fuel shutoff (DFSO) event may occur where fueling is stopped to all cylinders of the engine. As a result of stopping fueling during the DFSO event, all the BDVs of all the engine cylinders are deactivated. In alternate embodiments, only a portion of the BDVs may be deactivated (e.g., the BDVs of only the inside or outside cylinder, or for three out of four engine cylinders). In response to the DFSO event ending due to an increase in load at time t9, the BDVs are reactivated and fuel injection to the engine cylinders is reactivated.

At time t10, the vehicle stops and thus the engine load decreases to zero. At this time, a vehicle operator may put the vehicle in park and turn off the ignition of the engine. As a result, of the key-off shutdown event at time t10, the throttle is closed, the BTCC valve is closed, and the hot pipe valve is opened. As a result, engine gases are recirculated via the scavenge exhaust manifold and the hot pipe, thereby decreasing intake manifold pressure. As the engine stops rotating (engine speed reaches approximately zero) at time t11, the throttle and the BTCC valve are both reopened.

In this way, a split exhaust engine with a scavenge, first exhaust manifold that routes EGR and blowthrough air to an intake of the engine, upstream of a turbocharger compressor, and a blowdown, second exhaust manifold that routes exhaust to a turbocharger turbine in an exhaust passage of the engine (such as the engine shown in FIGS. 1A-1B) may be operated under different engine operating modes to reduce emissions, increase torque output, reduce knock, and increase engine efficiency.

As one embodiment, a method includes, while propelling a hybrid vehicle via motor torque: deactivating a first set of exhaust valves coupled exclusively to a first exhaust manifold coupled to an exhaust passage; and circulating gases through engine cylinders and to an intake passage via a second set of exhaust valves coupled exclusively to a second exhaust manifold. In a first example of the method, the deactivating the first set of exhaust valves and circulating gases through the engine cylinders is responsive to a request to restart an engine of the hybrid vehicle via combusting fuel at engine cylinders of the engine. A second example of the method optionally includes the first example and further includes, wherein the deactivating the first set of exhaust valves and circulating gases through the engine cylinders is further responsive to an intake manifold pressure of the engine being greater than a threshold pressure. A third example of the method optionally includes one or more of the first and second examples, and further includes, after the intake manifold pressure is higher than the threshold pressure, resuming cylinder fuel injection to restart the engine. A fourth example of the method optionally includes one or more of the first through third examples, and further includes, in response to a temperature of a catalyst disposed in the exhaust passage being above a light off temperature, reactivating all exhaust valves of the first set of exhaust valves when resuming cylinder fuel injection to restart the engine. A fifth example of the method optionally includes one or more of the first through fourth examples, and further includes, in response to a temperature of a catalyst disposed in the exhaust passage being below a light off temperature, reactivating only exhaust valves of the first set of exhaust valves coupled to inside cylinders of the engine cylinders and maintaining exhaust vales of the first set of exhaust valves coupled to outside cylinders of the engine cylinders deactivated when resuming cylinder fuel injection to restart the engine. A sixth example of the method optionally includes one or more of the first through fifth examples, and further includes, wherein the deactivating the first set of exhaust valves and circulating gases through the engine cylinders is further responsive to deceleration of the hybrid vehicle. A seventh example of the method optionally includes one or more of the first through sixth examples, and further includes, during the deceleration of the hybrid vehicle, rotating an engine of the hybrid vehicle instead of charging of battery of the hybrid vehicle via wheel torque generated during the deceleration. An eighth example of the method optionally includes one or more of the first through seventh examples, and further includes, wherein the second exhaust manifold is coupled to the intake passage, upstream of a turbocharger compressor, via an exhaust gas recirculation (EGR) passage. A ninth example of the method optionally includes one or more of the first through eighth examples, and further includes, wherein each cylinder includes one exhaust valve of the first set of exhaust valves and one exhaust valve of the second set of exhaust valves As another embodiment, a method for a hybrid vehicle includes, in response to a piston temperature of an engine of the vehicle being less than a threshold while the vehicle is propelled via motor torque only, rotating the engine unfueled via the motor torque at less than cranking speed to sequentially heat all engine cylinders as they pass through a compression stroke while at least partially throttling a valve disposed in a passage coupled between a first exhaust manifold and an intake passage, the first exhaust manifold coupled to a first set of exhaust valves. In a first example of the method, the method further includes operating the first set of exhaust valves at a different timing than a second set of exhaust valves coupled to a second exhaust manifold, the second exhaust manifold coupled to an exhaust passage including a turbocharger turbine. A second example of the method optionally includes the first example and further includes, wherein the passage is coupled to the intake passage, upstream of a turbocharger compressor. A third example of the method optionally includes one or more of the first and second examples, and further includes, wherein the passage is coupled to the intake passage, downstream of a turbocharger compressor and an intake throttle. A fourth example of the method optionally includes one or more of the first through third examples, and further includes, decreasing an amount of opening of the intake throttle while at least partially throttling the valve disposed in the passage. A fifth example of the method optionally includes one or more of the first through fourth examples, and further includes, wherein the rotating the engine unfueled while at least partially throttling the valve is further response to a request to restart the engine and stop propelling the vehicle via motor torque only.

As yet another embodiment, a method for a hybrid vehicle includes, in response to a request to restart an engine of the hybrid vehicle while the vehicle is being propelled via motor torque only, during a first mode, rotating the engine unfueled via the motor torque at less than cranking speed while at least partially opening a valve disposed in a passage coupled between a first exhaust manifold and an intake passage to recirculate heated aircharge through engine cylinders of the engine, the first exhaust manifold coupled to a first set of exhaust valves; and during a second mode, deactivating all exhaust valves of a second set of exhaust valves coupled to a second exhaust manifold coupled to an exhaust passage and circulating gases through the engine cylinders and to the intake passage via the first set of exhaust valves and the passage. In a first example of the method, the first mode includes when a piston temperature is less than a threshold while propelling the hybrid vehicle via motor torque. A second example of the method optionally includes the first example and further includes, wherein the second mode includes when an intake manifold pressure is greater than a threshold pressure. A third example of the method optionally includes one or more of the first and second examples, and further includes, wherein the passage is coupled to the intake passage downstream of a turbocharger compressor and an intake throttle and wherein the exhaust passage includes a turbocharger turbine.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   while propelling a hybrid vehicle via motor torque:
      deactivating a first set of exhaust valves coupled exclusively to a first exhaust manifold coupled to an exhaust passage; and
      circulating gases through engine cylinders and to an intake passage via a second set of exhaust valves coupled exclusively to a second exhaust manifold.

2. The method of claim 1, wherein the deactivating the first set of exhaust valves and circulating gases through the engine cylinders is responsive to a request to restart an engine of the hybrid vehicle via combusting fuel at engine cylinders of the engine.

3. The method of claim 2, wherein the deactivating the first set of exhaust valves and circulating gases through the engine cylinders is further responsive to an intake manifold pressure of the engine being greater than a threshold pressure.

4. The method of claim 3, further comprising, after the intake manifold pressure is higher than the threshold pressure, resuming cylinder fuel injection to restart the engine.

5. The method of claim 4, further comprising, in response to a temperature of a catalyst disposed in the exhaust passage being above a light off temperature, reactivating all exhaust valves of the first set of exhaust valves when resuming cylinder fuel injection to restart the engine.

6. The method of claim 4, further comprising, in response to a temperature of a catalyst disposed in the exhaust passage being below a light off temperature, reactivating only exhaust valves of the first set of exhaust valves coupled to inside cylinders of the engine cylinders and maintaining exhaust vales of the first set of exhaust valves coupled to outside cylinders of the engine cylinders deactivated when resuming cylinder fuel injection to restart the engine.

7. The method of claim 1, wherein the deactivating the first set of exhaust valves and circulating gases through the engine cylinders is further responsive to deceleration of the hybrid vehicle.

8. The method of claim 7, further comprising, during the deceleration of the hybrid vehicle, rotating an engine of the hybrid vehicle instead of charging of battery of the hybrid vehicle via wheel torque generated during the deceleration.

9. The method of claim 1, wherein the second exhaust manifold is coupled to the intake passage, upstream of a turbocharger compressor, via an exhaust gas recirculation (EGR) passage.

10. The method of claim 1, wherein each cylinder includes one exhaust valve of the first set of exhaust valves and one exhaust valve of the second set of exhaust valves.

11. A method for a hybrid vehicle, comprising:
   in response to a piston temperature of an engine of the vehicle being less than a threshold while the vehicle is propelled via motor torque only, rotating the engine unfueled via the motor torque at less than cranking speed to sequentially heat all engine cylinders as they pass through a compression stroke while at least partially throttling a valve disposed in a passage coupled between a first exhaust manifold and an intake passage, the first exhaust manifold coupled to a first set of exhaust valves.

12. The method of claim 11, further comprising operating the first set of exhaust valves at a different timing than a second set of exhaust valves coupled to a second exhaust manifold, the second exhaust manifold coupled to an exhaust passage including a turbocharger turbine.

13. The method of claim 12, wherein the passage is coupled to the intake passage, upstream of a turbocharger compressor.

14. The method of claim 12, wherein the passage is coupled to the intake passage, downstream of a turbocharger compressor and an intake throttle.

15. The method of claim 14, further comprising decreasing an amount of opening of the intake throttle while at least partially throttling the valve disposed in the passage.

16. The method of claim 11, wherein the rotating the engine unfueled while at least partially throttling the valve is further response to a request to restart the engine and stop propelling the vehicle via motor torque only.

17. A method for a hybrid vehicle, comprising:
   in response to a request to restart an engine of the hybrid vehicle while the vehicle is being propelled via motor torque only,
      during a first mode, rotating the engine unfueled via the motor torque at less than cranking speed while at least partially opening a valve disposed in a passage coupled between a first exhaust manifold and an intake passage to recirculate heated aircharge through engine cylinders of the engine, the first exhaust manifold coupled to a first set of exhaust valves; and
      during a second mode, deactivating all exhaust valves of a second set of exhaust valves coupled to a second exhaust manifold coupled to an exhaust passage and circulating gases through the engine cylinders and to the intake passage via the first set of exhaust valves and the passage.

18. The method of claim 17, wherein the first mode includes when a piston temperature is less than a threshold while propelling the hybrid vehicle via motor torque.

19. The method of claim 17, wherein the second mode includes when an intake manifold pressure is greater than a threshold pressure.

20. The method of claim 17, wherein the passage is coupled to the intake passage downstream of a turbocharger compressor and an intake throttle and wherein the exhaust passage includes a turbocharger turbine.

* * * * *